(12) United States Patent
Yasui et al.

(10) Patent No.: US 9,599,001 B2
(45) Date of Patent: Mar. 21, 2017

(54) EXHAUST PURIFICATION SYSTEM FOR INTERNAL COMBUSTION ENGINE

(75) Inventors: Yuji Yasui, Saitama (JP); Eiji Hashimoto, Saitama (JP); Hideki Matsunaga, Saitama (JP); Hisao Haga, Saitama (JP); Masafumi Sakota, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1201 days.

(21) Appl. No.: 13/358,178

(22) Filed: Jan. 25, 2012

(65) Prior Publication Data

US 2012/0117954 A1  May 17, 2012

(51) Int. Cl.
*F01N 3/10* (2006.01)
*F01N 9/00* (2006.01)
(Continued)

(52) U.S. Cl.
CPC ............ *F01N 9/00* (2013.01); *F01N 3/208* (2013.01); *F02D 41/0077* (2013.01);
(Continued)

(58) Field of Classification Search
CPC ........ F01N 3/208; F01N 9/00; F02D 41/0077; F02D 41/1446; F02D 41/146; F02D 41/405
(Continued)

(56) References Cited

U.S. PATENT DOCUMENTS

2003/0182933 A1* 10/2003 Adelman et al. ............... 60/285
2009/0158710 A1*  6/2009 Suzuki ........................... 60/285
(Continued)

FOREIGN PATENT DOCUMENTS

DE    10 2008 004222 A1   7/2009
JP        2004-100699 A    4/2004
(Continued)

OTHER PUBLICATIONS

Notice of Reasons for Rejection issued to JP Application No. 2011-013488, Mailed Nov. 13, 2012.
European Search Report.

*Primary Examiner* — Jason Shanske
(74) *Attorney, Agent, or Firm* — Squire Patton Boggs (US) LLP

(57) ABSTRACT

An exhaust purification system for an internal combustion engine is provided that can maintain the NOx purification rate of a selective reduction catalyst at near the maximum thereof. The exhaust purification system is provided with an oxidation catalyst and CSF provided in the exhaust plumbing of the engine, a selective reduction catalyst that is provided in the exhaust plumbing on the downstream side of oxidation catalyst and CSF, and selectively reduces NOx in the exhaust, and a $NO_2$ sensor that detects $NO_2$ in the exhaust inside of the exhaust plumbing on the downstream side of the selective reduction catalyst. An ECU executes $NO_2$-NOx ratio decrease processing to cause the $NO_2$-NOx ratio corresponding to the ratio of $NO_2$ to NOx in the exhaust flowing into the selective reduction catalyst to decrease, in a case of a detection value Vno2 from the $NO_2$ sensor being greater than a predetermined value Vno2_th.

19 Claims, 29 Drawing Sheets

(51) Int. Cl.
   *F01N 3/20* (2006.01)
   *F02D 41/00* (2006.01)
   *F02D 41/14* (2006.01)
   *F02D 41/40* (2006.01)

(52) U.S. Cl.
   CPC ....... *F02D 41/146* (2013.01); *F02D 41/1446* (2013.01); *F02D 41/405* (2013.01); *F01N 2560/026* (2013.01); *F01N 2900/1402* (2013.01); *Y02T 10/24* (2013.01); *Y02T 10/44* (2013.01); *Y02T 10/47* (2013.01)

(58) Field of Classification Search
   USPC .......................................................... 60/301
   See application file for complete search history.

(56) References Cited

U.S. PATENT DOCUMENTS

| | | |
|---|---|---|
| 2010/0050614 A1 | 3/2010 | Parmentier et al. |
| 2010/0139246 A1* | 6/2010 | Andersson et al. ............ 60/276 |
| 2010/0186390 A1 | 7/2010 | Perry et al. |

FOREIGN PATENT DOCUMENTS

| | | |
|---|---|---|
| JP | 2006-029172 A | 2/2006 |
| JP | 2008-231950 A | 10/2008 |
| JP | 2010-519458 A | 6/2010 |

* cited by examiner

EXHAUST PURIFICATION SYSTEM FOR INTERNAL COMBUSTION ENGINE

This application is based on and claims the benefit of priority from Japanese Patent Application No. 2011° 13488, filed on 25 Jan. 2011, the content of which is incorporated herein by reference.

BACKGROUND OF THE INVENTION

Field of the Invention

The present invention relates to an exhaust purification system for an internal combustion engine. More specifically, the present invention relates to an exhaust purification system for an internal combustion engine equipped with a selective reduction catalyst that selectively reduces nitrogen oxides (NOx) in the exhaust under the presence of a reducing agent.

Related Art

As one exhaust purification system that purifies NOx in exhaust, a system has thus far been proposed in which a selective reduction catalyst that selectively reduces NOx in the exhaust by way of a reducing agent such as ammonia ($NH_3$) is provided in an exhaust channel. For example, With an exhaust purification system of urea addition type, urea water, which is a $NH_3$ precursor, is supplied from an upstream side of the selective reduction catalyst, $NH_3$ is generated by thermal decomposition or hydrolysis of this urea water by the heat of the exhaust, and the NOx in the exhaust is selectively reduced by this $NH_3$. In addition to such a system of urea addition type, for example, a system has also been proposed that generates $NH_3$ by heating a compound of $NH_3$ such as ammonia carbide, and directly adds this $NH_3$. A system of urea addition type will be explained hereinafter.

The NOx purification rate of the selective reduction catalyst is known to change depending on the proportions of nitric monoxide (NO) and nitrogen dioxide ($NO_2$) constituting the NOx of the exhaust flowing thereinto. More specifically, when the $NO_2$-NOx ratio of the exhaust flowing into the selective reduction catalyst (mole ratio of $NO_2$ to NOx, which combines NO and $NO_2$) is 0.5, i.e. when the ratio of NO to $NO_2$ is 1:1, the NOx purification rate is a maximum.

An exhaust purification device is proposed in Japanese Unexamined Patent Application Publication No. 2008-231950 (hereinafter referred to as "Patent Document 1") that is configured such that the $NO_2$-NOx ratio of the exhaust flowing into the selective reduction catalyst is 0.5 in order to maximize the performance of such a selective reduction catalyst. With this exhaust purification device, it is configured such that the $NO_2$-NOx ratio of the exhaust flowing into the selective reduction catalyst is always maintained at 0.5 by controlling an EGR amount, fuel injection timing, etc. in a feed-forward manner by searching a map established in advance, based on the operating state of the internal combustion engine.

SUMMARY OF THE INVENTION

With the exhaust purification device of Patent Document 1, the $NO_2$-NOx ratio of the exhaust flowing into the selective reduction catalyst is maintained at 0.5 in this way in order to continuously maintain the NOx purification rate of the selective reduction catalyst to be high; however, the optimum value of the $NO_2$-NOx ratio is not necessarily always 0.5.

For example, when HC adheres to the selective reduction catalyst or HC is contained in the exhaust newly flowing into the selective reduction catalyst, a reaction such as that shown in the following formula (1) occurs on the selective reduction catalyst, whereby $NO_2$ in the exhaust is consumed, and conversely the NO increases.

$$2NO_2 + C \rightarrow 2NO + CO_2 \qquad (2)$$

Therefore, in a case of the HC purification performance in the oxidation catalyst being high in the ideal state, the HC amount flowing into the selective reduction catalyst will be quite small; therefore, the NOx purification rate can be maximized by making the $NO_2$-NOx ratio near 0.5; however, in the case of the HC purification performance being a low state from the temperature of the oxidation catalyst having lowered and degradation having progressed, it is necessary to increase the $NO_2$-NOx ratio of the exhaust flowing into the selective reduction catalyst past 0.5 (e.g., approximately 0.65) in order to maximize the NOx purification rate due to the presence of the aforementioned HC.

In addition, in a case of providing an exhaust purification filter that collects soot in the exhaust on the upstream side of the selective reduction catalyst, for example, a CRT (Continuously Regenerating Trap) reaction such as that shown in the following formula (2) occurs, and the $NO_2$ generated by the oxidation catalyst will return to NO. As a result, the $NO_2$-NOx ratio maximizing the NOx purification rate of the selective reduction catalyst is a substantially more uncertain value.

$$2NO_2 + C \rightarrow 2NO + CO_2 \qquad (2)$$

As described in the foregoing, in order to maximize the NOx purification rate, it is necessary to variably control the $NO_2$-NOx ratio of the exhaust flowing into the selective reduction catalyst depending on the HC amount flowing into the selective reduction catalyst, HC amount adhering thereto, etc. However, such HC amounts differ according to the operating conditions, operating history, and the degradation state of the oxidation catalyst and selective reduction catalyst, in addition to the operating state of the internal combustion engine; therefore, it is considered difficult to control the $NO_2$-NOx ratio of the exhaust flowing into the selective reduction catalyst to the optimum value, and continuously maintain the NOx purification rate at the maximum, by only schedule control based on a map such as that of the above-mentioned exhaust purification device of Patent Document 1.

In addition, with the exhaust purification device of Patent Document 1, it is said to be possible to make the $NO_2$-NOx ratio of the exhaust immediately after the internal combustion engine to be 0.5 by controlling the EGR amount and fuel injection amount; however, this is considered to be difficult in actual practice. In other words, the $NO_2$-NOx ratio of the exhaust immediately after the internal combustion engine is approximately 0.1, and although the EGR amount and the fuel injection amount are controlled, the influence exerted by these on the $NO_2$-NOx ratio of the exhaust immediately after the internal combustion engine is on the order of several percent; therefore, establishing the $NO_2$-NOx ratio of the exhaust immediately after the internal combustion engine at approximately 0.5 is considered to be difficult in practical application.

The present invention has been made taking the aforementioned problems into account, and has an object of providing an exhaust purification system for an internal combustion engine that can maintain the NOx purification rate of a selective reduction catalyst near the maximum thereof.

In order to achieve the above-mentioned objects, the present invention provides an exhaust purification system (e.g., the exhaust purification systems 2, 2A, 2B described later) for an internal combustion engine (e.g., the engines 1, 1A, 1B described later) including an oxidation catalyst (e.g., the oxidation catalyst 21 and CSF 22 described later) provided in an exhaust channel (e.g., the exhaust plumbing 11 described later) of the internal combustion engine, and a selective reduction catalyst (e.g., the selective reduction catalyst 23 described later) that is provided in the exhaust channel further downstream than the oxidation catalyst and selectively reduces NOx in exhaust. The exhaust purification system includes: a $NO_2$ detection means (e.g., the $NO_2$ sensor 43 described later) for detecting $NO_2$ in exhaust in the exhaust channel further downstream than the selective reduction catalyst; and a control means (e.g., the ECUs 3, 3A, 3B described later) for executing $NO_2$-NOx ratio decrease processing (e.g, processing of time t2 to t3 and t4 to t5 in FIG. 7, processing of time t2 to t3 and t4 to t5 in FIG. 20, and processing of time t2 to t3 and t4 to t5 in FIG. 25 described later) to cause a $NO_2$-NOx ratio, corresponding to a ratio of $NO_2$ to NOx in the exhaust flowing into the selective reduction catalyst, to decrease in a case of a detection value (Vno2) from the $NO_2$ detection means being greater than a predetermined value (Vno2_th).

With the present invention, since the selective reduction catalyst is provided further downstream than the oxidation catalyst, it is possible to cause the $NO_2$-NOx ratio of the exhaust flowing into the selective reduction catalyst to change to near the optimum value at which the NOx purification rate is the maximum, by oxidizing NO in the exhaust discharged from the internal combustion engine by way of the oxidation catalyst to generate $NO_2$.

Further provided are the $NO_2$ detection means for detecting $NO_2$ in the exhaust on the downstream side of this selective reduction catalyst, and the control means that executes $NO_2$-NOx ratio decrease processing to cause the $NO_2$-NOx ratio of the exhaust flowing into the selective reduction catalyst to decrease in a case of the detection value from this $NO_2$ detection means being greater than a predetermined value. For example, in a case of the $NO_2$-NOx ratio of the exhaust flowing into the selective reduction catalyst being at the optimum value near 0.5, the NOx purification rate of the selective reduction catalyst reaches a maximum; therefore, almost no NO or $NO_2$ is discharged to the downstream side thereof; whereas, in the case of the $NO_2$-NOx ratio of the exhaust flowing into the selective reduction catalyst becoming greater than the above-mentioned optimum value and the NOx purification rate declining, the exhaust flowing into the selective reduction catalyst will enter a $NO_2$ excessive state, and $NO_2$ will be discharged to the downstream side thereof. Therefore, according to the present invention, the event of the exhaust flowing into the selective reduction catalyst having entered a $NO_2$ excessive state and the $NO_2$-NOx ratio having become greater than the optimum value is detected as the event of the detection value from the $NO_2$ detection means becoming greater than the predetermined value, and $NO_2$-NOx ratio decrease processing to cause the $NO_2$-NOx ratio to decrease is executed in response thereto, whereby it is possible to control the $NO_2$-NOx ratio of the exhaust flowing into the selective reduction catalyst so as to oscillate between the optimum value thereof and the predetermined value greater than the optimum value. As described in the foregoing, by controlling the $NO_2$-NOx ratio to near the optimum value in a feedback matter based on the detection value from the $NO_2$ detection means, according to the present invention, it is possible to maintain the NOx purification rate of the selective reduction catalyst to near the maximum thereof irrespective of the operating state of the internal combustion engine, operating conditions, operation history, degradation state of the oxidation catalyst or selective reduction catalyst, or the like.

In this case, it is preferable to cause for the $NO_2$-NOx ratio of the exhaust flowing into the selective reduction catalyst to decrease by making the NO amount discharged from the internal combustion engine to increase in the $NO_2$-NOx ratio decrease processing.

With the present invention, in a case of the detection value from the $NO_2$ detection means becoming greater than the predetermined value, i.e. under conditions in which the $NO_2$-NOx ratio becomes greater than the optimum value, the NO amount discharged from the internal combustion engine is made to increase to cause the $NO_2$-NOx ratio of the exhaust flowing into the selective reduction catalyst to decrease towards the optimum value thereof. Although the NOx amount discharged from the internal combustion engine thereby rises, the NOx purification rate of the selective reduction catalyst is maintained near the maximum thereof, a result of which the NOx amount discharged to outside of the system can be made to drastically decrease. It should be noted that the present invention and Patent Document 1 differ in the aspect of, in the aforementioned exhaust purification device of Patent Document 1, in a case of making the $NO_2$-NOx ratio decrease, control to make the NOx amount discharged from the internal combustion engine decrease is performed; whereas, with the present invention as described in the foregoing, the NOx amount discharged from the internal combustion engine is conversely made to increase to maintain the $NO_2$-NOx ratio near the optimum value.

In this case, the exhaust purification system preferably further includes an EGR device (e.g., the high-pressure EGR device 26 described later) that recirculates a portion of exhaust flowing through the exhaust channel to an intake channel (e.g., the intake plumbing 12 described later) of the internal combustion engine, in which the $NO_2$-NOx ratio decrease processing causes the NO amount discharged from the internal combustion engine to increase by decreasing an EGR amount corresponding to an amount of exhaust recirculated by way of the EGR device.

According to the present invention, by causing the NO amount discharged from the internal combustion engine to increase by making the EGR amount decrease, it is possible to maintain the $NO_2$-NOx ratio near the optimum value without adding new hardware in order to make the NO amount increase, or performing complicated combustion control.

In this case, with the proportion of the $NO_2$ amount discharged from the oxidation catalyst relative to the NO amount flowing into the oxidation catalyst defined as the $NO_2$ generation efficiency, it is preferable for the $NO_2$-NOx ratio decrease processing to set a combustion parameter correlated to the combustion state of the internal combustion engine so that the declining effect on the $NO_2$ generation efficiency by the NOx amount discharged from the internal combustion engine increasing becomes greater than the rising effect on the $NO_2$ generation efficiency by the HC amount and CO amount discharged from the internal combustion engine decreasing.

According to the present invention, in the $NO_2$-NOx ratio decrease processing, the $NO_2$ generation efficiency of the oxidation catalyst is made to decline, thereby decreasing the $NO_2$-NOx ratio of the exhaust flowing into the selective reduction catalyst, and maintaining the NOx purification rate of the selective reduction catalyst near the maximum, as a result of setting a combustion parameter so that the declining effect on the $NO_2$ generation efficiency by the NOx amount increasing becomes greater than the raising effect on the $NO_2$ generation efficiency by the HC amount and CO amount decreasing. It should be noted that, herein, the combustion parameter refers to all parameters correlated to the combustion state of the internal combustion engine such as the fuel injection amount, fuel injection timing, boost pressure and EGR amount, for example.

In this case, it is preferable for the control means to cause the NO amount discharged from the internal combustion engine to decrease in a case of the detection value (Vno2) from the $NO_2$ detection means being no more than a predetermined value (Vno2_th).

Although the NOx amount discharged to outside of the system is suppressed by causing the NO amount discharged from the internal combustion engine to increase in the $NO_2$-NOx ratio decrease processing, as described in the foregoing, in a case of the NO amount discharged from the internal combustion engine being excessively abundant, the NOx amount discharged to outside of the system may also turn to increase. Therefore, according to the present invention, it is possible to prevent the NO amount discharged from the internal combustion engine from becoming excessively abundant in this way, by causing the NO amount discharged from the internal combustion engine to decrease in a case of the detection value from the $NO_2$ detection means being no more than the predetermined value.

In this case, it is preferable for the control means to inhibit execution of the $NO_2$-NOx ratio decrease processing until a predetermined time has elapsed since initiating start up of the internal combustion engine, or in a case of a temperature of an exhaust system of the internal combustion engine being less than a predetermined temperature, and to permit execution of the $NO_2$-NOx ratio decrease processing after a predetermined time has elapsed since initiating start up of the internal combustion engine, or in a case of the temperature of the exhaust system of the internal combustion engine being at least a predetermined temperature.

Since the $NO_2$ generation efficiency of the oxidation catalyst is made to substantially decline in the $NO_2$-NOx ratio decrease processing as described in the foregoing, if the oxidation catalyst does not reach the activation temperature, and the $NO_2$-NOx ratio decrease processing is performed in a state in which the ability to oxidize NO in the exhaust and generate $NO_2$ is not sufficient, for example, the exhaust flowing into the selective reduction catalyst will enter a NO excessive state, and the NOx purification rate may decline excessively. In contrast, according to the present invention, execution of the $NO_2$-NOx ratio decrease processing is inhibited until a predetermined time has elapsed since beginning start up of the internal combustion engine or in a case of the temperature of the exhaust system of the internal combustion engine being less than the predetermined temperature, i.e. in a case of being able to determine that the oxidation catalyst has not reached the activation temperature, and the $NO_2$-NOx ratio decrease processing is executed after the predetermined time has elapsed since beginning start up of the internal combustion engine or after the temperature of the exhaust system of the internal combustion engine becomes at least the predetermined temperature, i.e. in a case of being able to determine that the oxidation catalyst has reached the activation temperature. It is thereby possible to prevent the NOx purification rate from excessively declining in a state in which the oxidation catalyst has not reached the activation temperature. In addition, it is possible to quickly optimize the $NO_2$-NOx ratio of the exhaust flowing into the selective reduction catalyst and maximize the NOx purification rate, by performing control to prioritize warm up of the oxidation catalyst, for example, in the interval inhibiting $NO_2$-NOx ratio decrease processing. In addition, since there is a tendency for HC and CO to increase in the interval executing warm up of the oxidation catalyst, the NO oxidation efficiency in the oxidation catalyst tends to decline. Therefore, it is possible to prevent the NO oxidation efficiency from further declining by inhibiting the $NO_2$-NOx ratio decrease processing in such a time period.

In this case, it is preferable for the control means to determine the degree of degradation of the selective reduction catalyst, and to inhibit execution of the $NO_2$-NOx ratio decrease processing in a case of having determined the degree of degradation to be small, as well as set the EGR amount so that the fuel economy of the internal combustion engine increases, and to permit execution of the $NO_2$-NOx ratio decrease processing in a case of having determined the degree of degradation to be large.

With the present invention, the degree of degradation of the selective reduction catalyst is determined, and in the case of having determined this degree of degradation to be small, it is determined as possible to maintain the NOx purification rate to be high without precisely controlling the $NO_2$-NOx ratio of the exhaust flowing into the selective reduction catalyst, and the execution of the $NO_2$-NOx ratio decrease processing is inhibited, as well as setting the EGR amount so that the fuel economy of the internal combustion engine improves. Then, in the case of having determined the degree of degradation of the above-mentioned catalyst to be large, the execution of the $NO_2$-NOx rate decrease processing is permitted, and the $NO_2$-NOx ratio decrease processing is executed as necessary. It is thereby possible to prevent from trying to continually maintain the NOx purification rate to be higher than necessary such that the $NO_2$-NOx ratio decrease processing is excessively executed, and the fuel economy deteriorating.

In this case, it is preferable for the control means to determine the degree of degradation of the selective reduction catalyst based on a correction value (Kegr_no2) from a predetermined reference value (Gegr_map) for a target value (Gegr_cmd) related to the EGR amount.

According to the present invention, it is possible to determine the degree of degradation without adding a new device such as a sensor, by determining the degree of degradation of the selective reduction catalyst based on the correction value for the target value related to the EGR amount from a predetermined reference value, i.e. a parameter used in order to change the target value of the EGR value in the $NO_2$-NOx ratio decrease processing from the reference value.

In this case, it is preferable for the control means to determine the degree of degradation of the selective reduction catalyst based on a timing at which the detection value (Vno2) from the $NO_2$ detection means falls below the degradation determination threshold (Vno2_JD_th), when continually causing the NO amount discharged from the internal combustion engine to increase.

Alternatively, in this case, it is preferable for the control means to determine the degree of degradation of the selective reduction catalyst based on a timing at which the detection value (Vno2) from the $NO_2$ detection means exceeds the degradation determination threshold (Vno2_JD_th), when continually causing the NO amount discharged from the internal combustion engine to decrease.

With the present invention, the degree of degradation of the selective reduction catalyst is determined based on the timing at which the detection value from the $NO_2$ detection means falls below the degradation determination threshold, or the timing at which the degradation determination threshold is exceeded thereby, when continuing to cause the NO amount discharged from the internal combustion engine to increase or decrease by continuing to cause the EGR amount to decrease or increase, etc. It is thereby possible to determine the degree of degradation without adding a new device such as a sensor.

In this case, it is preferable for the control means to determine the degree of degradation of the oxidation catalyst, and in a case of having determined the degree of degradation to be small, to permit execution of the $NO_2$-NOx ratio decrease processing, and in a case of having determined the degree of degradation to be large, to inhibit execution of the $NO_2$-NOx ratio decrease processing.

With the present invention, the degree of degradation of the oxidation catalyst is determined, and in the case of having determined that this degree of degradation is small, the execution of the $NO_2$-NOx ratio decrease processing is permitted. In the case of the degree of degradation of the oxidation catalyst being small, the $NO_2$ generation efficiency of the oxidation catalyst is sufficient, and there is a tendency for the $NO_2$-NOx ratio of the exhaust flowing into the selective reduction catalyst to be slightly $NO_2$ excessive relative to the optimum value; therefore, by executing the $NO_2$—NOx ratio decrease processing in accordance this, it is possible to control the $NO_2$-NOx ratio of the exhaust flowing into the selective reduction catalyst to the optimum value.

Then, in the case of having determined the degree of degradation of the oxidation catalyst to be large, the execution of the $NO_2$-NOx ratio decrease processing is inhibited. The $NO_2$-NOx ratio of the exhaust flowing into the selective reduction catalyst has a tendency of being slightly NO excessive due to a decline in the NO oxidation efficiency of the oxidation catalyst and an increase in the HC amount flowing into the selective reduction catalyst caused by the decline in the HC oxidation efficiency of the oxidation catalyst; therefore, it is possible to prevent an excessive decline in the $NO_2$-NOx ratio by inhibiting the execution of the $NO_2$-NOx ratio decrease processing.

In this case, it is preferable for the $NO_2$-NOx ratio decrease processing to cause the $NO_2$-NOx ratio of the exhaust flowing into the selective reduction catalyst to decrease by changing the air-fuel ratio of the air-fuel mixture of the internal combustion engine to a richer side so as to cause the oxygen concentration of the exhaust to decline.

With the present invention, in a case of the detection value from the $NO_2$ detection means becoming greater than the predetermined value, i.e. under conditions in which the $NO_2$-NOx ratio becomes greater than the optimum value, the air-fuel ratio of the air-fuel mixture of the internal combustion engine is changed to the richer side to cause the oxygen concentration of the exhaust to decline, whereby the proportion of NO oxidizing in the oxidation catalyst decreases to cause the $NO_2$-NOx ratio of the exhaust flowing into the selective reduction catalyst to decrease towards the optimum value thereof. The NOx purification rate of the selective reduction catalyst is thereby maintained near the maximum thereof, and the NOx amount discharged to outside of the system can be made to drastically decrease.

In this case, with the proportion of the $NO_2$ amount discharged from the oxidation catalyst relative to the NO amount flowing into the oxidation catalyst defined as the $NO_2$ generation efficiency, it is preferable for the $NO_2$-NOx ratio decrease processing to set a combustion parameter correlated to the combustion state of the internal combustion engine so that the declining effect on the $NO_2$ generation efficiency by the oxygen concentration of the exhaust declining and the HC amount and CO amount discharged from the internal combustion engine increasing becomes greater than the rising effect on the $NO_2$ generation efficiency by the NOx amount discharged from the internal combustion engine decreasing.

According to the present invention, in the $NO_2$-NOx ratio decrease processing, the $NO_2$ generation efficiency of the oxidation catalyst is made to decline, thereby decreasing the $NO_2$-NOx ratio of the exhaust flowing into the selective reduction catalyst, and maintaining the NOx purification rate of the selective reduction catalyst near the maximum, as a result of setting a combustion parameter so that the declining effect on the $NO_2$ generation efficiency by the oxygen concentration declining and the HC amount and CO amount increasing becomes greater than the raising effect on the $NO_2$ generation efficiency by the NOx amount discharged from the internal combustion engine decreasing. It should be noted that, with the present invention the NOx amount reduced in the selective reduction catalyst can be decreased by causing the NOx amount discharged from the internal combustion engine to decrease in order to make the $NO_2$ generation efficiency decline; therefore, it is also possible to curb the amount of reducing agent supplied to the selective reduction catalyst in order to reduce this.

In this case, it is preferable for the control means to change the air-fuel ratio of the air-fuel mixture of the internal combustion engine to the leaner side in a case of the detection value (Vno2) from the $NO_2$ detection means being no more than a predetermined value (Vno2_th).

According to the present invention, unnecessary consumption of fuel can be suppressed by changing the air-fuel ratio of the air-fuel mixture of the internal combustion engine to the leaner side, in a case of the detection value from the $NO_2$ detection means being no more than the predetermined value.

In this case, it is preferable for the control means to inhibit execution of the $NO_2$-NOx ratio decrease processing until a predetermined time has elapsed since initiating start up of the internal combustion engine, or in a case of a temperature of an exhaust system of the internal combustion engine being less than a predetermined temperature, and to permit execution of the $NO_2$-NOx ratio decrease processing after a predetermined time has elapsed since initiating start up of the internal combustion engine, or in a case of the temperature of the exhaust system of the internal combustion engine being at least a predetermined temperature.

According to the present invention, since the $NO_2$ generation efficiency of the oxidation catalyst is made to substantially decline in the $NO_2$-NOx ratio decrease processing as described in the foregoing, if the oxidation catalyst does not reach the activation temperature, and the $NO_2$-NOx ratio decrease processing is performed in a state in which the ability to oxidize NO in the exhaust and generate $NO_2$ is not sufficient, for example, the exhaust flowing into the selective reduction catalyst will enter a NO excessive state, and the NOx purification rate may decline excessively. In contrast, according to the present invention, execution of the $NO_2$-

NOx ratio decrease processing is inhibited until a predetermined time has elapsed since beginning start up of the internal combustion engine or in a case of the temperature of the exhaust system of the internal combustion engine being less than the predetermined temperature, i.e. in a case of being able to determine that the oxidation catalyst has not reached the activation temperature, and the $NO_2$-NOx ratio decrease processing is executed after the predetermined time has elapsed since beginning start up of the internal combustion engine or after the temperature of the exhaust system of the internal combustion engine becomes at least the predetermined temperature, i.e. in a case of being able to determine that the oxidation catalyst has reached the activation temperature. It is thereby possible to prevent the NOx purification rate from excessively declining in a state in which the oxidation catalyst has not reached the activation temperature. In addition, it is possible to quickly optimize the $NO_2$-NOx ratio of the exhaust flowing into the selective reduction catalyst and maximize the NOx purification rate, by performing control to prioritize warm up of the oxidation catalyst, for example, in the interval inhibiting $NO_2$-NOx ratio decrease processing. In addition, since there is a tendency for HC and CO to increase in the interval executing warm up of the oxidation catalyst, the NO oxidation efficiency in the oxidation catalyst tends to decline. Therefore, it is possible to prevent the NO oxidation efficiency from further declining by inhibiting the $NO_2$-NOx ratio decrease processing in such a time period.

In this case, it is preferable for the control means to change the air-fuel ratio of the air-fuel mixture by way of at least any of a fuel injection parameter, boost pressure, and EGR amount corresponding to an amount of exhaust recirculated by an EGR device.

According to the present invention, it is possible to maintain the $NO_2$-NOx ratio near the optimum value without adding new hardware, by changing the air-fuel ratio of the air-fuel mixture by at least any of a fuel injection parameter, boost pressure, and EGR amount corresponding to an amount of exhaust recirculated by the EGR device.

In this case, it is preferable for the control means to determine the degree of degradation of the selective reduction catalyst, and to inhibit execution of the $NO_2$-NOx ratio decrease processing in a case of having determined the degree of degradation to be small, as well as set the air-fuel ratio of the air-fuel mixture so that the fuel economy of the internal combustion engine increases, and to permit execution of the $NO_2$-NOx ratio decrease processing in a case of having determined the degree of degradation to be large.

With the present invention, the degree of degradation of the selective reduction catalyst is determined, and in the case of having determined the degree of degradation to be small, it is determined as possible to maintain the NOx purification rate to be high without precisely controlling the $NO_2$-NOx ratio of the exhaust flowing into the selective reduction catalyst, and the execution of the $NO_2$-NOx ratio decrease processing is inhibited, as well as setting the air-fuel ratio of the air-fuel mixture so that the fuel economy of the internal combustion engine improves. Then, in the case of having determined the degree of degradation to be large, the execution of the $NO_2$-NOx rate decrease processing is permitted, and the $NO_2$-NOx ratio decrease processing is executed as necessary. It is thereby possible to prevent from trying to continually maintain the NOx purification rate to be higher than necessary such that the $NO_2$-NOx ratio decrease processing is excessively executed, and the fuel economy deteriorating.

In this case, it is preferable for the control means to determine the degree of degradation of the selective reduction catalyst based on a correction value (Daf_no2) from a predetermined reference value (AF_map) for a target value (AF_cmd) related to the air-fuel ratio of the air-fuel mixture.

With the present invention, it is possible to determine the degree of degradation without adding a new device such as a sensor, by determining the degree of degradation of the selective reduction catalyst based on the correction value for causing the target value for the air-fuel ratio of the air-fuel mixture to change from the reference value, i.e. a parameter used in order to change the air-fuel ratio in the $NO_2$-NOx ratio decrease processing.

In this case, it is preferable for the control means to determine the degree of degradation of the selective reduction catalyst based on a timing at which the detection value (Vno2) from the $NO_2$ detection means falls below the degradation determination threshold (Vno2_JD_th), when continually causing the air-fuel ratio of the air-fuel mixture to change to the richer side. Alternatively, in this case, it is preferable for the control means to determine the degree of degradation of the selective reduction catalyst based on a timing at which the detection value (Vno2) from the $NO_2$ detection means exceeds the degradation determination threshold (Vno2_JD_th), when continually causing the air-fuel ratio of the air-fuel mixture to change to the leaner side.

With the present invention, the degree of degradation of the selective reduction catalyst is determined based on the timing at which the detection value from the $NO_2$ detection means falls below the degradation determination threshold, or the timing at which the degradation determination threshold is exceeded thereby, when continuing to cause the air-fuel ratio of the air-fuel mixture to change to the richer side or leaner side. It is thereby possible to determine the degree of degradation without adding a new device such as a sensor.

In this case, it is preferable for the control means to determine the degree of degradation of the oxidation catalyst, and in a case of having determined the degree of degradation to be small, to permit execution of the $NO_2$-NOx ratio decrease processing, and in a case of having determined the degree of degradation to be large, to inhibit execution of the $NO_2$-NOx ratio decrease processing.

According to the present invention, the degree of degradation of the oxidation catalyst is determined, and in the case of having determined that this degree of degradation is small, the execution of the $NO_2$-NOx ratio decrease processing is permitted. In other words, by executing the $NO_2$-NOx ratio decrease processing to match the state in which the exhaust flowing into the selective reduction catalyst is slightly $NO_2$ excessive, it is possible to control the $NO_2$-NOx ratio of the exhaust flowing into the selective reduction catalyst to the optimum value.

Then, in the case of having determined the degree of degradation of the oxidation catalyst to be large, the execution of the $NO_2$-NOx ratio decrease processing is inhibited. It is thereby possible to prevent an excessive decline in the $NO_2$-NOx ratio by inhibiting the execution of the $NO_2$-NOx ratio decrease processing to match the state in which the exhaust flowing into the selective reduction catalyst is slightly NO excessive.

In this case, it is preferable for the $NO_2$-NOx ratio decrease processing to cause the $NO_2$-NOx ratio of the exhaust flowing into the selective reduction catalyst to decrease by causing the temperature of the oxidation catalyst to decline within a temperature range (temperature range (Tdoc_L, Tdoc_scr_opt)) no higher than a temperature at which a NO oxidation efficiency is a maximum.

With the present invention, in a case of the detection value from the $NO_2$ detection means becoming greater than the predetermined value, i.e. under conditions in which the $NO_2$-NOx ratio becomes greater than the optimum value, the temperature of the oxidation catalyst is made to decline within a range of temperatures no higher than a temperature at which the NO oxidation efficiency reaches a maximum to decrease the proportion of NO oxidizing in the oxidation catalyst, whereby the $NO_2$-NOx ratio of the exhaust flowing into the selective reduction catalyst is made to decrease towards the optimum value thereof. The NOx purification rate of the selective reduction catalyst is thereby maintained near the maximum thereof, and the NOx amount discharged to outside of the system can be made to drastically decrease.

In this case, it is preferable for the $NO_2$-NOx ratio decrease processing to cause the temperature of the oxidation catalyst to decline by causing at least any of an after injection amount and post injection amount of the internal combustion engine to decrease.

According to the present invention, it is possible to maintain the $NO_2$-NOx ratio near the optimum value without adding new hardware, by causing the temperature of the oxidation catalyst to decline by making at least any of the after injection amount and the post injection amount to decrease.

In this case, it is preferable for the $NO_2$-NOx ratio decrease processing to set a combustion parameter correlated to the combustion state of the internal combustion engine so that CO and HC discharged from the internal combustion engine become no more than an amount that can be treated even by an oxidation catalyst for which the oxidation ability declines accompanying a decline in temperature.

With the present invention, when executing the $NO_2$-NOx ratio decrease processing and causing the temperature of the oxidation catalyst to decline, a combustion parameter is set so that the CO and HC discharged from the internal combustion engine are no more than amounts that can be treated even by an oxidation catalyst for which the oxidation ability declines accompanying the decline in temperature thereof. It is thereby possible to prevent from maintaining the NOx purification so near the maximum that the CO and HC purification rates decline. In addition, the fuel economy can be improved by setting the combustion parameter so that the amount of CO and HC discharged from the internal combustion engine decrease. In addition, since there is not considered to be an excessive increase in the amount of NOx discharged from the internal combustion engine under the setting of the combustion parameter such that the amounts of CO and HC discharged from the internal combustion engine decrease, it is possible to also curb the amount of reducing agent consumed for purifying the NOx in the selective reduction catalyst.

In this case, it is preferable for the control means to cause the temperature of the oxidation catalyst to rise in a case of the detection value (Vno2) from the $NO_2$ detection means being no more than a predetermined value (Vno2_th).

According to the present invention, in a case of the detection value from the $NO_2$ detection means being no more than the predetermined value, the temperature of the oxidation catalyst is made to rise, whereby it is possible to prevent the NO amount flowing into the selective reduction catalyst from becoming excessive, and the NOx purification rate of the selective reduction catalyst conversely declining.

In this case, it is preferable for the lower limit temperature (Tdoc_L) of the range related to the temperature of the oxidation catalyst to be set so that the improving effect on the NOx purification rate by decreasing the $NO_2$-NOx ratio towards the optimum value thereof becomes greater than the declining effect on the NOx purification rate by the temperature of the selective reduction catalyst declining, when the temperature of the oxidation catalyst is made to decline from the temperature at which the NO oxidation efficiency is a maximum to the lower limit temperature, in the $NO_2$-NOx ratio decrease processing.

According to the present invention, by setting the lower limit temperature when causing the temperature of the oxidation catalyst to decline in the $NO_2$-NOx ratio decrease processing as described in the foregoing, it is possible to prevent the NOx purification rate of the selective reduction catalyst from conversely declining due to the execution of the $NO_2$-NOx ratio decrease processing.

In this case, it is preferable for the control means to inhibit execution of the $NO_2$-NOx ratio decrease processing until a predetermined time has elapsed since initiating start up of the internal combustion engine, or in a case of a temperature of an exhaust system of the internal combustion engine being less than a predetermined temperature, and to permit execution of the $NO_2$-NOx ratio decrease processing after a predetermined time has elapsed since initiating start up of the internal combustion engine, or in a case of the temperature of the exhaust system of the internal combustion engine being at least a predetermined temperature.

According to the present invention, since the $NO_2$ generation efficiency of the oxidation catalyst is made to substantially decline in the $NO_2$-NOx ratio decrease processing as described in the foregoing, if the oxidation catalyst does not reach the activation temperature, and the $NO_2$-NOx ratio decrease processing is performed in a state in which the ability to oxidize NO in the exhaust and generate $NO_2$ is not sufficient, for example, the exhaust flowing into the selective reduction catalyst will enter a NO excessive state, and the NOx purification rate may decline excessively. In contrast, according to the present invention, execution of the $NO_2$-NOx ratio decrease processing is inhibited until a predetermined time has elapsed since beginning start up of the internal combustion engine or in a case of the temperature of the exhaust system of the internal combustion engine being less than the predetermined temperature, i.e. in a case of being able to determine that the oxidation catalyst has not reached the activation temperature, and the $NO_2$-NOx ratio decrease processing is executed after the predetermined time has elapsed since beginning start up of the internal combustion engine or after the temperature of the exhaust system of the internal combustion engine becomes at least the predetermined temperature, i.e. in a case of being able to determine that the oxidation catalyst has reached the activation temperature. It is thereby possible to prevent the NOx purification rate from excessively declining in a state in which the oxidation catalyst has not reached the activation temperature. In addition, it is possible to quickly optimize the $NO_2$-NOx ratio of the exhaust flowing into the selective reduction catalyst and maximize the NOx purification rate, by performing control to prioritize warm up of the oxidation catalyst, for example, in the interval inhibiting $NO_2$-NOx ratio decrease processing. In addition, since there is a tendency for HC and CO to increase in the interval executing warm up of the oxidation catalyst, the NO oxidation efficiency in the oxidation catalyst tends to decline. Therefore, it is possible to prevent the NO oxidation efficiency from further declining by inhibiting the $NO_2$-NOx ratio decrease processing in such a time period.

In this case, it is preferable for the control means to determine the degree of degradation of the selective reduction catalyst, and to inhibit execution of the $NO_2$-NOx ratio decrease processing in a case of having determined the degree of degradation to be small, and to permit execution of the $NO_2$-NOx ratio decrease processing in a case of having determined the degree of degradation to be large.

With the present invention, the degree of degradation of the selective reduction catalyst is determined, and in the case of having determined this degree of degradation to be small, it is determined as possible to maintain the NOx purification rate to be high without precisely controlling the $NO_2$-NOx ratio of the exhaust flowing into the selective reduction catalyst, and the execution of the $NO_2$-NOx ratio decrease processing is inhibited. Then, in the case of having determined the degree of degradation to be large, the execution of the $NO_2$-NOx rate decrease processing is permitted, and the $NO_2$-NOx ratio decrease processing is executed as necessary. It is thereby possible to prevent from trying to continually maintain the NOx purification rate to be higher than necessary such that the $NO_2$-NOx ratio decrease processing is excessively executed, and the fuel economy deteriorating.

In this case, it is preferable for the control means to determine the degree of degradation of the selective reduction catalyst based on a correction value (Dt_no2) from a predetermined reference value (Tdor_scr_opt) for a target value (Tdoc_cmd) related to the temperature of the oxidation catalyst.

With the present invention, it is possible to determine the degree of degradation without adding a new device such as a sensor, by determining the degree of degradation of the selective reduction catalyst based on the correction value for changing the target value of the temperature of the oxidation catalyst from the reference value, i.e. a parameter used in order to change the temperature of the oxidation catalyst in the $NO_2$-NOx ratio decrease processing.

In this case, it is preferable for the control means to determine the degree of degradation of the selective reduction catalyst based on a timing at which the detection value (Vno2) from the $NO_2$ detection means falls below the degradation determination threshold (Vno2_JD_th), when continually causing the temperature of the oxidation catalyst to decline within a temperature range of no more than a temperature at which the NO oxidation efficiency is a maximum.

Alternatively, in this case, it is preferable for the control means to determine the degree of degradation of the selective reduction catalyst based on a timing at which the detection value (Vno2) from the $NO_2$ detection means exceeds the degradation determination threshold (Vno2_JD_th), when continually causing the temperature of the oxidation catalyst to rise within a temperature range of no more than a temperature at which the NO oxidation efficiency is a maximum.

With the present invention, the degree of degradation of the selective reduction catalyst is determined based on the timing at which the detection value from the $NO_2$ detection means falls below the degradation determination threshold, or the timing at which the degradation determination threshold is exceeded thereby, when continuing to cause the temperature of the oxidation catalyst to decline or rise. It is thereby possible to determine the degree of degradation without adding a new device such as a sensor.

In this case, it is preferable for the control means to determine the degree of degradation of the oxidation catalyst, and in a case of having determined the degree of degradation to be small, to permit execution of the $NO_2$-NOx ratio decrease processing, and in a case of having determined the degree of degradation to be large, to inhibit execution of the $NO_2$-NOx ratio decrease processing.

According to the present invention, the degree of degradation of the oxidation catalyst is determined, and in the case of having determined that this degree of degradation is small, the execution of the $NO_2$-NOx ratio decrease processing is permitted. In other words, by executing the $NO_2$-NOx ratio decrease processing to match the state in which the exhaust flowing into the selective reduction catalyst is slightly $NO_2$ excessive, it is possible to control the $NO_2$-NOx ratio of the exhaust flowing into the selective reduction catalyst to the optimum value.

Then, in the case of having determined the degree of degradation of the oxidation catalyst to be large, the execution of the $NO_2$-NOx ratio decrease processing is inhibited. It is thereby possible to prevent an excessive decline in the $NO_2$-NOx ratio by inhibiting the execution of the $NO_2$-NOx ratio decrease processing to match the state in which the exhaust flowing into the selective reduction catalyst is slightly NO excessive.

In this case, it is preferable for the $NO_2$-NOx ratio decrease processing to cause the $NO_2$-NOx ratio of the exhaust flowing into the selective reduction catalyst to decrease by causing the temperature of the oxidation catalyst to rise within a temperature range (temperature range (, Tdoc_scr_opt, Tdoc_H)) of at least a temperature at which a NO oxidation efficiency is a maximum.

With the present invention, in a case of the detection value from the $NO_2$ detection means becoming greater than the predetermined value, i.e. under conditions in which the $NO_2$-NOx ratio becomes greater than the optimum value, the temperature of the oxidation catalyst is made to rise within a range of temperatures of at least a temperature at which the NO oxidation efficiency reaches a maximum to decrease the proportion of NO oxidizing in the oxidation catalyst, whereby the $NO_2$-NOx ratio of the exhaust flowing into the selective reduction catalyst is made to decrease towards the optimum value thereof. The NOx purification rate of the selective reduction catalyst is thereby maintained near the maximum thereof, and the NOx amount discharged to outside of the system can be made to drastically decrease.

In this case, it is preferable for the $NO_2$-NOx ratio decrease processing to cause the temperature of the oxidation catalyst to rise by causing at least any of an after injection amount and post injection amount of the internal combustion engine to increase.

According to the present invention, it is possible to maintain the $NO_2$-NOx ratio near the optimum value without adding new hardware, by causing the temperature of the oxidation catalyst to rise by making at least any of the after injection amount and the post injection amount to increase.

In this case, it is preferable for the control means to cause the temperature of the oxidation catalyst to decline in a case of the detection value (Vno2) from the $NO_2$ detection means being no more than a predetermined value (Vno2_th).

According to the present invention, in a case of the detection value from the $NO_2$ detection means being no more than the predetermined value, the temperature of the oxidation catalyst is made to decline, whereby it is possible to prevent the NO amount flowing into the selective reduction catalyst from becoming excessive, and the NOx purification rate of the selective reduction catalyst conversely declining.

In this case, it is preferable for the upper limit temperature (Tdoc_H) of the range related to the temperature of the oxidation catalyst to be set so that the improving effect on the NOx purification rate by decreasing the $NO_2$-NOx ratio towards the optimum value thereof becomes greater than the declining effect on the NOx purification rate by the temperature of the selective reduction catalyst rising, when the temperature of the oxidation catalyst is made to rise from the temperature at which the NO oxidation efficiency is a maximum to the upper limit temperature, in the $NO_2$-NOx ratio decrease processing.

According to the present invention, by setting the upper limit temperature when causing the temperature of the oxidation catalyst to rise in the $NO_2$-NOx ratio decrease processing as described in the foregoing, it is possible to prevent the NOx purification rate of the selective reduction catalyst from conversely declining due to the execution of the $NO_2$-NOx ratio decrease processing.

In this case, it is preferable for the control means to determine the degree of degradation of the selective reduction catalyst, and to inhibit execution of the $NO_2$-NOx ratio decrease processing in a case of having determined the degree of degradation to be small, and to permit execution of the $NO_2$-NOx ratio decrease processing in a case of having determined the degree of degradation to be large.

According to the present invention, it is possible to prevent from trying to continually maintain the NOx purification rate to be higher than necessary such that the $NO_2$-NOx ratio decrease processing is excessively executed, and the fuel economy deteriorating.

In this case, it is preferable for the control means to determine the degree of degradation of the selective reduction catalyst based on a timing at which the detection value from the $NO_2$ detection means falls below the degradation determination threshold, when continually causing the temperature of the oxidation catalyst to rise within a temperature range of at least a temperature at which the NO oxidation efficiency is a maximum.

Alternatively, in this case, it is preferable for the control means to determine the degree of degradation of the selective reduction catalyst based on a timing at which the detection value from the $NO_2$ detection means exceeds the degradation determination threshold, when continually causing the temperature of the oxidation catalyst to decline within a temperature range of at least a temperature at which the NO oxidation efficiency is a maximum.

With the present invention, the degree of degradation of the selective reduction catalyst is determined based on the timing at which the detection value from the $NO_2$ detection means falls below the degradation determination threshold, or the timing at which the degradation determination threshold is exceeded thereby, when continuing to cause the temperature of the oxidation catalyst to rise or decline, whereby it is possible to determine the degree of degradation without adding a new device such as a sensor.

In order to achieve the above-mentioned objects, the present invention provides an exhaust purification system (e.g., the exhaust purification system 2C described later) for an internal combustion engine (e.g., the engine 10 described later) including an oxidation catalyst (e.g., the oxidation catalyst 21 and CSF 22 described later) provided in an exhaust channel (e.g., the exhaust plumbing 11 described later) of the internal combustion engine, and a selective reduction catalyst (e.g., the selective reduction catalyst 23 described later) that is provided in the exhaust channel further downstream than the oxidation catalyst and selectively reduces NOx in exhaust. The exhaust purification system includes: a NO detection means (e.g., the NO sensor 43C described later) for detecting NO in exhaust in the exhaust channel further downstream than the selective reduction catalyst; and a control means (e.g., the ECU 3C described later) for executing $NO_2$-NOx ratio increase processing (e.g, processing of time t2 to t3 and t4 to t5 in FIG. 30 described later) to cause a $NO_2$-NOx ratio, corresponding to a ratio of $NO_2$ to NOx in the exhaust flowing into the selective reduction catalyst, to increase in a case of a detection value (Vno) from the NO detection means being greater than a predetermined value (Vno_th).

The present invention is provided with the NO detection means for detecting NO in the exhaust on the downstream side of this selective reduction catalyst, and the control means that executes $NO_2$-NOx ratio increase processing to cause the $NO_2$-NOx ratio of the exhaust flowing into the selective reduction catalyst to increase in a case of the detection value from this NO detection means being greater than a predetermined value. For example, in a case of the $NO_2$-NOx ratio of the exhaust flowing into the selective reduction catalyst being at the optimum value near 0.5, the NOx purification rate of the selective reduction catalyst reaches a maximum; therefore, almost no NO or $NO_2$ is discharged to the downstream side thereof; whereas, in the case of the $NO_2$-NOx ratio of the exhaust flowing into the selective reduction catalyst becoming less than the above-mentioned optimum value and the NOx purification rate declining, the exhaust flowing into the selective reduction catalyst will enter a $NO_2$ excessive state, and NO will be discharged to the downstream side thereof. Therefore, according to the present invention, the event of the exhaust flowing into the selective reduction catalyst having entered a NO excessive state and the $NO_2$-NOx ratio having become less than the optimum value is detected as the event of the detection value from the NO detection means becoming greater than the predetermined value, and $NO_2$-NOx ratio increase processing to cause the $NO_2$-NOx ratio to increase is executed in response thereto, whereby it is possible to control the $NO_2$-NOx ratio of the exhaust flowing into the selective reduction catalyst so as to oscillate between the optimum value thereof and the predetermined value less than the optimum value. As described in the foregoing, by controlling the $NO_2$-NOx ratio to near the optimum value in a feedback matter based on the detection value from the NO detection means, according to the present invention, it is possible to maintain the NOx purification rate of the selective reduction catalyst to near the maximum thereof irrespective of the operating state of the internal combustion engine, operating conditions, operation history, degradation state of the oxidation catalyst or selective reduction catalyst, or the like.

In this case, it is preferable to cause for the $NO_2$-NOx ratio of the exhaust flowing into the selective reduction catalyst to increase by making the NO amount discharged from the internal combustion engine to decrease in the $NO_2$-NOx ratio increase processing.

In this case, the exhaust purification system preferably further includes an EGR device that recirculates a portion of exhaust flowing through the exhaust channel to an intake channel of the internal combustion engine, in which the $NO_2$-NOx ratio increase processing causes the NO amount discharged from the internal combustion engine to decrease by increasing an EGR amount corresponding to an amount of exhaust recirculated by way of the EGR device.

In this case, it is preferable for the $NO_2$-NOx ratio increase processing to cause the $NO_2$-NOx ratio of the exhaust flowing into the selective reduction catalyst to increase by changing the air-fuel ratio of the air-fuel mixture of the internal combustion engine to a leaner side so as to cause the oxygen concentration of the exhaust flowing into the oxidation catalyst to rise.

In this case, it is preferable for the control means to change the air-fuel ratio of the air-fuel mixture by way of at least any of a fuel injection parameter, boost pressure, and EGR amount corresponding to an amount of exhaust recirculated by an EGR device.

In this case, it is preferable for the $NO_2$-NOx ratio increase processing to cause the $NO_2$-NOx ratio of the exhaust flowing into the selective reduction catalyst to increase by causing the temperature of the oxidation catalyst to rise within a temperature range of at least a temperature at which a NO oxidation efficiency is a maximum.

In this case, it is preferable for the $NO_2$-NOx ratio increase processing to cause the temperature of the oxidation catalyst to rise by causing at least any of an after injection amount and post injection amount of the internal combustion engine to increase.

In this case, it is preferable for the $NO_2$-NOx ratio increase processing to cause the $NO_2$-NOx ratio of the exhaust flowing into the selective reduction catalyst to increase by causing the temperature of the oxidation catalyst to decline within a temperature range of at least a temperature at which a NO oxidation efficiency is a maximum.

In this case, it is preferable for the $NO_2$-NOx ratio increase processing to cause the temperature of the oxidation catalyst to decline by causing at least any of an after injection amount and post injection amount of the internal combustion engine to decrease.

DETAILED DESCRIPTION OF THE INVENTION

First Embodiment

Figure 1:
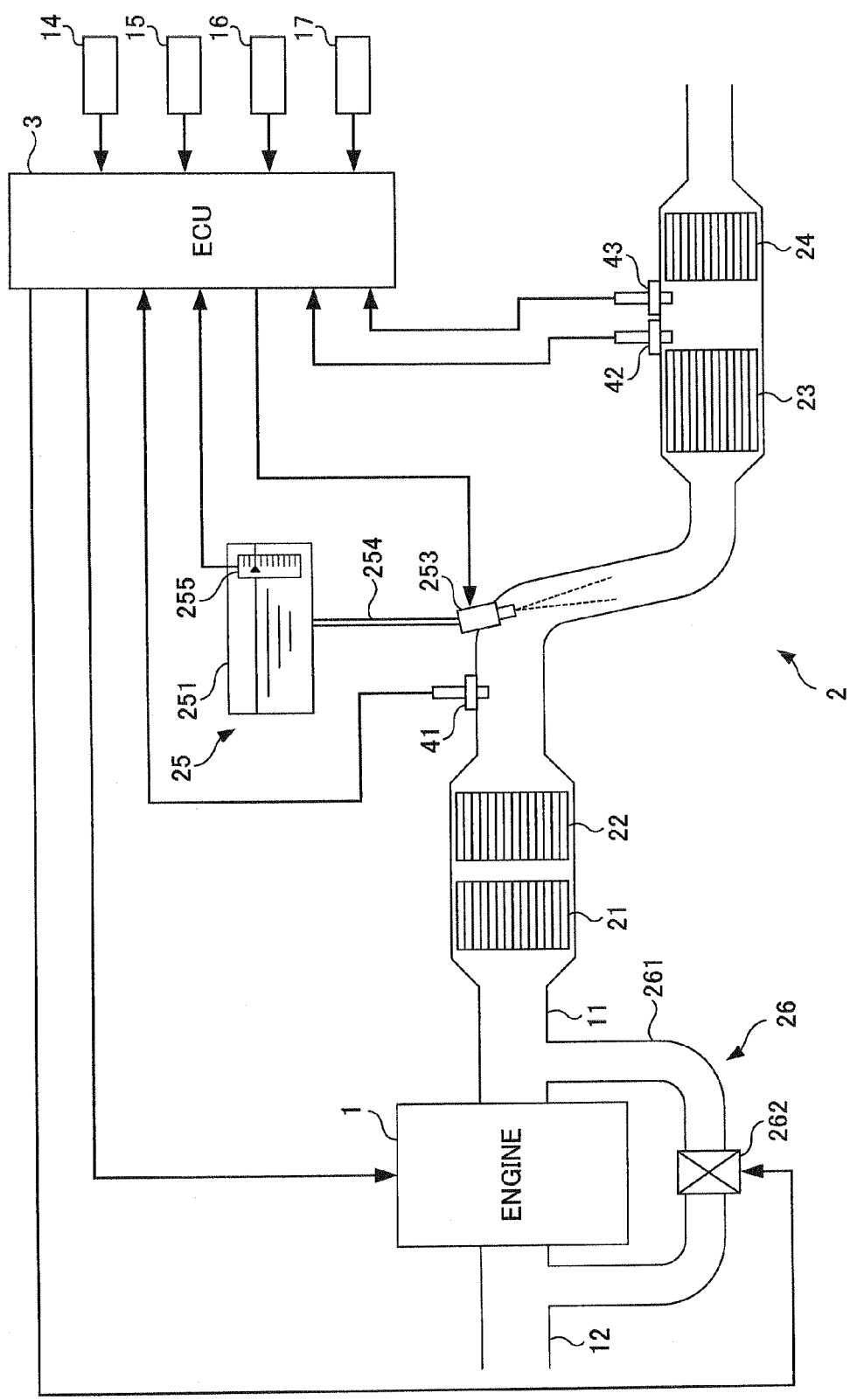
FIG. 1 is a schematic view showing configurations of an engine and an exhaust purification system thereof according to a first embodiment of the present invention.

Hereinafter, a first embodiment of the present invention will be explained while referring to the drawings.

FIG. 1 is a schematic diagram showing configurations of an internal combustion engine (hereinafter referred to as "engine") 1 and an exhaust purification system 2 thereof according to the present embodiment. The engine 1 is a gasoline engine of lean-burn operating type or a diesel engine, and is mounted in a vehicle, which is not illustrated.

The exhaust purification system 2 is configured to include an oxidation catalyst 21 provided in exhaust plumbing 11 of the engine 1, a CSF (Catalyzed Soot Filter) 22 that is provided in the exhaust plumbing 11 and collects soot in the exhaust, a selective reduction catalyst 23 that is provided in an exhaust plumbing 11 and purifies NOx in the exhaust flowing through this exhaust plumbing 11 under the presence of $NH_3$ serving as a reducing agent, a urea injection device 25 that supplies urea water, which is a precursor of ammonia, into the exhaust plumbing 11 on an upstream side of the selective reduction catalyst 23, a high-pressure EGR device 26 that recirculates a portion of the exhaust flowing through the exhaust plumbing 11 into intake plumbing 12, and an electronic control unit (hereinafter referred to as "ECU") 3.

The high-pressure EGR device 26 is configured to include a high-pressure EGR channel 261, and a high-pressure EGR valve 262. The high-pressure EGR channel 261 connects the exhaust plumbing 11 on an upstream side of the oxidation catalyst 21 and the intake plumbing 12. The high-pressure EGR valve 262 is provided in the high-pressure EGR channel 261, and controls the amount of exhaust recirculated through this high-pressure EGR channel 261 (hereinafter referred to as "EGR amount"). This high-pressure EGR valve 262 is connected to the ECU 3 via an actuator that is not illustrated, and the aperture thereof (lift amount) is electromagnetically controlled by the ECU 3.

The oxidation catalyst 21 is provided in the exhaust plumbing 11 immediately after the engine 1 and further upstream than the CSF 22, and in addition to oxidizing and purifying HC and CO in the exhaust, oxidizes the NO in the exhaust to convert to $NO_2$.

Figure 2:
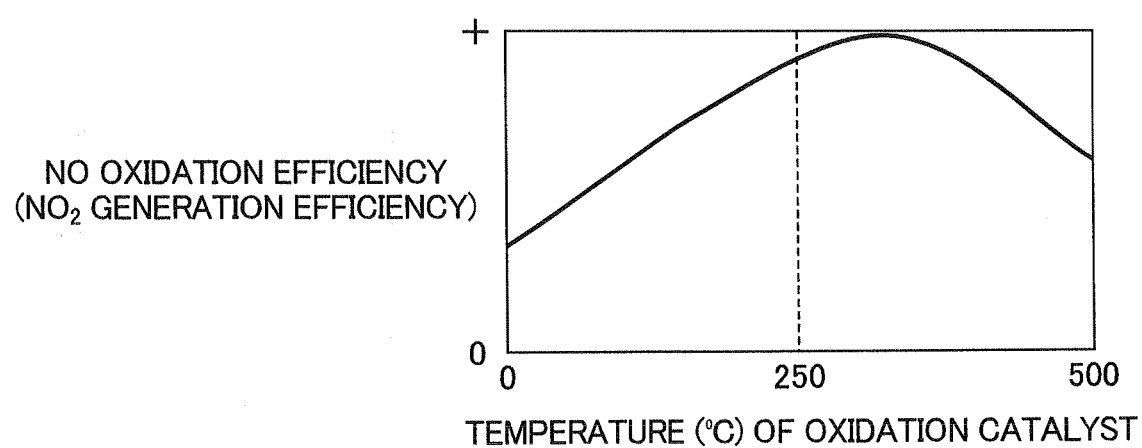
FIG. 2 is a graph showing a relationship between the temperature of an oxidation catalyst and the NO oxidation efficiency of the oxidation catalyst.

FIG. 2 is a graph showing a relationship between the temperature of the oxidation catalyst and the NO oxidation efficiency of the oxidation catalyst. Herein, NO oxidation efficiency refers to the proportion of the $NO_2$ amount oxidized by the oxidation catalyst and flowing out thereof relative to the NO amount flowing into the oxidation catalyst, and thus can also be referred to as $NO_2$ generation efficiency. As shown in FIG. 2, the NO oxidation efficiency of the oxidation catalyst exhibits an upward convex characteristic relative to the temperature of the oxidation catalyst, and is configured so as to oxidize NOx in the vicinity of 300° C. with the best efficiency in the example shown in FIG. 2. In other words, the NO oxidation efficiency of the oxidation catalyst declines when the temperature of the oxidation catalyst falls below the optimum value (300° C. in the example of FIG. 2), and declines also if increased above the optimum value. In contrast, it should be noted that the oxidation efficiencies of CO and HC in the oxidation catalyst have characteristics of basically rising along with the temperature of the oxidation catalyst. In other words, the oxidation efficiencies of CO and HC increase with an increase in the temperature of the oxidation catalyst.

Referring back to FIG. 1, the CSF 22 is provided in the exhaust plumbing 11 further downstream than the oxidation catalyst 21 and further upstream than the selective reduction catalyst 23. The CSF 22 collects soot in which carbon in the exhaust is a main component, when the exhaust passes through the fine pores in the filter walls thereof, by causing the soot to deposit on the surface of the filter walls and in the pores in the filter walls. In addition, since the oxidation catalyst is coated on these filter walls, it has a function of oxidizing CO, HC and NO in the exhaust, similarly to the aforementioned oxidation catalyst 21.

It should be noted that the function may be shared between the upstream side and the downstream side, by using catalysts differing in noble metal composition in the oxidation catalyst 21 on the upstream side and in the CSF 22 on the downstream side. For example, by using a catalyst in which Pt and Pd are mixed in the oxidation catalyst 21 on the upstream side, the oxidation performance for HC and CO while at low temperature will be improved, and by using a catalyst in which Pt is the main constituent as well as mixing a small amount of Pd in the CSF 22 on the downstream side, the NO oxidation performance (i.e. $NO_2$ generation performance) can be improved.

Figure 3:
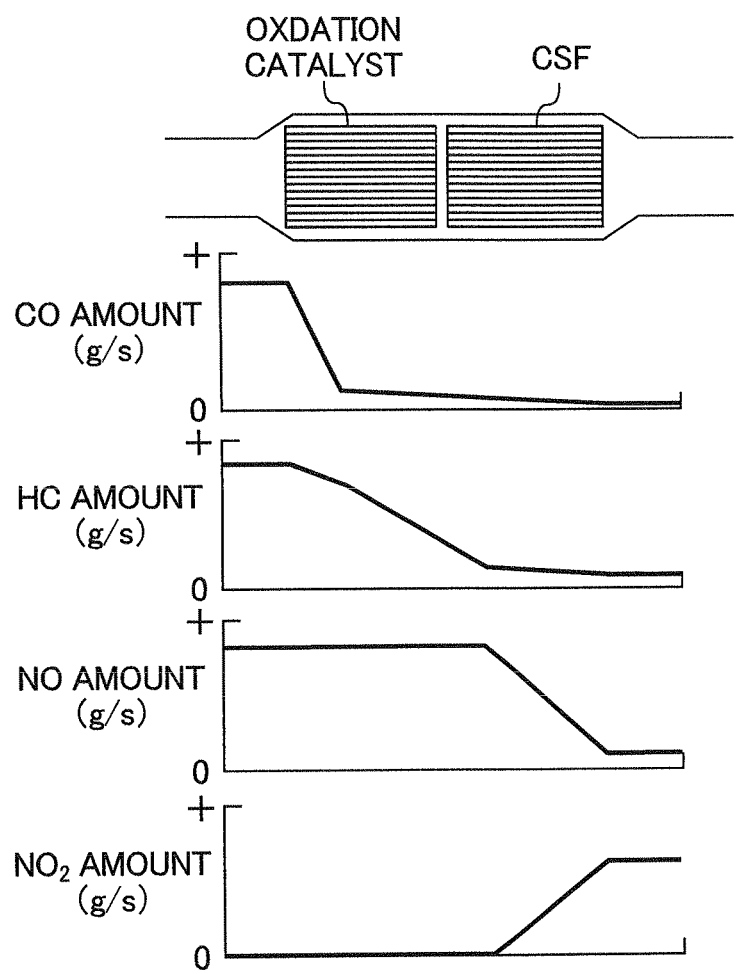
FIG. 3 provides graphs showing the CO amount, HC amount, NO amount and $NO_2$ amount at each part of an oxidation catalyst and CSF.

FIG. 3 provides graphs showing the CO amount, HC amount, NO amount and $NO_2$ amount at each part of the oxidation catalyst and CSF.

As shown in FIG. 3, the CO, HC and NO contained in the exhaust discharged from the engine are each oxidized in the course of passing through the oxidation catalyst and CSF; therefore, the amount of each decreases from the upstream side to the downstream side. In addition, $NO_2$ is generated by the NO being oxidized; therefore, the $NO_2$ amount increases from the upstream side to the downstream side.

Furthermore, in the oxidation catalyst and the CSF having substantially the same function as this oxidation catalyst, there is an order of precedence in the order of CO, HC and NO for the oxidation reactions of CO, HC and NO. In other words, in the process of exhaust containing CO, HC and NO passing through the oxidation catalyst and CSF, CO is oxidized the earliest (i.e. the most upstream), followed by HC being oxidized, and finally (i.e. most downstream) NO being oxidized to generate $NO_2$. More specifically, NO in the exhaust is oxidized after there is no longer CO and HC in the exhaust, and $NO_2$ is generated; therefore, when CO and HC are contained in the exhaust in abundance, there is a tendency for the NO oxidation efficiency to decline prior to the CO and HC oxidation efficiencies declining in the oxidation catalyst and CSF.

In addition, generally with an oxidation catalyst and CSF, accompanying the space velocity of the exhaust, i.e. the throughput per unit time of the substances oxidizing (CO, HC, NO) (g/s), increasing, the oxidation efficiency thereof declines. Furthermore, as described in the foregoing, since NO in the exhaust is oxidized at the most downstream side of the oxidation catalyst and CSF, when the volume of exhaust discharged from the engine increases, there is a tendency for the NO oxidation efficiency to decline prior to the CO and HC oxidation efficiencies declining.

Referring back to FIG. 1, the urea water injection device 25 includes a urea water tank 251 and a urea water injection valve 253. The urea water tank 251 stores urea water, and is connected to the urea water injection valve 253 via a urea water supply pipe 254 and a urea water pump, which is not illustrated. A urea water level sensor 255 is provided to this urea water tank 251. The urea water level sensor 255 detects the water level of the urea water in the urea water tank 251, and outputs a detection signal substantially proportional to this water level to the ECU 3. The urea water injection valve 253 is connected to the ECU 3, operates according to a control signal from the ECU 3, and injects urea water into the exhaust plumbing 11 in accordance with this control signal.

The selective reduction catalyst 23 selectively reduces NOx in the exhaust under an atmosphere in which a reducing agent such as $NH_3$ is present. More specifically, when urea water is injected by the urea water injection device 25, this urea water is thermally decomposed or hydrolyzed by the heat of the exhaust, and $NH_3$ is produced as a reducing agent. The $NH_3$ thus produced is supplied to the selective reduction catalyst 23, and NOx in the exhaust is selectively reduced by this $NH_3$.

The reaction formulas illustrating the reduction reaction of NO and $NO_2$ in the selective reduction catalyst 23 are as shown in the following formulas (3-1), (3-2), and (3-3). The reaction shown in formula (3-1) is a reaction simultaneously reducing NO and $NO_2$ in the exhaust. The reaction shown in formula (3-2) is a reaction reducing only NO in the exhaust. The reaction shown in formula (3-3) is a reaction reducing only $NO_2$ in the exhaust.

$$NO+NO_2+2NH_3 \rightarrow 2N_2+3H_2O \quad (3\text{-}1)$$

$$4NO+4NH_3+O_2 \rightarrow 4N_2+16H_2O \quad (3\text{-}2)$$

$$6NO_2+8NH_3 \rightarrow 7N_2+16H_2O \quad (3\text{-}3)$$

Although it has been configured so that NO and $NO_2$ in the exhaust are reduced by $NH_3$ by the reactions shown in the above formulas (3-1) to (3-3) progressing on the selective reduction catalyst, the extent of progression of each reaction is considered to change depending on the $NO_2$-NOx ratio.

For example, in a case of the $NO_2$-NOx ratio being 0.5, the mole ratio of NO to $NO_2$ in the exhaust is 1:1; therefore, the reaction shown in the above formula (3-1) mainly progresses in the selective reduction catalyst.

In a case of the $NO_2$-NOx ratio being less than 0.5, i.e. in a case of NO being more abundant that $NO_2$, the NO that has not been reduced by the reaction shown in the above formula (3-1) remains; however, the NO of this surplus amount is reduced by the reaction shown in the above formula (3-2) progressing. Therefore, in a case of the $NO_2$-NOx ratio being less than 0.5, the extent of progression of the reaction shown in the above formula (3-1) decreases accompanying the $NO_2$-NOx ratio decreasing, and the extent of progression of the reaction shown in the above formula (3-2) increases.

On the other hand, in a case of the $NO_2$-NOx ratio being greater than 0.5, i.e. in a case of $NO_2$ being more abundant than NO, the $NO_2$ that has not been reduced by the reaction shown in the above formula (3-1) remains; however, the $NO_2$ of this surplus amount is reduced by the reaction shown in the above formula (3-3) progressing. Therefore, in a case of the $NO_2$-NOx ratio being greater than 0.5, the extent of progression of the reaction shown in the above formula (3-1) decreases accompanying the $NO_2$-NOx ratio increasing, and the extent of progression of the reaction shown in the above formula (3-3) increases.

Figure 4:
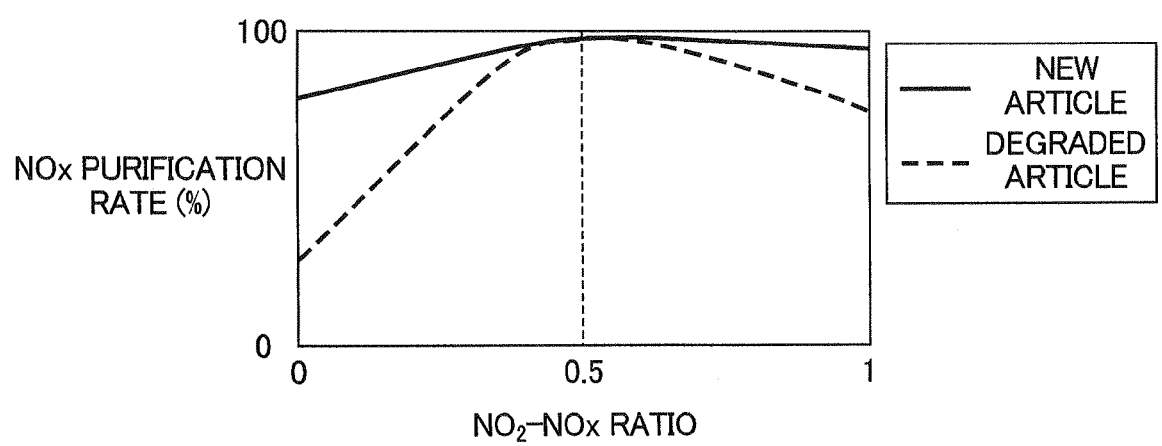
FIG. 4 is a graph showing the characteristics of the NOx purification rate relative to the $NO_2$-NOx ratio for the selective reduction catalysts.

FIG. 4 is a graph showing the characteristics of the NOx purification rate relative to the $NO_2$-NOx ratio in the selective reduction catalyst. The solid line indicates the characteristic of the NOx purification rate in a selective reduction catalyst that is a new article, and the dotted line indicates the characteristic of the NOx purification rate in a degraded selective reduction catalyst. The NOx purification rate of the selective reduction catalyst comes to change depending on the $NO_2$-NOx ratio in the exhaust flowing thereinto as shown in FIG. 4, due to the NO and $NO_2$ being reduced by way of the aforementioned such three different reactions in the selective reduction catalyst.

In other words, the NOx purification rate of the selective reduction catalyst exhibits an upward convex characteristic so as to be a maximum when the $NO_2$-NOx ratio of the exhaust flowing thereinto is 0.5, irrespective of the degree of progression of the degradation thereof. In addition, when comparing the percent decline in NOx purification rate when the $NO_2$-NOx ratio deviates from the optimum value between a case of being greater than the optimum value and a case of being smaller, the percent decline in the NOx purification rate is larger for the smaller case.

In addition, when comparing the percent decline in the NOx purification rate when the $NO_2$-NOx ratio deviates from the optimum value between a case of the degree of degradation of the selective reduction catalyst being small (solid line in FIG. 4) and a case of being large (dotted line in FIG. 4), the percent decline in the NOx purification rate is larger for the case of the degradation extent being large. In other words, in a case of the degree of degradation of the selective reduction catalyst being small, the NOx purification rate is mostly constant irrespective of the $NO_2$-NOx ratio of the exhaust; whereas, in a case of the degree of degradation of the selective reduction catalyst being large, the NOx purification rate changes greatly depending on the $NO_2$-NOx ratio of the exhaust.

Referring back to FIG. 1, the selective reduction catalyst 23 has a function of reducing NOx in the exhaust by the $NH_3$ produced from the urea water, as well as having a function of storing only a predetermined amount of the $NH_3$ thus generated. Hereinafter, the $NH_3$ amount stored in the selective reduction catalyst 23 is defined as a storage amount, and the $NH_3$ amount that can be stored in the selective reduction catalyst 23 is defined as a maximum storage capacity. The $NH_3$ stored in this way is also consumed as appropriate in the reduction of NOx in the exhaust. As a result, the NOx purification rate of the selective reduction catalyst 23 increases in accordance with the storage amount increasing. On the other hand, when the storage amount reaches the storage capacity and the selective reduction catalyst 23 enters a saturated state, although the NOx purification rate also reaches a maximum value, $NH_3$ slip occurs in which the $NH_3$ not contributing to the reduction of NOx and has become surplus is discharged to the downstream side of the selective reduction catalyst 23. In order to prevent the $NH_3$ discharged to the downstream side of the selective reduction catalyst 23 from discharging to outside the system in this way, a slip suppressing catalyst 24 is provided on the downstream side of the selective reduction catalyst 23. For example, an oxidation catalyst that oxidizes $NH_3$ having slipped from the selective reduction catalyst 23 to decompose into $N_2$ and $H_2O$, a selective reduction catalyst that stores the $NH_3$ having slipped or provides this $NH_3$ in the reduction of NOx in the exhaust, or the like can be used as this slip suppressing catalyst 24.

In order to detect the state of the exhaust purification system 2, an exhaust temperature sensor 41, a $NH_3$ sensor 42, a NO$_2$ sensor 43, a crank angle position sensor 14, an accelerator opening sensor 15, a urea water remaining amount warning light 16, a catalyst degradation warning light 17, and the like are connected to the ECU 3.

The exhaust temperature sensor 41 detects the exhaust temperature on downstream sides of oxidation catalyst 21 and CSF 22, and supplies a signal substantially proportional to the detection value to the ECU 3. With the ECU 3, a temperature Tscr of the selective reduction catalyst 23 and a temperature Tdoc of the oxidation catalyst 21 are calculated based on the detection value of this exhaust temperature sensor 41.

The NH$_3$ sensor 42 detects the concentration or amount of ammonia in the exhaust in the exhaust plumbing 11 between the selective reduction catalyst 23 and the slip suppressing catalyst 24, and supplies a signal Vnh3 substantially proportional to the detection value to the ECU 3. The NO$_2$ sensor 43 detects the concentration or amount of NO$_2$ in the exhaust in the exhaust plumbing 11 immediately after the selective reduction catalyst 23, and supplies a signal Vno2 substantially proportional to the detection value to the ECU 3.

The crank angle position sensor 14 detects the rotation angle of the crank shaft of the engine 1 along with generating a pulse at every 1° of crank angle, and supplies this pulse signal to the ECU 3. A revolution speed NE of the engine 1 is calculated by the ECU 3 based on this pulse signal. The crank angle position sensor 14 further generates a cylinder discriminating pulse at a predetermined crank angle position of a specific cylinder, and supplies this to the ECU 3.

The accelerator opening sensor 15 detects a depression amount (hereinafter referred to as "accelerator opening") AP of the accelerator pedal, which is not illustrated, of the vehicle, and supplies a detection signal substantially proportional to the accelerator opening AP thus detected to the ECU 3. A demanded engine load TRQ of the engine 1 is calculated in accordance with this accelerator opening AP and revolution speed NE by the ECU 3.

The urea water remaining amount warning light 16 is provided in the instrument panel of the vehicle, for example, and illuminates in response to the remaining amount of urea water in the urea water tank 251 having decreased past a predetermined remaining amount. With this, the fact that the remaining amount of urea water in the urea water tank 251 has decreased is warned to the operator.

The catalyst degradation warning light 17 is provided in the instrument panel of the vehicle, for example, and illuminates in response to a catalyst degradation determination value DET_SCR_AGD described later having become "3". With this, the fact that the selective reduction catalyst is in a degraded state is warned to the operator.

The ECU 3 is provided with an input circuit having functions such as of shaping input signal waveforms from every kind of sensor, correcting the voltage levels to predetermined levels, and converting analog signal values to digital signal values, and a central processing unit (hereinafter referred to as "CPU"). In addition to this, the ECU 3 is provided with a storage circuit that stores every kind of calculation program executed by the CPU, calculation results, and the like, and an output circuit that outputs control signals to the engine 1, high-pressure EGR valve 262, urea water injection valve 253, and the like.

Figure 5:
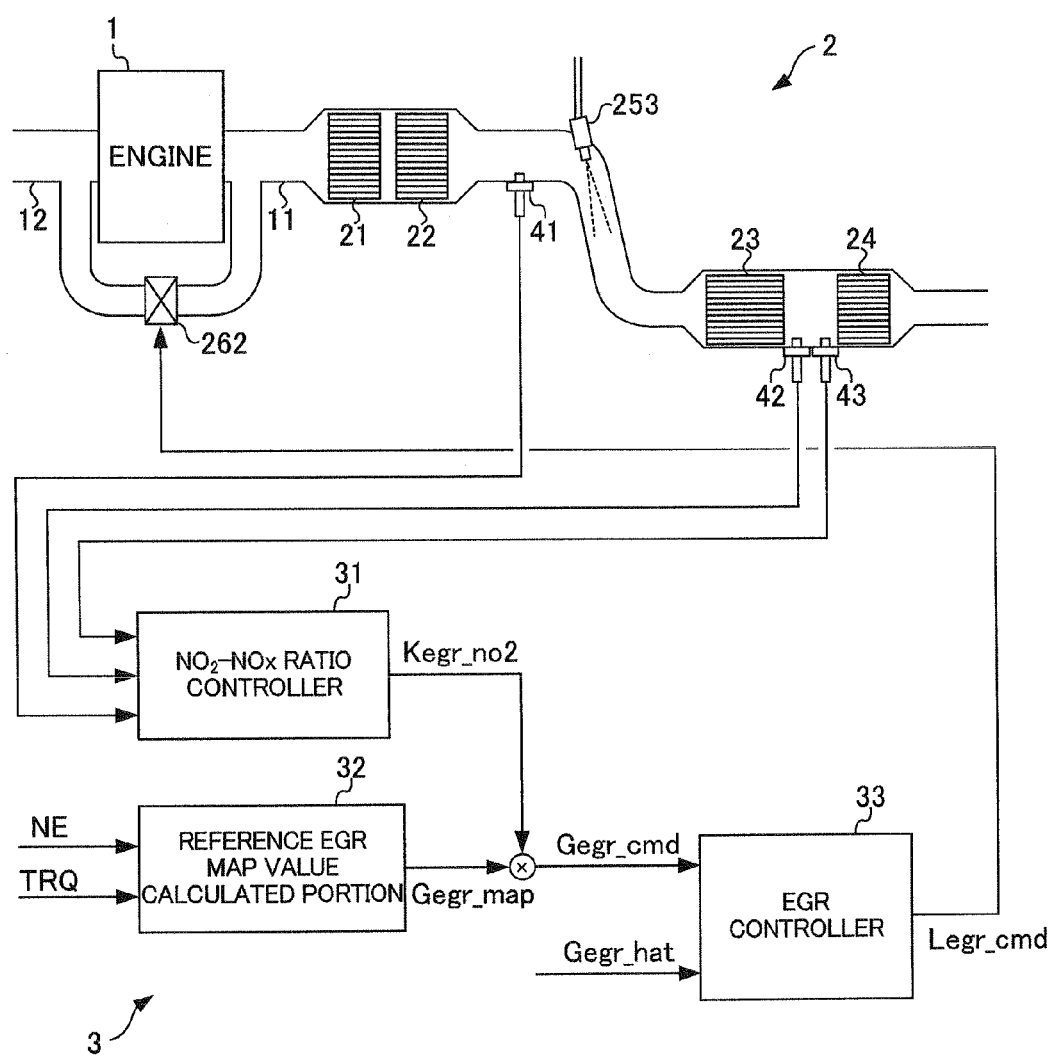
FIG. 5 is a view showing a configuration of a control block related to the deciding of a command value for a lift amount of the high-pressure EGR valve.

Among the control blocks configured in the ECU 3, FIG. 5 is a view showing the configuration of a control block related to the deciding of a command value (hereinafter referred to as "EGR valve command value") Legr_cmd for the lift amount of the high-pressure EGR valve 262.

It should be noted that, in addition to the control block related to the deciding of the EGR valve command value Legr_cmd such as that shown in FIG. 5, for example, a control block for deciding urea water injection control, i.e. an injection amount of urea water from the urea water injection valve 253, is formed in the ECU 3. More specifically, in urea water injection control, the injection amount of urea water is determined based on the detection value of the NH.sub.3 sensor 42 provided on the downstream side of the selective reduction catalyst 23, while estimating the storage amount and maximum storage capacity of the selective reduction catalyst 23, so that this storage amount is maintained near the maximum storage capacity. By maintaining the storage amount near the maximum storage capacity in this way, the NH.sub.3 slip from the selective reduction catalyst 23 is held at the minimum, while being able to maintain the NOx purification rate of the selective reduction catalyst 23 to be high. It should be noted that a detailed algorithm of the above such urea water injection control is described in detail by the applicants of the present application in PCT International Publication No. WO2009/128169, etc., and thus a detailed explanation in addition thereto will be omitted herein.

As shown in FIG. 5, the control block related to deciding of the EGR valve command value Legr_cmd is configured to include an NO$_2$-NOx ratio controller 31, a reference EGR amount map value calculating unit 32, and an EGR controller 33.

According to this control block, a target EGR amount Gegr_cmd is calculated by multiplying an EGR correction coefficient Kegr_no2, which is calculated by way of the NO$_2$-NOx ratio controller 31, by a reference EGR amount Gegr_map calculated by way of the reference EGR map value calculating unit 32 (refer to the following formula (4)). Then, the EGR valve command value Legr_cmd is calculated by way of the EGR controller 33 so that the estimated value Gegr_hat for the EGR amount (hereinafter referred to as "EGR amount estimated value") matches the above-mentioned target EGR amount Gegr_cmd.

It should be noted that the target EGR amount Gegr_cmd may be defined not only as a value arrived at by multiplying the EGR correction coefficient Kegr_no2 by the reference EGR amount Gegr_map as shown in formula (4), but also as a value arrived at by adding the EGR correction coefficient Kegr_no2 to the reference EGR amount Gegr_map.

$$Gegr\_cmd(k)=Kegr\_no2(k)\cdot Gegr\_map(k) \quad (4)$$

The reference EGR amount map value calculating unit 32 decides the reference EGR amount Gegr_map by searching a map established in advance, based on the engine revolution speed NE and the demanded engine load TRQ. It should be noted that this map in the reference EGR amount map value calculating unit 32 preferably takes account of the balance of the fuel efficiency, soot amount, feed NOx amount, and the like, while setting so that the NO$_2$-NOx ratio of the exhaust flowing into the selective reduction catalyst is slightly NO$_2$ excessive.

The NO$_2$-NOx ratio controller 31 operates in any of the following four types of control modes, and calculates the EGR correction coefficient Kegr_no2 for correcting the aforementioned map value Gegr_map, based on different algorithms in each control mode.
1. NO$_2$ sensor feedback mode
2. catalyst degradation determination mode
3. fuel economy priority mode
4. NO$_2$ generation priory mode Hereinafter, a sequence of calculating the EGR correction coefficient Kegr_no2 according to these four control modes will be explained in order.

NO$_2$ Sensor Feedback Mode

In the NO$_2$ sensor feedback mode, the NO$_2$-NOx ratio controller 31 decides the EGR correction coefficient Kegr_no2 based on the output value Vno2 of the NO$_2$ sensor so that the NO$_2$-NOx ratio of the exhaust flowing into the selective reduction catalyst is on average maintained near the optimum value thereof.

In this mode, the output value Vno2 of the NO$_2$ sensor that is proportional to the NO$_2$ concentration of the exhaust immediately after the selective reduction catalyst is converted to an output deviation E_Vno2 determined by the following formula (5). In other words, the output deviation E_Vno2 of the NO$_2$ sensor becomes "0" in a case of the output value Vno2 being no more than a predetermined NO$_2$ detection threshold Vno2_th, and in a case of the output value Vno2 being greater than the NO$_2$ detection threshold Vno2_th, becomes the deviation thereof (Vno2-Vno2_th).

$$E\_Vno2(k) = \begin{cases} Vno2(k) - Vno2\_th & (Vno2(k) - Vno2\_th > 0) \\ 0 & (Vno2(k) - Vno2\_th \leq 0) \end{cases} \quad (5)$$

As explained in detail hereinafter, this NO$_2$ detection threshold Vno2_th is a value preferably set to a slightly larger value than "0" ideally, due to being a threshold used in order to determine the existence of NO$_2$ on the downstream side of the selective reduction catalyst based on the output value Vno2 of the NO$_2$ sensor; however, upon taking account of influences such as variability in solids, degradation over time, and interference gases of the NO$_2$ sensor, it is set to a value that can reliably determine when NO$_2$ is being discharged to the downstream side of the selective reduction catalyst.

Herein, the difference between a state in which the output deviation E_Vno2 is 0 and a state being a non-zero positive value will be explained while referring to FIG. 6.

Figure 6:
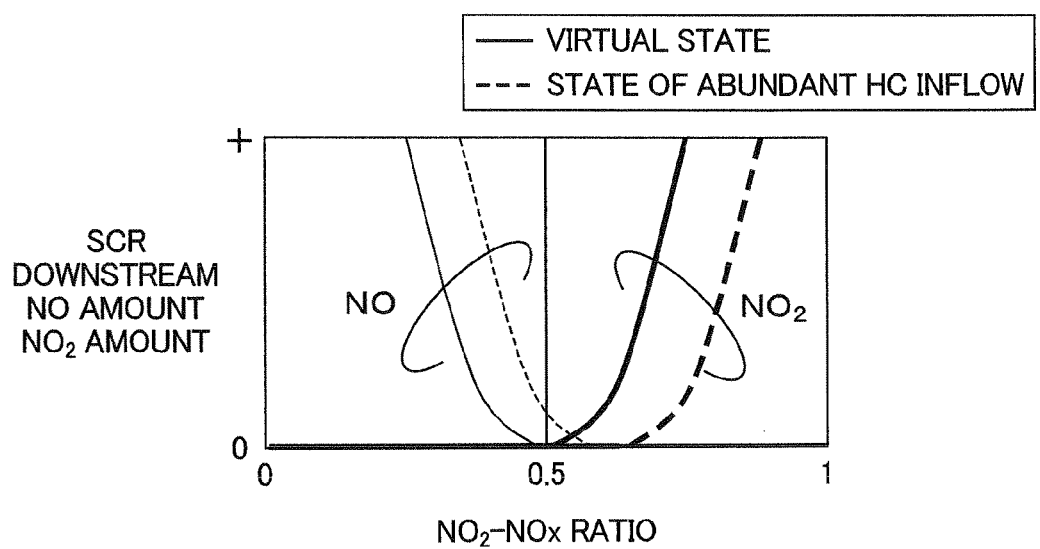
FIG. 6 is a view showing relationships between the $NO_2$-NOx ratio in exhaust flowing into the selective reduction catalyst, and the $NO_2$ amount and NO amount on a downstream side of the selective reduction catalyst.

FIG. 6 is a view showing relationships between the NO$_2$-NOx ratio in exhaust flowing into the selective reduction catalyst, and the NO$_2$ amount and NO amount on a downstream side of the selective reduction catalyst. The solid line in FIG. 6 indicates the relationship of the NO amount and NO$_2$ amount with the NO$_2$-NOx ratio in a case of the selective reductive catalyst being in the ideal state. Herein, the ideal state of the selective reduction catalyst refers to a state in which HC are neither adhering nor flowing into the selective reduction catalyst, and thus the NOx purification is a maximum when the NO$_2$-NOx ratio is 0.5. The dotted line indicates the relationship of the NO amount and NO$_2$ amount with the NO$_2$-NOx ratio in a case of being in a state in which the HC inflow to the selective reduction catalyst is large. For example, when the HC inflow to the selective reduction catalyst increases due to the oxidation catalyst on the upstream side degrading, the NO$_2$ is consumed and NO comes to increase as shown in the above formula (1); therefore, the NO$_2$-NOx ratio at which the NOx purification is a maximum becomes greater than the above-mentioned ideal state. In addition, the bold line indicates the NO$_2$ amount, and the thin line indicates the NO amount.

As shown by the bold solid line in FIG. 6, in a case of the NO$_2$-NOx ratio being no more than approximately 0.5, which is the maximum for NOx purification rate, the NO$_2$ amount on the downstream side of the selective reduction catalyst in the ideal state becomes approximately 0 irrespective of the NO$_2$-NOx ratio, and in a case of the NO$_2$-NOx ratio being at least approximately 0.5, increases accompanying the NO$_2$-NOx ratio increasing. In addition, as shown by the bold dotted line in FIG. 6, in a case of the NO$_2$-NOx ratio being no more than approximately 0.6, which is the maximum for NOx purification rate, the NO$_2$ amount on the downstream side of the selective reduction catalyst in a state in which the HC inflow is great is approximately 0 irrespective of the NO$_2$-NOx ratio, and in a case of the NO$_2$-NOx ratio being at least approximately 0.6, increases accompanying the NO$_2$-NOx ratio increasing.

In other words, the NO$_2$ amount on the downstream side of the selective reduction catalyst increases when the NO$_2$-NOx ratio exceeds the optimum value at which the NOx purification rate thereof is a maximum, i.e. when the exhaust flowing into the selective reduction catalyst becomes NO$_2$ excessive.

In addition, as shown by the thin solid line in FIG. 6, in a case of the NO$_2$-NOx ratio being at least approximately 0.5, which is the maximum for the NOx purification rate, the NO amount on the downstream side of the selective reduction catalyst in the ideal case is approximately 0 irrespective of the NO$_2$-NOx ratio, and increases accompanying the NO$_2$-NOx ratio decreasing in a case of the NO$_2$-NOx ratio being no more than approximately 0.5. In addition, as shown by the thin dotted line in FIG. 6, in a case of the NO$_2$-NOx ratio being at least approximately 0.6, which is the maximum for the NOx purification rate, the NO$_2$ amount on the downstream side of the selective reduction catalyst in a state in which the HC inflow is great is approximately 0 irrespective of the NO$_2$-NOx ratio, and increases accompanying the NO$_2$-NOx ratio decreasing in a case of the NO$_2$-NOx ratio being no more than approximately 0.6.

In other words, the NO amount on the downstream side of the selective reduction catalyst increases when the NO$_2$-NOx ratio falls below the optimum value at which the NOx purification rate thereof is the maximum, i.e. when the exhaust flowing into the selective reduction catalyst becomes NO excessive, irrespective of the state thereof.

Base on the foregoing, a state in which the output deviation E_Vno2 is "0" can be determined as a state in which the NO$_2$-NOx ratio of the exhaust flowing into the selective reduction catalyst is near the optimum value at which the NOx purification rate is the maximum, or is NO excessive, being less than the above-mentioned optimum value.

On the other hand, the state in which the output deviation E_Vno2 is a positive value can be determined as being a NO$_2$ excessive state in which the NO$_2$-NOx ratio of the exhaust flowing into the selective reduction catalyst is larger than the optimum value at which the NOx purification rate becomes a maximum.

In the NO$_2$ sensor feedback mode, the EGR correction coefficient Kegr_no2 is calculated based on the following formulas (6), (7) and (8) using the output deviation E_Vno2 having the aforementioned meaning.

$$Dkegr\_no2(k) = \begin{cases} Dkegr\_DEC & (E\_Vno2(k) > 0 \text{ and } E\_Vno2(k-1) = 0) \\ Dkegr\_INC & (E\_Vno2(k) = 0) \\ 0 & (\text{other}) \end{cases} \quad (6)$$

$$Kegr\_no2\_temp(k) = \\ Kegr\_no2(k-1) + Ki\_no2 \cdot E\_Vno2(k) + Dkegr\_no2(k) \quad (7)$$

-continued $$Kegr\_no2(k) = \begin{cases} 1 & (Kegr\_no2\_temp(k) \geq 1) \\ Kegr\_no2\_temp(k) & (Kegr\_no2\_L < Kegr\_no2\_temp(k) < 1) \\ Kegr\_no2\_L & (Kegr\_no2\_temp(k) \leq Kegr\_no2\_L) \end{cases} \quad (8)$$

As shown in formula (8), with "1" as an upper limit and Kegr_no2 as a lower limit, the EGR correction coefficient Kegr_no2 is set between this upper limit and lower limit.

A feedback gain Ki_no2 in formula (7) is set to a negative value. It is thereby possible to cause the EGR correction coefficient Kegr_no2 to gently decrease, in a case of the output deviation E_Vno2 being a positive value, i.e. in a case of being a state in which the $NO_2$-NOx ratio of the exhaust flowing into the selective reduction catalyst is $NO_2$ excessive.

The initial decrement Dkegr_DEC in formula (6) corresponds to the amount of change in the EGR correction coefficient Kegr_no2 only when the output deviation E_Vno2 switches from "0" to a positive value, i.e. when the output value Vno2 of the $NO_2$ sensor exceeds the $NO_2$ detection threshold Vno2_th, and is set to a negative value. In addition, the return amount Dkegr_INC in formula (6) corresponds to the amount of change in the EGR correction coefficient Kegr_no2 in a case of the output deviation E_Vno2 being "0", i.e. in a case of being in a state in which the $NO_2$-NOx ratio of the exhaust flowing into the selective reduction catalyst is the optimum value or NO excessive, and is set to a positive value.

Figure 7:
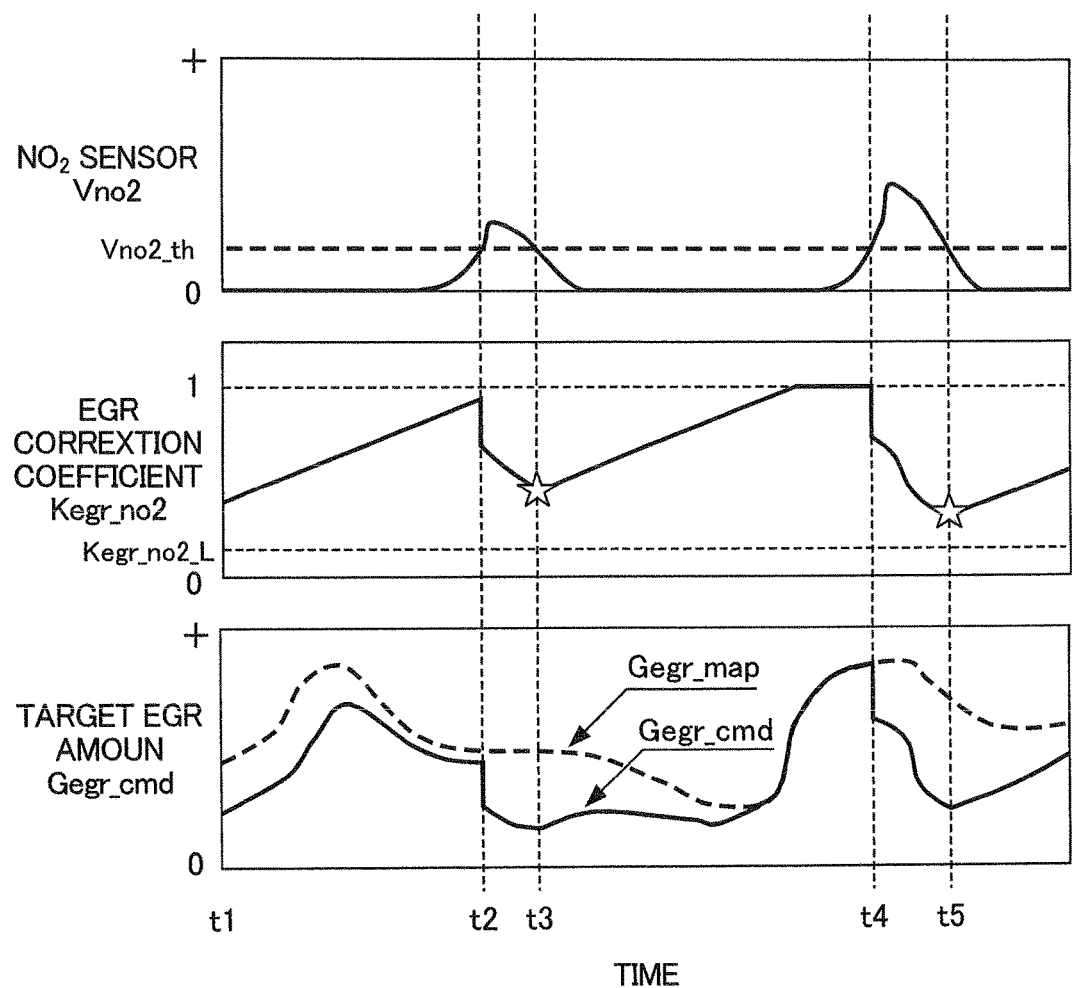
FIG. 7 provides time charts showing the changes in the output value of the $NO_2$ sensor, EGR correction coefficient, and target EGR amount in a case of operating the $NO_2$-NOx ratio controller in $NO_2$ feedback mode.

FIG. 7 provides time charts showing the changes in the output value Vno2 of the $NO_2$ sensor, EGR correction coefficient Kegr_no2, and target EGR amount Gegr_cmd in a case of operating the $NO_2$-NOx ratio controller in $NO_2$ sensor feedback mode defined by the above formulas (5) to (8).

During the time t1 until t2, the output value Vno2 of the $NO_2$ sensor is no more than the $NO_2$ detection threshold Vno2_th. In this case, the EGR correction coefficient Kegr_no2 incrementally increases by the return amount Dkegr_INC set by formula (6) towards the upper limit. The target EGR amount Gegr_cmd thereby gently increases so as to approach the map value Gegr_map, a result of which the NO amount discharged from the engine gently decreases compared to a case of not causing the EGR correction coefficient Kegr_no2 to increase.

Next, at time t2, the output value Vno2 of the $NO_2$ sensor exceeds the $NO_2$ detection threshold Vno2_th. At this moment, the EGR correction coefficient Kegr_no2 decreases by the initial decrement Dkegr_DEC set by formula (6). The target EGR amount Gegr_cmd is thereby instantly changed to a smaller value so as to deviate from the map value Gegr_map. Subsequently, from time t2 until time t3 when the output value Vno2 of the $NO_2$ sensor falls below the $NO_2$ detection threshold Vno2_th, the EGR correction coefficient Kegr_no2 incrementally decreases by an amount proportional to the output deviation E_Vno2, as shown in formula (7). The target EGR amount Gegrcmd thereby decreases more so as to deviate from the map value Gegr_map, a result of which the NO amount discharged from the engine gently increases compared to a case of not having decreased the EGR correction coefficient Kegr_no2.

During time t3 to t4, and from t5 and onward, the output value Vno2 of the $NO_2$ sensor is no more than the $NO_2$ detection threshold Vno2_th. Therefore, the EGR correction coefficient Kegr_no2 and the target EGR amount Gegr_cmd in this interval show qualitatively the same behavior as between the above-mentioned times t1 to t2, and thus a detailed explanation thereof will be omitted. In addition, between times t4 and t5, the output value Vno2 of the $NO_2$ sensor is greater than the $NO_2$ detection threshold Vno2_th. Therefore, in this interval, the EGR correction coefficient Kegr_no2 and the target EGR amount Gegr_cmd show qualitatively the same behavior as between the above-mentioned times t2 to t3, and thus a detailed explanation thereof will be omitted.

Next, the effects due to executing processing (times t2 to t3, and t4 to t5 in FIG. 7) to cause the target EGR amount Gegr_cmd to decrease so as to deviate from the map value Gegr_map in response to the output deviation E_Vno2 having become a positive value will be explained while referring to FIG. 8.

Figure 8:
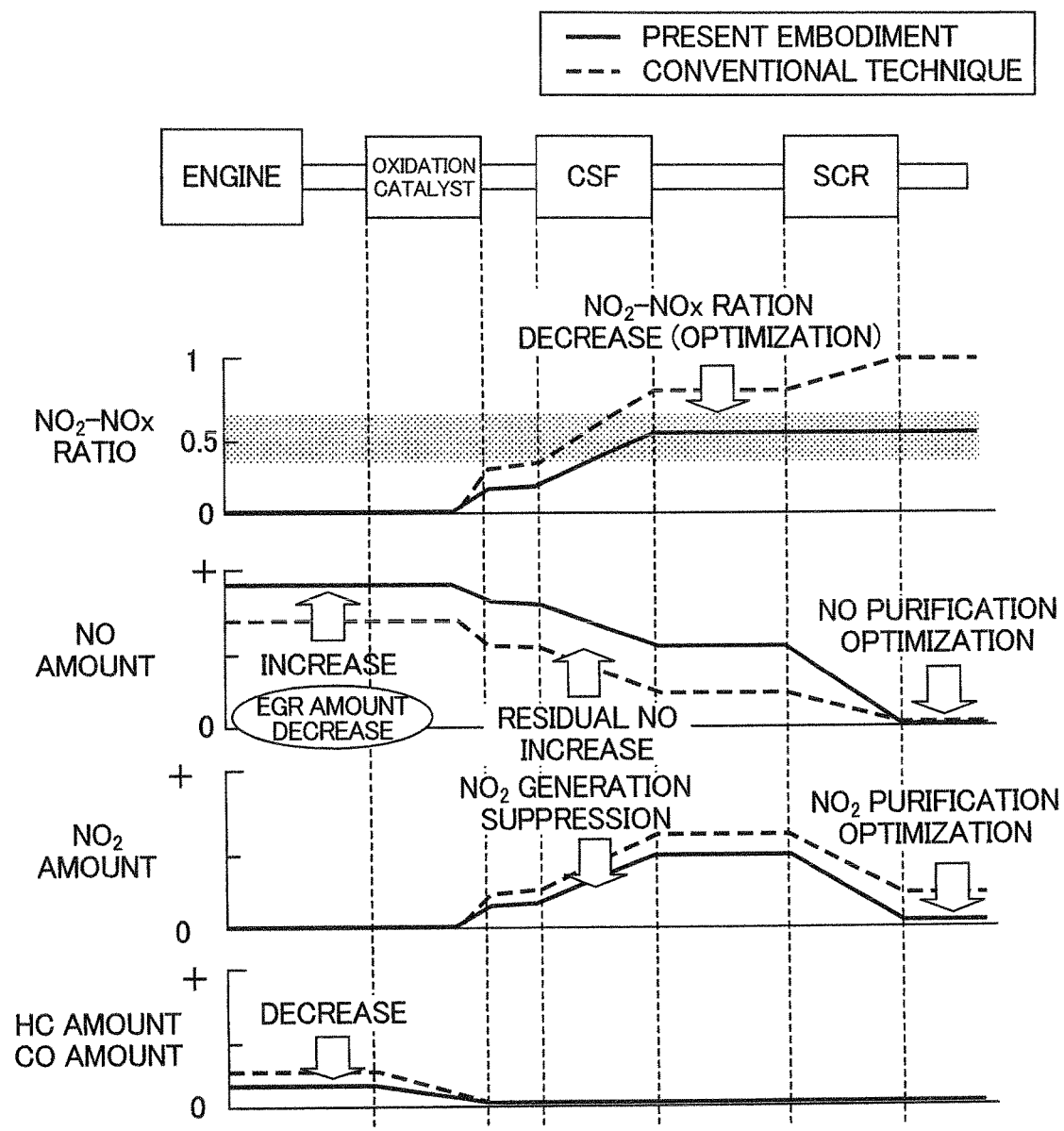
FIG. 8 provides graphs showing the $NO_2$-NOx ratio, NO amount, $NO_2$ amount, HC amount and CO amount in each part of the exhaust plumbing.

FIG. 8 provides graphs showing the $NO_2$-NOx ratio, NO amount, $NO_2$ amount, HC amount and CO amount in each part of the exhaust plumbing. The dotted lines in FIG. 8 show an example of a conventional technique that continues to use the map value Gegr_map as the target EGR amount Gegr_cmd, and the solid lines show an example of the present embodiment in which the target EGR amount Gegr_cmd is made to decrease so as to deviate from the map value Gegr_map in response to the output deviation E_Vno2 having become a positive value.

First, in the conventional technique shown by the dotted lines, if an $NO_2$ excessive state is entered in which the $NO_2$-NOx ratio of the exhaust flowing into the selective reduction catalyst greatly exceeds the optimum value near 0.5, the $NO_2$ that has not been purified will be discharged to the downstream side of the selective reduction catalyst.

In contrast, with the present embodiment, in a case of the output deviation E_Vno2 becoming a positive value and entering an $NO_2$ excessive state, the EGR amount is made to decrease by causing the target EGR amount Gegr_cmd to decrease so as to deviate from the map value Gegr_map. When the EGR amount decreases, the NO amount discharged from the engine (hereinafter referred to as "feed NO amount") increases compared to the conventional technique, the HC amount and CO amount discharged from the engine decrease, and the exhaust volume increases. It should be noted that the $NO_2$ amount discharged from the engine is quite insignificant compared to the feed NO amount, and does not change greatly with the EGR amount.

When the feed NO amount increases and the exhaust volume increases, the $NO_2$ generation efficiency declines first, without the CO and HC oxidation efficiencies of the oxidation catalyst and CSF changing, as described in the foregoing. Compared to the conventional technique, the NO amount (residual NO amount) flowing into the selective reduction catalyst on the downstream side remaining unoxidized by the oxidation catalyst and CSF thereby increases, and the $NO_2$ amount generated by the oxidation catalyst and CSF and flowing into the selective reduction catalyst declines.

As described in the foregoing, compared with the conventional technique in which the $NO_2$-NOx ratio greatly exceeds the optimum value near 0.5, the present embodiment can suppress both the NO amount and $NO_2$ amount discharged from the selective reduction catalyst as a result of causing the $NO_2$-NOx ratio of the exhaust flowing into the selective reduction catalyst to decrease towards the optimum value near 0.5, by increasing the NO amount flowing into the selective reduction catalyst to cause the $NO_2$ amount to decline.

It should be noted that, although the $NO_2$-NOx ratio of the exhaust flowing into the selective reduction catalyst is made to decrease towards the optimum value by causing the EGR amount to decrease in the present embodiment, the method of decreasing the $NO_2$-NOx ratio is not limited to only adjustment of the EGR amount. As shown in FIG. 8, the $NO_2$-NOx ratio may be made to decrease by setting a combustion parameter correlated to the combustion state of the engine so that the declining effect on the $NO_2$ generation efficiency of the oxidation catalyst and CSF caused by the NOx amount discharged from the engine increasing becomes greater than the raising effect on the $NO_2$ generation efficiency on the oxidation catalyst and CSF caused by the HC amount and CO amount discharged from the engine decreasing. It should be noted that the fuel injection amount, fuel injection timing, boost pressure, EGR amount, and the like can be exemplified as the combustion parameter, for example.

Next, the setting strategy for the initial decrement Dkegr_DEC and return amount Dkegr_INC in the above formula (6) will be explained while referring to FIG. 9.

Figure 9:
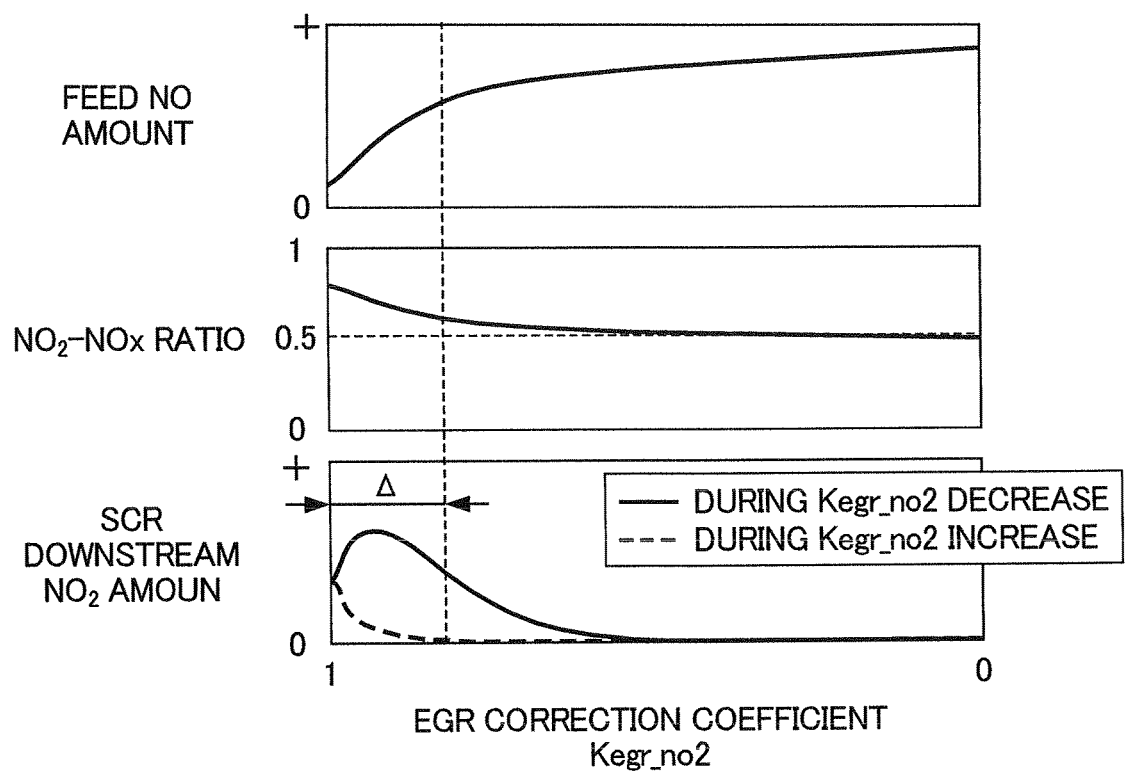
FIG. 9 provides graphs showing the change in feed NO amount, $NO_2$-NOx ratio, and $NO_2$ amount on the downstream side of the selective reduction catalyst in a case of decreasing and in a case of increasing the EGR correction coefficient.

FIG. 9 provides graphs showing the change in feed NO amount, $NO_2$-NOx ratio of exhaust flowing into the selective reduction catalyst, and $NO_2$ amount on the downstream side of the selective reduction catalyst in a case of decreasing the EGR correction coefficient Kegr_no2 from "1" to "0" or in a case of increasing from "0" to "1". The solid line in FIG. 9 shows the time of decreasing the EGR correction coefficient Kegr_no2, and the dotted line shows the time of increasing the EGR correction coefficient Kegr_no2.

There is a hysteresis characteristic such as that shown in FIG. 9 in the $NO_2$ amount on the downstream side of the selective reduction catalyst, i.e. in the $NO_2$ purification rate of the selective reduction catalyst.

For example, when the correction coefficient Kegr_no2 is made to decrease from "1" to "0" and the EGR amount is made to decrease, the feed NO amount increases, and accompanying this, the $NO_2$-NOx ratio of the exhaust flowing into the selective reduction catalyst declines towards 0.5 and the NOx purification rate of the selective reduction catalyst rises.

However, while the correction coefficient Kegr_no2 is made to change from "1" to "0", the declining effect on the NOx purification rate due to the feed NO amount increasing will overpower the raising effect on the NOx purification rate of the selective reduction catalyst in the region indicated by in FIG. 9, a result of which the $NO_2$ amount on the downstream side of the selective reduction catalyst temporarily increases.

In contrast, in a case of causing the correction coefficient Kegr_no2 to increase from "0" to "1", the $NO_2$ amount on the downstream side of the selective reduction catalyst displays qualitatively different behavior from the above-mentioned time of decreasing as shown by the dotted line in FIG. 9. In other words, in the time of increasing the correction coefficient Kegr_no2, the $NO_2$ amount on the downstream side of the selective reduction catalyst does not temporarily increase as in the time of decreasing, even upon the elapsing of the above-mentioned region Δ. This is considered to be because the effective $NO_2$-NOx ratio for the selective reduction catalyst is kept in the vicinity of 0.5 despite the $NO_2$-NOx ratio of the exhaust flowing into the selective reduction catalyst becoming greater than 0.5 upon elapsing of the region Δ, due to the NO storage effect or the $NO_2$ storage effect occurring in the selective reduction catalyst by some mechanism.

The initial decrement Dkegr_DEC and return amount Dkegr_INC are preferably set as follows so that the $NO_2$ purification rate is maintained to be high in the selective reduction catalyst having the above such hysteresis characteristic relative to the correction coefficient Kegr_no2 in either the time of decreasing or the time of increasing the correction coefficient Kegr_no2.

In other words, the initial decrement Dkegr_DEC is set to a value such that it is possible for the region Δ in which the $NO_2$ purification rate temporarily deteriorates to instantaneously pass since the $NO_2$ purification rate is prevented from temporarily deteriorating when the correction coefficient Kegr_no2 is made to decrease.

It is preferable to make the correction coefficient Kegr_no2 to gently increase over a long time compared to the above-mentioned time of decreasing so that the aforementioned NO storage effect or $NO_2$ storage effect is reliably exerted when the correction coefficient Kegr_no2 is made to increase. As a result, the return amount Dkegr_INC is set to a value such that the increase in the correction coefficient Kegr_no2 is gentle.

It should be noted that, although the initial decrement Dkegr_DEC and return amount Dkegr_INC are set to fixed values in the present embodiment as described in the foregoing, they are not limited thereto, and may be made to vary depending on the engine revolution speed or load, temperature of the exhaust system, NOx amount on the upstream side of the selective reduction catalyst, or the like.

Catalyst Degradation Determination Mode Referring back to FIG. 5, the $NO_2$-NOx ratio controller 31 decides the catalyst degradation determination value DET_SCR_AGD indicating the degree of degradation of the selective reduction catalyst 23 in the catalyst degradation determination mode.

More specifically, in the catalyst degradation determination mode, the EGR correction coefficient Kegr_no2 is made to change based on the following formulas (9) and (10), along with a degradation determination parameter J_SCR being updated according to the following formula (11) using the EGR correction coefficient Kegr_no2 and the output value Vno2 of the $NO_2$ sensor at this time, and the catalyst degradation determination value DET_SCR_AGR is decided in accordance with the magnitude of this degradation determination parameter J_SCR.

Figure 10:
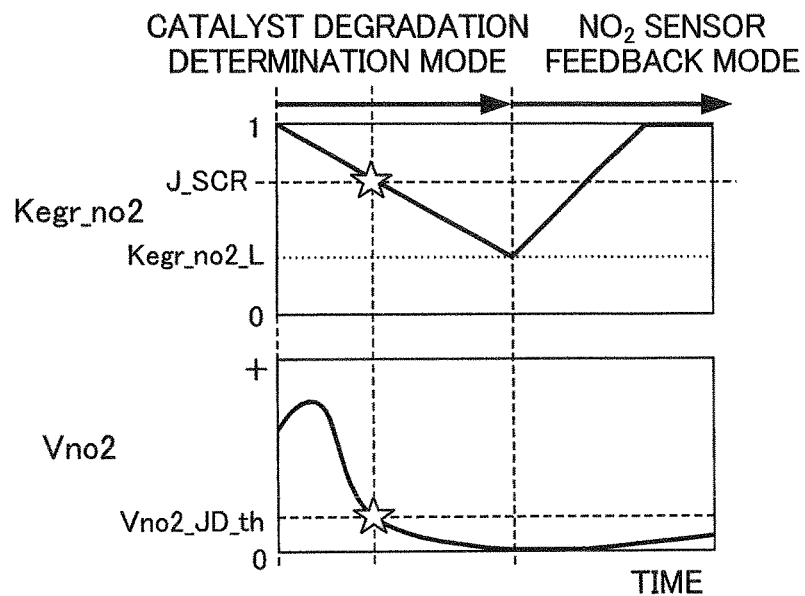
FIG. 10 provides graphs showing the change in the EGR correction coefficient and output value of the $NO_2$ sensor during execution of catalyst degradation determination mode.

FIG. 10 provides graphs showing the change in EGR correction coefficient Kegr_no2 and the output value Vno2 of the $NO_2$ sensor during execution of the catalyst degradation determination mode.

As shown in the following formulas (9) and (10), in the catalyst degradation determination mode, the initial value Kegr_no2_temp (0) is set to "1", from which a decrement Dkegr_JD_DEC (<0) is incrementally added, whereby the EGR correction coefficient Kegr_no2 is made to decrease from "1" until the lower limit Kegr_no2_L.

$$\text{Kegr\_no2\_temp}(k) = \text{Kegr\_no2\_temp}(k-1) + \text{Dkegr\_JD\_DEC} \quad (9)$$

$$\text{Kegr\_no2}(k) = \begin{cases} \text{Kegr\_no2\_temp}(k) & (\text{Kegr\_no2\_temp}(k) > \text{Kegr\_no2\_L}) \\ \text{Kegr\_no2\_L} & (\text{Kegr\_no2\_temp}(k) \leq \text{Kegr\_no2\_L}) \end{cases} \quad (10)$$

When the EGR correction coefficient Kegr_no2 is made to decrease from "1" in this way, the feed NO amount increases from the $NO_2$ excessive state, and the $NO_2$-NOx ratio of the exhaust flowing into the selective reduction catalyst gently approaches the optimum value, and the $NO_2$ amount on the downstream side of the selective reduction catalyst decreases after momentarily increasing, as explained while referring to FIG. 9.

On the other hand, when the degradation of the selective reduction catalyst progresses, the decline in the NOx purification rate also increases in response to the shift from the optimum value of the $NO_2$-NOx ratio, as explained while referring to FIG. 4. Therefore, when continuing to cause the EGR correction coefficient Kegr_no2 to decrease from "1" from the $NO_2$ excessive state to cause the feed NO amount to increase, the timing at which the output value Vno2 of the $NO_2$ sensor falls below the predetermined degradation determination threshold Vno2_JD_th is considered to be delayed accompanying the degradation of the selective reduction catalyst advancing.

Therefore, in this catalyst degradation determination mode, the degradation determination parameter J_SCR is fixed at a value of the EGR correction coefficient Kegr_no2 when the output value Vno2 of the $NO_2$ sensor falls below the degradation determination threshold Vno2_JD_th, as shown by the following formula (11).

$$J\_SCR(k) = \begin{cases} Kegr\_no2(k) & \begin{pmatrix} Vno2(k) < Vno2\_JD\_th \text{ and} \\ Vno2(k) \geq Vno2\_JD\_th \end{pmatrix} \\ J\_SCR(k-1) & \text{(other)} \end{cases} \quad (11)$$

The degradation determination parameter J_SCR obtained in this way is considered to decrease accompanying the degradation of the selective reduction catalyst advancing; therefore, the catalyst degradation determination value DET_SCR_AGD indicating the degree of degradation of the selective reduction catalyst is decided by comparing between the degradation determination parameter J_SCR and a predetermined threshold J_SCR_AGD, as shown in the following formula (12). In other words, in a case of J_SCR being "1", the catalyst degradation determination value DET_SCR_AGD is set to "1", meaning that the selective reduction catalyst is essentially a new article. In a case of J_SCR being smaller than 1 and at least the threshold J_SCR_AGD, the catalyst degradation determination value DET_SCR_AGD is set to "2", meaning that the selective reduction catalyst is normal without substantial degradation. In a case of J_SCR being less than the threshold J_SCR_AGD, the catalyst degradation determination value DET_SCR_AGD is set to "3", meaning that the selective reduction catalyst is in a state in which degradation thereof has progressed. It should be noted that the initial value of the catalyst degradation determination value DET_SCR_AGD is established as "0".

$$DET\_SCR\_AGD(k) = \qquad (12)$$
$$\begin{cases} 1 \text{ (new article)} & (J\_SCR(k) = 1) \\ 2 \text{ (normal article)} & (J\_SCR\_AGD \leq J\_SCR(k) < 1) \\ 3 \text{ (degraded article)} & (J\_SCR(k) < J\_SCR\_AGD) \end{cases}$$

Figure 11:
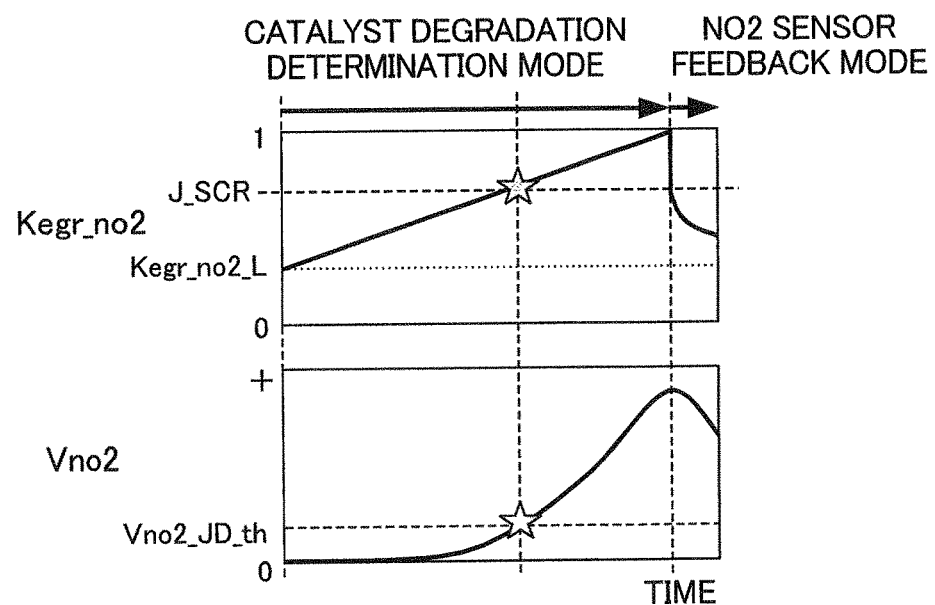
FIG. 11 provides graphs showing the change in the EGR correction coefficient and the output value of the $NO_2$ sensor during execution of the catalyst degradation determination mode.

In addition to determining the degree of degradation by reducing the EGR correction coefficient Kegr_no2 as shown in the above formulas (9) to (12), the degree of degradation can also conversely be determined by increasing the EGR correction coefficient Kegr_no2, as shown in FIG. 11 and the following formulas (13) to (16).

In this case, as shown in the following formulas (13) and (14), the initial value Kegr_no2_temp(0) is set to the lower limit Kegr_no2_L, from which an increment DKegr_JD_INC (>0) is incrementally added, whereby the EGR correction coefficient Kegr_no2 is made to increase from the lower limit Kegr_no2_L until "1".

$$Kegr\_no2\_temp(k) = Kegr\_no2\_temp(k-1) + Dkegr\_JR\_INC \qquad (13)$$

$$Kegr\_no2(k) = \begin{cases} Kegr\_no2\_temp(k) & (Kegr\_no2\_temp(k) < 1) \\ 1 & (Kegr\_no2\_temp(k) \geq 1) \end{cases} \qquad (14)$$

Then, as shown in the following formula (15), the degradation determination parameter J_SCR is fixed at the value of the EGR correction coefficient Kegr_no2 when the output value Vno2 of the $NO_2$ sensor exceeds the degradation determination threshold Vno2_JD_th, and the catalyst degradation determination value DET_SCR_AGD is decided by comparing between this degradation determination parameter J_SCR and the threshold J_SCR_AGD, as shown in the following formula (16).

$$J\_SCR(k) = \begin{cases} Kegr\_no2(k) & \begin{pmatrix} Vno2(k) > Vno2\_JD\_th \text{ and} \\ Vno2(k) \leq Vno2\_JD\_th \end{pmatrix} \\ J\_SCR(k-1) & \text{(other)} \end{cases} \quad (15)$$

$$DET\_SCR\_AGD(k) = \qquad (16)$$
$$\begin{cases} 1 \text{ (new article)} & (J\_SCR(k) = 1) \\ 2 \text{ (normal article)} & (J\_SCR\_AGD \leq J\_SCR(k) < 1) \\ 3 \text{ (degraded article)} & (J\_SCR(k) < J\_SCR\_AGD) \end{cases}$$

It should be noted that, in a case of determining the degree of degradation by causing the EGR correction coefficient Kegr_no2 to increase according to the above formulas (13) to (16), it is preferable for the absolute value of the increment DKegr_JD_INC to be set to a value sufficiently smaller than the absolute value of the decrement DKegr_JD_DEC in the above formula (9) to cause the EGR correction coefficient Kegr_no2 to gently increase, so that the storage effect explained while referring to FIG. 9 is reliably exerted.

Fuel Economy Priority Mode

Referring back to FIG. 5, in the fuel economy priority mode, the $NO_2$-NOx ratio controller 31 sets the EGR correction coefficient Kegr_no2 to a fuel economy EGR correction coefficient Kegr_no2_opt irrespective of the output value Vno2 of the $NO_2$ sensor so that the fuel economy improves more than during execution of the $NO_2$ feedback mode (refer to the following formula (17)).

$$Kegr\_no2(k) = Kegr\_no2\_opt \qquad (17)$$

In the case of a gasoline engine, there is basically a trend of the fuel economy improving with increasing EGR amount; therefore, this fuel economy EGR correction coefficient Kegr_no2_opt is set to a value close to "1", for example. On the other hand, in the case of a diesel engine, there is conversely a trend of the fuel economy increasing with a decrease in EGR amount; therefore, this fuel economy EGR correction coefficient Kegr_no2_opt is set to a value close to the lower limit Kegr_no2_L, for example.

$NO_2$ Generation priority mode

In the $NO_2$ generation priority mode, the $NO_2$-NOx ratio controller 31 sets the EGR correction coefficient Kegr_no2 to "1" as shown in the following formula (18), so that an abundance of $NO_2$ is generated by the oxidation catalyst 21 and CSF 22, and the $NO_2$ amount of the exhaust flowing into the selective reduction catalyst 23 increases.

$$Kegr\_no2(k)=1 \qquad (18)$$

As described in the foregoing, it is possible for the $NO_2$-NOx ratio controller to be made to operate in the four types of different control modes of the $NO_2$ sensor feedback mode, the catalyst degradation determination mode, the fuel economy priority mode, and the $NO_2$ generation priority mode. Next, the preferred times for executing each mode will be explained.

First, as explained while referring to FIG. 4, in a case of the selective reduction catalyst being a new article, the NOx purification rate thereof is maintained to be high irrespective of the $NO_2$-NOx ratio. As a result, the NOx purification rate of the selective reduction catalyst is high despite not precisely controlling the $NO_2$-NOx ratio to the optimum value thereof, and the effect of $NO_2$ sensor feedback is small.

Therefore, in a case of the aforementioned catalyst degradation determination value DET_SCR_AGD being "1" and being able to determine that the selective reduction catalyst is not degrading, it is preferable to inhibit execution of the $NO_2$ sensor feedback mode and to execute the fuel economy priority mode (refer to the above formula (17)), thereby causing the fuel economy to improve more than during the execution of the $NO_2$ sensor feedback mode. In addition, in a case of the catalyst degradation determination value DET_SCR_AGD being "2" or "3", i.e. in a case of being able to determine that the degradation of the selective reduction catalyst has progressed to some extent, it is preferable to permit execution of the $NO_2$ sensor feedback mode.

In addition, it is preferable that, in a case of determining the degree of degradation of the oxidation catalyst and CSF and having determined that this degree of degradation is small, execution of the $NO_2$ sensor feedback mode is permitted, and in a case of having determined that the degree of degradation is large, execution of the $NO_2$ sensor feedback mode is inhibited and, for example, the $NO_2$ generation priority mode is executed. Herein, as a method of determining the degree of degradation of the oxidation catalyst and CSF, for example, a conventional known method is used such as one based on the measured values of the oxygen storage ability of this oxidation catalyst and CSF considered to decrease accompanying the progression of degradation. In addition, when the degree of degradation of the oxidation catalyst and CSF is small and the oxygen storage ability is large, the delay in an oxygen concentration change on the downstream side relative to an oxygen concentration change on the exhaust on the upstream side is considered to increase; therefore, this oxygen storage ability can be measured from the time lag in the outputs of air-fuel ratio sensors provided on the upstream side and the downstream side, for example. It should be noted that the determination of the degree of degradation based on this technique is not limited to a case in which the oxidation catalyst is a material having oxygen storage ability such as ceria (also called a three-way catalyst). In a case of setting the oxygen catalyst not having oxygen storage ability as the target, the event of the temperature rising rate of the oxygen catalyst during temperature rise control having declined during temperature rise control may be detected by comparing between a rising pattern of the oxidation catalyst temperature during temperature rise control immediately after engine startup and a reference pattern established in advance, and the degree of degradation may be determined based on this.

Figure 12:
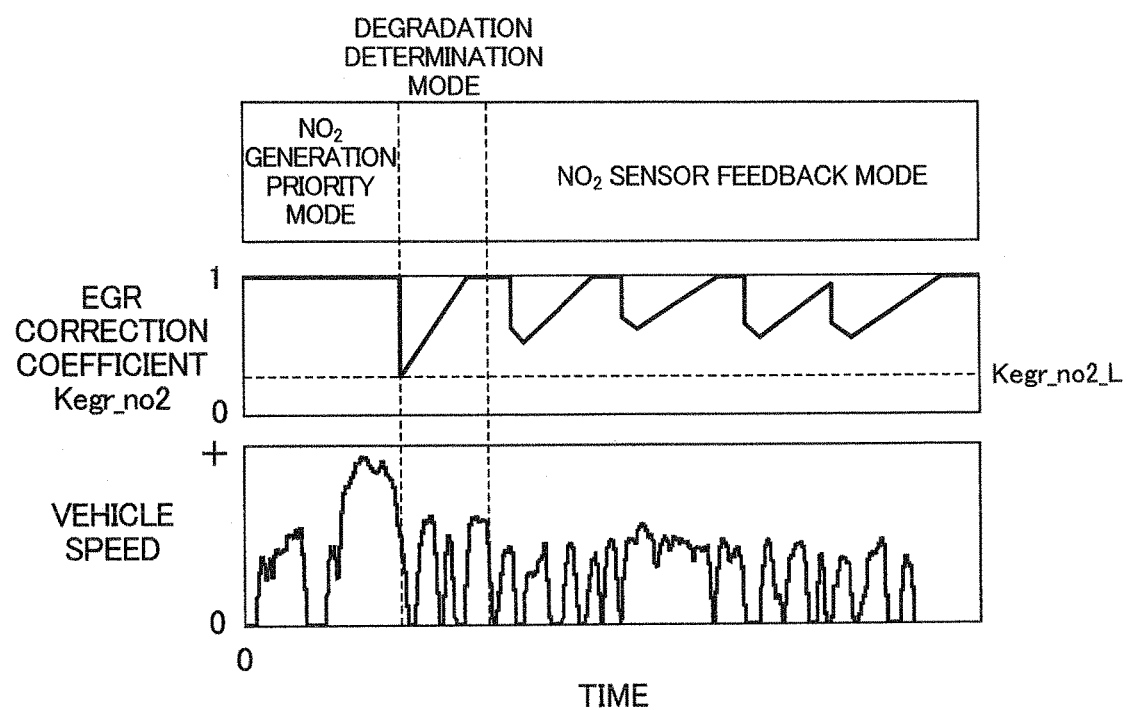
FIG. 12 provides time charts showing an example of a switching sequence of modes of the $NO_2$-NOx ratio controller.

FIG. 12 provides time charts showing an example of a switching sequence of modes in the $NO_2$-NOx ratio controller.

The example shown in FIG. 12 shows a case of starting the engine at time "0", followed by causing the $NO_2$-NOx ratio controller to operate in the order of $NO_2$ generation priority mode, catalyst degradation determination mode, and $NO_2$ sensor feedback mode.

As described in the foregoing, execution of the $NO_2$ sensor feedback mode is determined in accordance with the value of the catalyst degradation determination value DET_SCR_AGD; therefore, it is preferable to execute the catalyst degradation determination mode prior to determining execution of the $NO_2$ sensor feedback mode, and decide the catalyst degradation determination value DET_SCR_AGD, as shown in FIG. 12. However, it is unlikely that this catalyst degradation determination value DET_SCR_AGD will change frequently; therefore, it is not necessary to perform every time starting the engine. In this case, it may be determined to execute the $NO_2$ sensor feedback mode based on the previous execution results of the catalyst degradation determination mode, for example.

Figure 13:
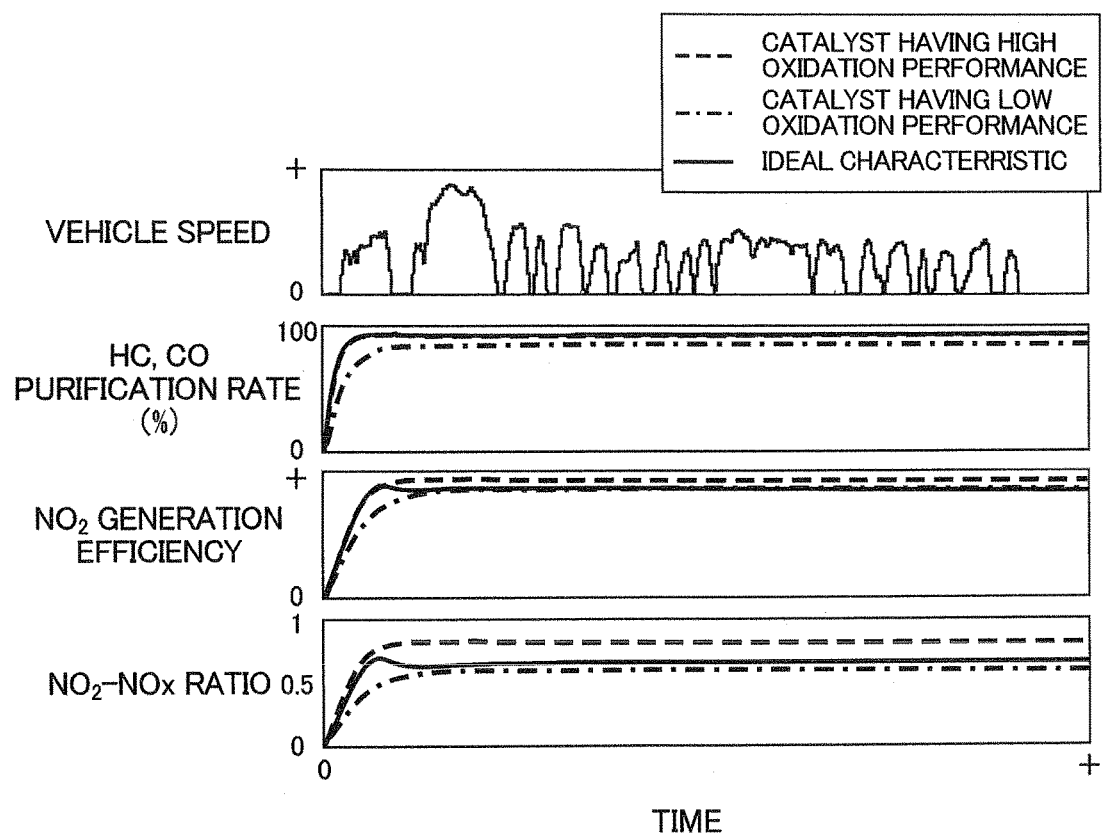
FIG. 13 provides graphs showing the changes in HC and CO purification rates of the oxidation catalyst, $NO_2$ generation efficiency of the oxidation catalyst, and $NO_2$-NOx ratio of exhaust flowing into the selective reduction catalyst of a vehicle while traveling.

FIG. 13 provides graphs showing the changes in HC and CO purification rates of the oxidation catalyst, $NO_2$ generation efficiency of the oxidation catalyst, and $NO_2$-NOx ratio of exhaust flowing into the selective reduction catalyst in a vehicle while driving. In FIG. 13, the dotted lines show a case of using an oxidation catalyst having high oxidation performance, and the one-dot dashed lines show a case of using an oxidation catalyst having low oxidation performance. In addition, the solid lines in FIG. 13 show the ideal characteristics that can efficiently purify all of HC, CO and NOx in the exhaust during warm up and over the period after warm up of the engine.

As shown in FIG. 13, in the case of using an oxidation catalyst having high oxidation performance, compared with the case of using an oxidation catalyst having low oxidation performance, the rise in the HC and CO purification rates during warm up immediately after starting the engine can be accelerated, and the CO and HC purification rates after warm up can also be increased. As a result, in order to raise the CO and HC purification rates, it is more preferable to use an oxidation catalyst having high oxidation performance. In other words, the characteristics of the HC and CO purification rates in the case of using an oxidation catalyst having high oxidation performance matches the above-mentioned ideal characteristics during warm up and over the period after warm up.

In addition, in the case of using an oxidation catalyst having high oxidation performance, the rise in $NO_2$ generation efficiency during warm up immediately after starting the engine can also be accelerated, and thus the $NO_2$-NOx ratio of exhaust flowing into the selective reduction catalyst can be made to quickly rise up to the optimum value near 0.5. Therefore, the characteristics of the $NO_2$ generation efficiency and the $NO_2$-NOx ratio in the case of using an oxidation catalyst having high oxidation performance matches the above-mentioned ideal characteristics during warm up.

However, in the case of using an oxidation catalyst having high oxidation performance, the $NO_2$ generation efficiency after warm up rise becomes too high, and the $NO_2$-NOx ratio will greatly exceed the optimum value near 0.5, a result of which the NOx purification rate will decline. Therefore, after warm up, the $NO_2$ generation efficiency and $NO_2$-NOx ratio are closer to the ideal characteristics when using the oxidation catalyst having low oxidation performance.

As described in the foregoing, even if using an oxidation catalyst having high oxidation performance, or using an oxidation catalyst having low oxidation performance, it is not possible to make both the HC and CO purification rates and the $NO_2$ generation efficiency match the ideal characteristics indicated by the solid lines; therefore, it is considered difficult to efficiently purify all of HC, CO and NOx during warm up immediately after starting the engine and over the period after warm up, by simply changing the specifications such as the noble metal loading amount, cell density, volume, and noble metal composition of the oxidation catalyst to adjust the oxidation performance thereof.

Therefore, in the present embodiment, during the period from beginning start up of the engine until a predetermined time has elapsed (during warm up), execution of the $NO_2$ sensor feedback mode is inhibited, and the $NO_2$ generation priority mode is executed in place thereof, as shown in FIG. 12. In other words, during warm up, the $NO_2$ generation priority mode is executed to quickly raise the HC and CO purification rates as well as the $NO_2$ generation efficiency. Then, after a predetermined time has elapsed since beginning start up of the engine (after warm up), execution of the $NO_2$ sensor feedback mode is permitted, the $NO_2$-NOx ratio is maintained at the optimum value near 0.5, and the HC and CO purification rates as well as the NOx purification rate are maintained to be high.

Furthermore, in addition to during warm up immediately after start up of the engine as described in the foregoing, execution of the $NO_2$ sensor feedback mode may be inhibited and the $NO_2$ generation priority mode may be similarly executed also in the case of the temperature of the oxidation catalyst being less than the activation temperature thereof, and execution of the $NO_2$ sensor feedback mode may be permitted in the case of the temperature of the oxidation catalyst being at least the activation temperature thereof.

Figure 14:
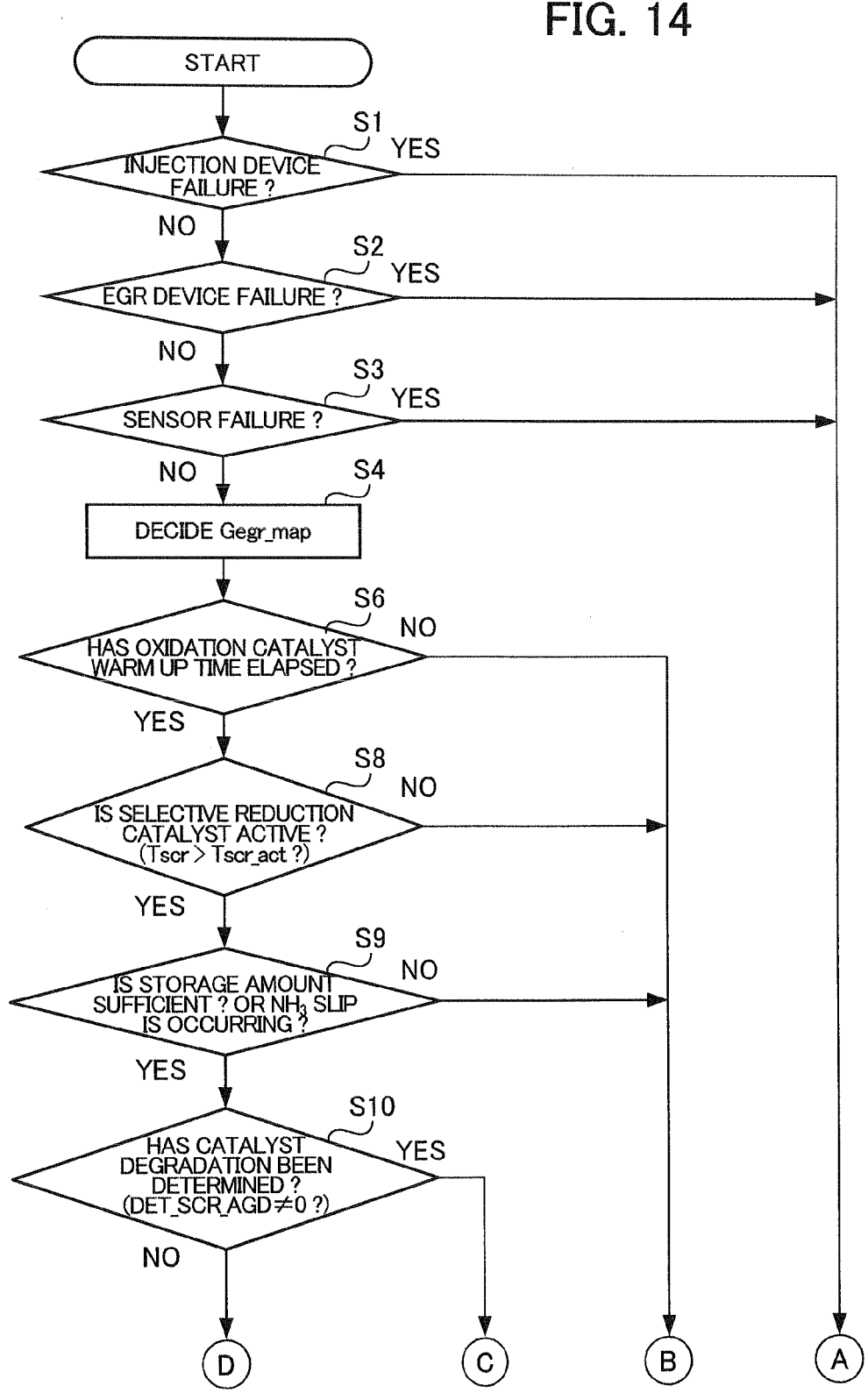
FIG. 14 is a flowchart showing a sequence for determining a target EGR amount.
Figure 15:
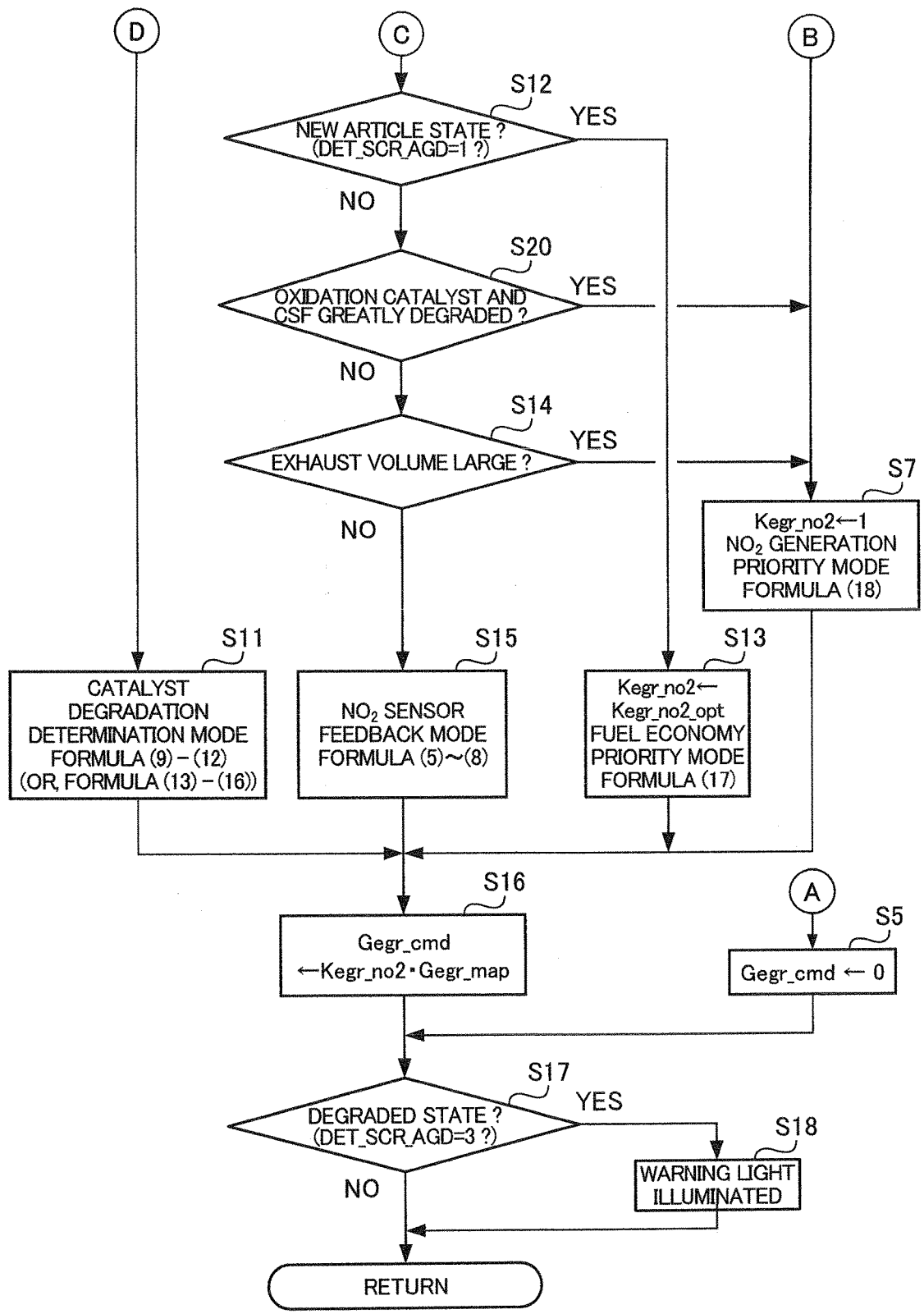
FIG. 15 is a flowchart showing a sequence for determining a target EGR amount.

FIGS. 14 and 15 are flowcharts showing sequences of deciding the target EGR amount Gegr_cmd by way of the ECU configured as described in the foregoing.

First, in Step S1, it is determined whether the urea water injection device is in a failure state. In the case of this determination being NO and the urea water injection device being in a normal state, the processing advances to Step S2. In Step S2, it is determined whether the high-pressure EGR device is in a failure state. In the case of this determination being NO and the high-pressure EGR device being in a normal state, the processing advances to Step S3. In Step S3, it is determined whether various sensors such as the $NH_3$ sensor, temperature sensor and $NO_2$ sensor are in a failure state. In the case of this determination being NO and the above-mentioned sensors all being normal, the processing advances to Step S4. In addition, in the case of having determined YES in any of these Steps S1 to S3, i.e. in a case of having determined any one among the urea water injection device, high-pressure EGR device and the above-mentioned sensors being in a failure state, the processing advances to Step S5, the target EGR amount Gegr_cmd is forcibly set to "0", and then the processing advances to Step S17.

In Step S4, the reference EGR amount Gegr_map is decided by searching a map established in advance, based on parameters such as the engine revolution speed and the demanded engine load, and then the processing advances to Step S6.

In Step S6, it is determined whether a predetermined warm-up time, which is set in order to warm up the oxidation catalyst to the activation temperature, has elapsed since starting the engine. In the case of this determination being NO and being during warm up, the processing advances to Step S7.

In Step S7, the EGR correction coefficient Kegr_no2 is decided in the $NO_2$ generation priority mode, and then the processing advances to Step S16. In the $NO_2$ generation priority mode, the EGR correction coefficient Kegr_no2 is set to "1" (refer to the above formula (18)), a result of which the map value Gegr_map is used as the target EGR amount Gegr_cmd.

In the case of the determination in Step S6 being YES and being after warm up, it is determined whether the selective reduction catalyst is in an active state. More specifically, it is determined whether the temperature Tscr of the selective reduction catalyst is higher than the threshold Tscr_act (e.g., 250° C.) established in order to determine the activation state thereof. Also in the case of the determined in Step S8 being NO and the selective reduction catalyst not being in an active state, the processing advances to Step S7, and similarly to during warm up as described above, the EGR correction coefficient Kegr_no2 is decided in the $NO_2$ generation priority mode.

In the case of the determination in Step S8 being YES and the selective reduction catalyst being in an active state, the processing advances to Step S9, and it is determined whether the storage amount of the selective reduction catalyst is sufficient, or whether in a state in which $NH_3$ slip occurs. More specifically, whether or not the storage amount is sufficient can be determined by whether or not the proportion of the estimated value of the storage amount relative to the estimated value of the maximum storage capacity is a predetermined value (e.g., 20% or higher). In addition, whether or not in a state in which $NH_3$ slip occurs is determined by whether the output value Vnh3 of the $NH_3$ sensor is at least a predetermined threshold. Also in the case of the determination in Step S9 being NO and the NOx purification performance of the selective reduction catalyst not being sufficient, the processing advances to Step S7, and similarly the during warm up as described above, the EGR correction coefficient Kegr_no2 is decided in the $NO_2$ generation priority mode.

In the case of the determination in Step S9 being YES and the NOx purification performance of the selective reduction catalyst is sufficient, the processing advances to Step S10, and it is determined whether the degree of degradation of the selective reduction catalyst has been determined. More specifically, it can be determined by whether or not the value of the aforementioned catalyst degradation determination value DET_SCR_AGD is other than the initial value "0", which indicates that the catalyst degradation determination mode is unexecuted.

In the case of the determination in Step S10 being NO and still not having determined the degree of degradation of the selective reduction catalyst since starting the engine, the processing advances to Step 511, the EGR correction coefficient Kegr_no2 and the catalyst degradation determination value DET_SCR_AGD are decided in the catalyst degradation determination mode, and then the processing advances to Step S16. More specifically, the EGR correction coefficient Kegr_no2 and the catalyst degradation determination value DET_SCR_AGD are decided based on the above formulas (9) to (12) (or formulas (13) to (16)).

In the case of the determination in Step S10 being YES and having determined the degree of degradation of the selective reduction catalyst, the processing advances to Step S12 to determine the degree thereof in further detail. Then, in Step S12, it is determined whether the selective reduction catalyst is in a new article state, i.e. whether the catalyst degradation determination value DET_SCR_AGD is "1". In the case that the determination in Step S12 is YES and the selective reduction catalyst is in a new article state, the processing advances to Step S13, the EGR correction coefficient Kegr_no2 is decided in the fuel economy priority mode, and then the processing advances to Step S16. In the fuel economy priority mode, the EGR correction coefficient Kegr_no2 is set to the fuel economy EGR correction coefficient Kegr_no2_opt (refer to the above formula (17)).

In the case of the determination in Step S12 being NO, and thus the selective reduction catalyst being in a state degraded at least to a certain extent, the processing advances to Step S20, the degree of degradation of the oxidation catalyst and CSF are determined, and it is determined whether or not this degree of degradation is large. In the case of the determination in Step S20 being YES and it being determined that the degree of degradation of the oxidation catalyst and CSF is large, execution of the $NO_2$ sensor feedback mode is inhibited, the processing advances to Step S7, and the EGR correction coefficient Kegt_no2 is decided in the $NO_2$ generation priority mode.

In the case of the determination in Step S20 being NO, and thus the degradation of the oxidation catalyst and CSF not having progressed significantly and the selective reduction catalyst being in a state having degradation at least to a certain extent, the processing advances to Step S14 to determine whether the current operating state of the engine is a state suited to allowing operation in the $NO_2$ sensor feedback mode. Then, in Step S14, it is determined whether it is a state in which the exhaust volume is large, for example. As explained while referring to FIG. 3, the $NO_2$ generation efficiency of the oxidation catalyst and CSF declines when the exhaust volume increases. Therefore, in the case of the determination in Step S14 being YES and being in a state in which the exhaust volume is large (high load operating state), the processing advances to Step S7 to prevent an excessive decline in the $NO_2$ generation efficiency, and the EGR correction coefficient Kegr_no2 is decided in the $NO_2$ generation priority mode.

In the case of the determination in Step S14 being YES and being a state in which the exhaust volume is small, the processing advances to Step S15, the EGR correction coefficient Kegr_no2 is decided in the $NO_2$ sensor feedback mode, and then the processing advances to Step S16. More specifically, the EGR correction coefficient Kegr_no2 is decided based on the above formulas (5) to (8).

In Step S16, the target EGR amount Gegr_cmd is decided by multiplying the EGR correction coefficient Kegr_no2 set in each mode by the map value Gegr_map, and then the processing advances to Step S17. In Step S17, it is determined whether the selective reduction catalyst is in a degraded state, i.e. whether the catalyst degradation determination value DET_SCR_AGD is "3". In the case of this determination being YES, the processing advances to Step S18 and after the catalyst degradation warning light has been illuminated, this processing ends; whereas, in the case of this determination being NO, this processing ends immediately.

Figure 16:
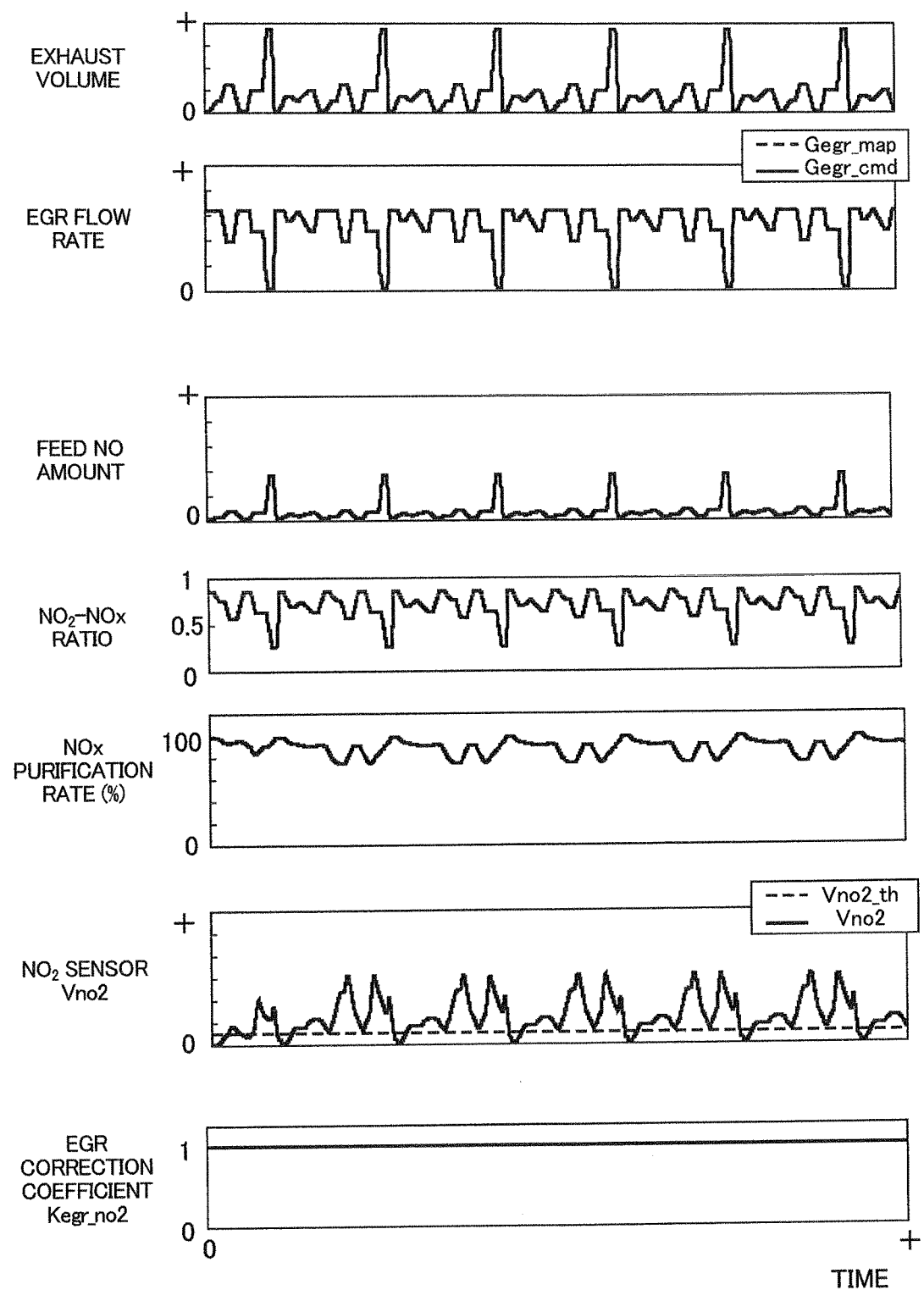
FIG. 16 provides simulation results for when the $NO_2$ sensor feedback mode is inactive.
Figure 17:
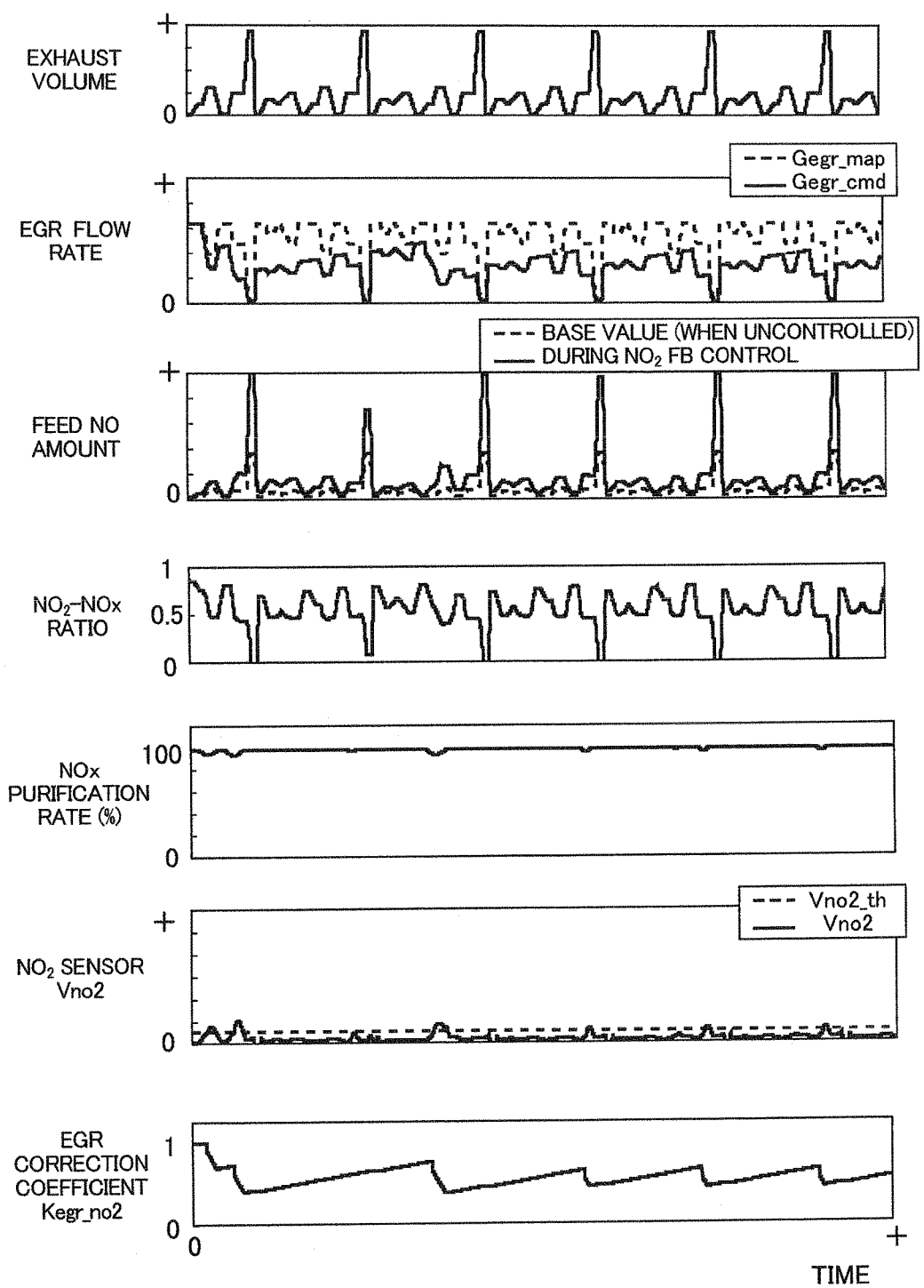
FIG. 17 provides simulation results for when the $NO_2$ sensor feedback mode is active.

Next, the effects of the $NO_2$ sensor feedback mode will be reviewed while referring to the simulation results shown in FIGS. 16 and 17.

FIG. 16 provides simulation results when the $NO_2$ sensor feedback mode is inactive, i.e. in a case of continuing to forcibly set the EGR correction coefficient Kegr_no2 to "1".

FIG. 17 provides simulation results when the $NO_2$ sensor feedback mode is active. From the top, FIGS. 16 and 17 each show the exhaust volume, the EGR amount, the feed NO amount, the $NO_2$-NOx ratio of the exhaust flowing into the selective reduction catalyst, the NOx purification rate of the selective reduction catalyst, the output value Vno2 of the $NO_2$ sensor, and the EGR correction coefficient Kegr_no2.

Since the EGR correction coefficient Kegr_no2 is continually set forcibly to "1" as shown in FIG. 16, the target EGR amount Gegr_cmd and the map value Gegr_map match. Accompanying intermittently bearing a high load on the engine, the exhaust volume and feed NO amount will increase at the same timing, a result of which the $NO_2$-NOx ratio of the exhaust flowing into the selective reduction catalyst intermittently transitions from a $NO_2$ excessive state larger than 0.5 to a NO excessive state less than 0.5; however, it becomes a $NO_2$ excessive state on average. As a result, the NOx purification rate of the selective reduction catalyst shifts to a lower value than the original maximum value, and $NO_2$ that has not been purified is intermittently discharged to the downstream side of the selective reduction catalyst despite the feed NO amount being small.

In contrast, as shown in FIG. 17, in the $NO_2$ sensor feedback mode, since the EGR correction coefficient Kegr_no2 is varied in a saw-blade shape between "1" and the lower limit based on the output value Vno2 of the $NO_2$ sensor, the target EGR amount Gegr_cmd is set to a value of no more than the map value Gegr_map. Therefore, the feed NO amount comes to be controlled to larger than the result shown in FIG. 16; however, as a result, the $NO_2$-NOx ratio of the exhaust flowing into the selective reduction catalyst shifts on average to near 0.5, which is the optimum value, and the NOx purification rate of the selective reduction catalyst is maintained to be high. As a result, compared with the results shown in FIG. 16, the $NO_2$ amount on the downstream side of the selective reduction catalyst is drastically suppressed, despite the feed NO amount being abundant. The effect of $NO_2$ sensor feedback mode has been verified based on the above.

Modified Example of First Embodiment

Next, a modified example of the above first embodiment will be explained.

In the above first embodiment, the catalyst degradation determination mode is established separately from the $NO_2$ sensor feedback mode, and the degree of degradation of the selective reduction catalyst is determined by causing the $NO_2$-NOx ratio controller to operate in this catalyst degradation determination mode. In contrast, the present modified example differs from the above first embodiment in the aspect of not specifically establishing a catalyst degradation determination mode in this way, and determining the degree of degradation based on the EGR correction coefficient Kegr_no2 while causing to operate in the $NO_2$ sensor feedback mode.

As described in the foregoing, in the $NO_2$ sensor feedback mode, the $NO_2$ excessive state is gradually established by causing the EGR correction coefficient Kegr_no2 to increase until $NO_2$ is detected by the $NO_2$ sensor, after which the EGR correction coefficient Kegr_no2 is made to decrease until $NO_2$ is no longer detected by the $NO_2$ sensor. On the other hand, when the degradation of the selective reduction catalyst progresses, the decline in the NOx purification rate also increases in response to the shift from the optimum value of the $NO_2$-NOx ratio. Therefore, for a selective reduction catalyst for which degradation has progressed, it is necessary to cause the EGR correction coefficient Kegr_no2 to drastically decrease until $NO_2$ is no longer detected by the $NO_2$ sensor, i.e. until the $NO_2$-NOx ratio approaches the optimum value and the NOx purification rate rises. In other words, for a selective reduction catalyst for which degradation has progressed, when the controller is made to operate in the NO$_2$ sensor feedback mode, the minimum value of the EGR correction coefficient Kegr_no2 (refer to the star in FIG. 7) is considered to decrease.

Due to this fact, in the present modified example, the degradation determination parameter J_SCR inversely proportional to the progression of the degree of degradation of the selective reduction catalyst is calculated by conducting statistical processing, such as that shown in the following formula (19), on the EGR correction coefficient Kegr_no2 at the time when the output value Vno2 of the NO$_2$ sensor falls below the degradation determination threshold Vno2_JD_th while the EGR correction coefficient Kegr_no2 is made to vary in the NO$_2$ feedback mode. Herein, a filtering coefficient Kjd_scr is set between "0" and "1", e.g., "0.995".

$$J\_SCR(k) = \begin{cases} Kjd\_scr \cdot J\_SCR(k-1) + \\ (1 - Kjd\_scr)Kegr\_no2(k) & \begin{pmatrix} Vno2(k) < Vno2\_JD\_th \text{ and} \\ Vno2(k-1) \geq Vno2\_JD\_th \end{pmatrix} \\ J\_SCR(k-1) & \text{(other)} \end{cases} \quad (19)$$

Then, the catalyst degradation determination value DET_SCR_AGD is decided as shown in the following formula (20), by comparing the degradation determination parameter J_SCR obtained in this way with the threshold J_SCR_AGD.

$$DET\_SCR\_AGD(k) = \begin{cases} 1 & \text{(new article)} & (J\_SCR(k) = 1) \\ 2 & \text{(normal article)} & (J\_SCR\_AGD \leq J\_SCR(k) < 1) \\ 3 & \text{(degraded article)} & (J\_SCR(k) < J\_SCR\_AGD) \end{cases} \quad (20)$$

Second Embodiment

Next, a second embodiment of the present invention will be explained while referring to the drawings. It should be noted that, in the following explanation, the same reference symbols will be assigned for the same configurations as the first embodiment, and explanations thereof will be omitted.

The first embodiment focuses on the order of precedence of the oxidation of NO in the oxidation catalyst and CSF being lower than CO and HC, as explained while referring to FIG. 3, and the NO$_2$-NOx ratio of the exhaust flowing into the selective reduction catalyst is controlled to near an appropriate value by varying the feed NO amount and exhaust volume. In contrast, the second embodiment focuses on the NO$_2$ generation efficiency of the oxidation catalyst and CSF changing also according to the oxygen concentration of the exhaust.

Figure 18:
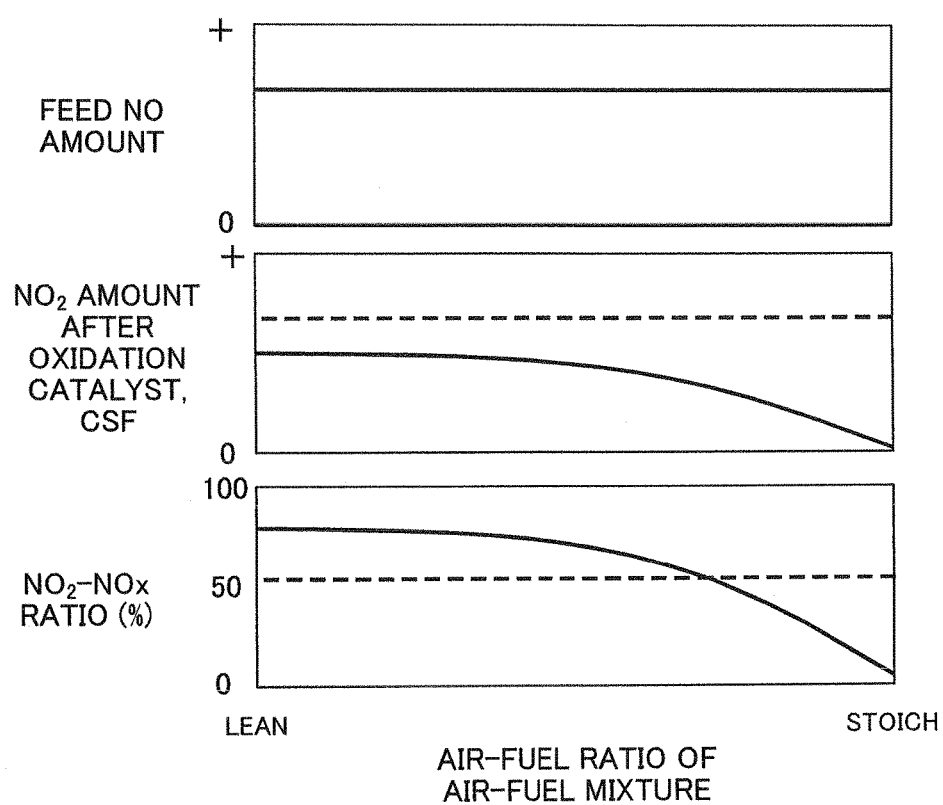
FIG. 18 provides graphs showing relationships between the air-fuel ratio of the air-fuel mixture, the $NO_2$ amount on the downstream side of the oxidation catalyst and CSF, and the $NO_2$-NOx ratio of exhaust flowing into the selective reduction catalyst.

FIG. 18 provides graphs showing relationships between the air-fuel ratio of the air-fuel mixture, the NO$_2$ amount on the downstream side of the oxidation catalyst and CSF, and the NO$_2$-NOx ratio of exhaust flowing into the selective reduction catalyst. It should be noted that FIG. 18 shows a case of the feed NO amount being made constant by appropriately adjusting a parameter unrelated to the air-fuel ratio of the air-fuel mixture, such as the fuel injection timing or the injection pattern.

As shown in FIG. 18, when the air-fuel ratio is made to change in the region on the leaner side of stoich from a leaner side to a richer side while the feed NO amount is kept constant, and the oxygen concentration of the exhaust flowing into the oxidation catalyst and CSF is thereby made to decline, the proportion of NO oxidized by the oxidation catalyst and CSF declines (i.e. the NO$_2$ generation efficiency declines), and the NO$_2$-NOx ratio declines. This means that it is possible to adjust the NO$_2$-NOx ratio of the exhaust flowing into the selective reduction catalyst by way of the air-fuel ratio of the air-fuel mixture, i.e. the oxygen concentration of the exhaust flowing into the oxidation catalyst and CSF.

Figure 19:
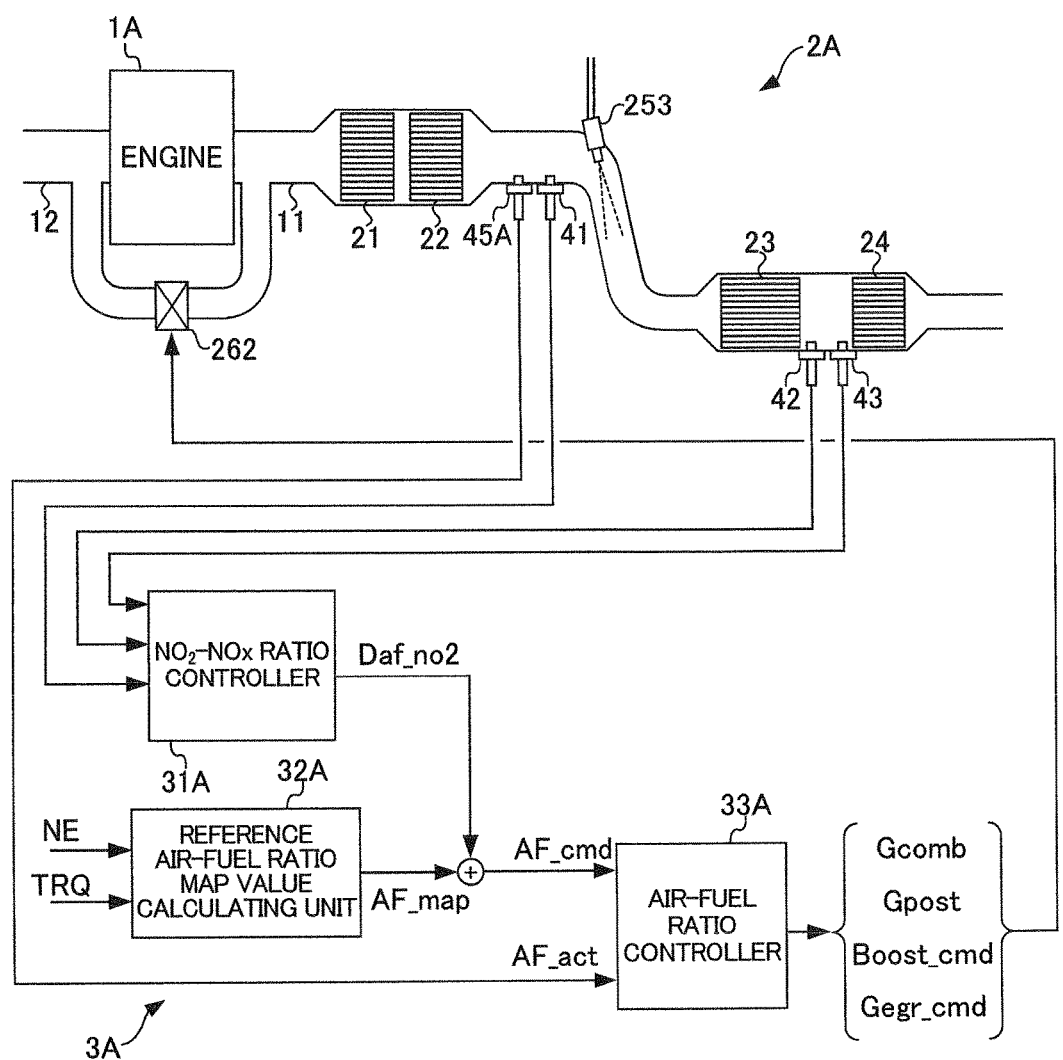
FIG. 19 is a block diagram showing configurations of an exhaust purification system of an engine and an ECU thereof according to a second embodiment of the present invention.

FIG. 19 is a block diagram showing the configurations of an exhaust purification system 2A of an engine 1A and an ECU 3A thereof according to the present embodiment established by focusing on the relationship between the air-fuel ratio of the air-fuel mixture and the NO$_2$-NOx ratio.

In order to detect the state of the exhaust purification system 2A, an oxygen concentration sensor 45A is connected to the ECU 3A. This oxygen concentration sensor 45A detects the oxygen concentration of the exhaust in the exhaust plumbing 11 on the downstream side of the oxidation catalyst 21 and CSF 22, i.e. air-fuel ratio of the exhaust, and supplies a signal AF_act substantially proportional to the detection value to the ECU 3A.

The adjustment method of the air-fuel ratio of the air-fuel mixture differs between gasoline engines and diesel engines.

In the case of a gasoline engine, it is possible to adjust the air-fuel ratio of the air-fuel mixture by varying the amount of new air by way of throttling.

In the case of a diesel engine equipped with a turbocharger, it is possible to adjust the air-fuel ratio of the air-fuel mixture by way of the EGR amount, the combustion fuel injection amount corresponding to a fuel injection amount related to the main injection and after injection, the post injection amount corresponding to the fuel injection amount related to post injection, the boost pressure, and the like. The main injection is fuel injection executed at a predetermined timing between the intake stroke and the expansion stroke, and the after injection is fuel injection executed after the above-mentioned main injection. The post injection is fuel injection executed at a predetermined timing between the expansion stroke and the intake stroke. For example, there is a trend of the air-fuel ratio of the air-fuel mixture being enriched when the EGR amount is made to increase, and conversely, the air-fuel ratio of the air-fuel mixture being leaned when the EGR amount is made to decrease. There is a trend of the air-fuel ratio of the air-fuel mixture being enriched when the after injection amount or post injection amount is made to increase, and conversely, the air-fuel ratio of the air-fuel mixture being leaned when made to decrease. In addition, since the combustion efficiency declines when the timings of main injection and after injection are retarded, it is necessary to make the combustion fuel injection amount increase in order to maintain the same engine output torque; therefore, there is a trend of the air-fuel ratio of the air-fuel mixture being enriched as a result, and conversely, the air-fuel ratio of the air-fuel mixture being leaned when advancing these timings.

In the following, an example will be explained in which the engine 1A is established as a diesel engine, and a combustion fuel injection amount Gcomb, post injection amount Gpost, target boost pressure Boost_cmd and target EGR amount Gegr_cmd are decided as parameters for adjusting the air-fuel ratio of the air-fuel mixture.

As shown in FIG. 19, the control block related to deciding the parameters (Gcomb, Gpost, Boost_cmd and Gegr_cmd) related to adjustment of the air-fuel ratio of the air-fuel mixture is configured to include a NO$_2$-NOx ratio controller 31A, reference air-fuel ratio map value calculating unit 32A, and air-fuel ratio controller 33A.

According to this control block, the target air-fuel ratio AF_cmd, which is a target value for the air-fuel ratio of exhaust on the downstream side of the oxidation catalyst 21 and CSF 22, is calculated by adding an air-fuel ratio correction coefficient Daf_no2 calculated by the $NO_2$-NOx ratio controller 31A to a reference target air-fuel ratio AF_map calculated by the reference air-fuel ratio map value calculating unit 32A. Then, the combustion fuel injection amount Gcomb, post injection amount Gpost, target boost pressure Boost_cmd, and target EGR amount Gegr_cmd are calculated by the air-fuel ratio controller 33A so that an output value AF_act of the oxygen concentration sensor 45A matches the above-mentioned target air-fuel ratio AF_cmd.

$$AF\_cmd(k) = AF\_map(k) + Daf\_no2(k) \quad (21)$$

The reference air-fuel ratio map value calculating unit 32A decides the reference target air-fuel ratio AF_map by searching a map established in advance, based on the engine revolution speed NE and demanded engine load TRQ. It should be noted that this map in the reference air-fuel ratio map value calculating unit 32A preferably takes account the balance of the fuel economy, soot amount, feed NOx amount, and the like, while setting so that the $NO_2$-NOx ratio of the exhaust flowing into the selective reduction catalyst is slightly $NO_2$ excessive, similarly to the first embodiment.

Similarly to the $NO_2$-NOx ratio controller 31 of the first embodiment, the $NO_2$-NOx ratio controller 31A operates in any of the following four types of control modes, and calculates the air-fuel ratio correction coefficient Daf_no2 for correcting the above-mentioned map value AF_map, based on different algorithms in each control mode.

1. $NO_2$ sensor feedback mode
2. catalyst degradation determination mode
3. fuel economy priority mode
4. $NO_2$ generation priority mode Hereinafter, a sequence of calculating the air-fuel ratio correction coefficient Daf_no2 according to these four control modes will be explained in order.

$NO_2$ Sensor Feedback Mode

In the $NO_2$ sensor feedback mode, the $NO_2$-NOx ratio controller 31A decides the air-fuel correction coefficient Daf_no2 based on the output value Vno2 of the $NO_2$ sensor so that the $NO_2$-NOx ratio of the exhaust flowing into the selective reduction catalyst is on average maintained near the optimum value thereof.

Similarly to the first embodiment, the present embodiment also calculates the air-fuel ratio correction coefficient Daf_no2 using the output deviation E_Vno2 defined by the following formula (22), based further on the following formulas (23), (24) and (25).

$$E\_Vno2(k) = \begin{cases} Vno2(k) - Vno2\_th & (Vno2(k) - Vno2\_th > 0) \\ 0 & (Vno2(k) - Vno2\_th \leq 0) \end{cases} \quad (22)$$

$$DDaf\_no2(k) = \begin{cases} DDaf\_DEC & (E\_Vno2(k) > 0 \text{ and } E\_Vno2(k-1) = 0) \\ DDaf\_INC & (E\_Vno2(k) = 0) \\ 0 & (\text{other}) \end{cases} \quad (23)$$

$$Daf\_no2\_temp(k) = \quad (24)$$
$$Daf\_no2(k-1) + Ki\_af\_no2 \cdot E\_Von2(k) + DDaf\_no2(k)$$

$$Daf\_no2(k) = \quad (25)$$
$$\begin{cases} 0 & (Daf\_no2\_L \geq 0) \\ Daf\_no2\_temp(k) & (Daf\_no2\_L < Daf\_no2\_temp(k) < 1) \\ Daf\_no2\_L & (Daf\_no2\_temp(k) \leq Daf\_no2\_L) \end{cases}$$

As shown in formula (25), with "0" as an upper limit and Daf_no2_L as a lower limit, the air-fuel ratio correction coefficient Daf_no2 is set between this upper limit and lower limit. A feedback gain Ki_af_no2 in formula (24) is set to a negative value. An initial decrement DDaf_DEC in formula (23) is set to a negative value, and a return amount DDaf_INC is set to a positive value.

Figure 20:
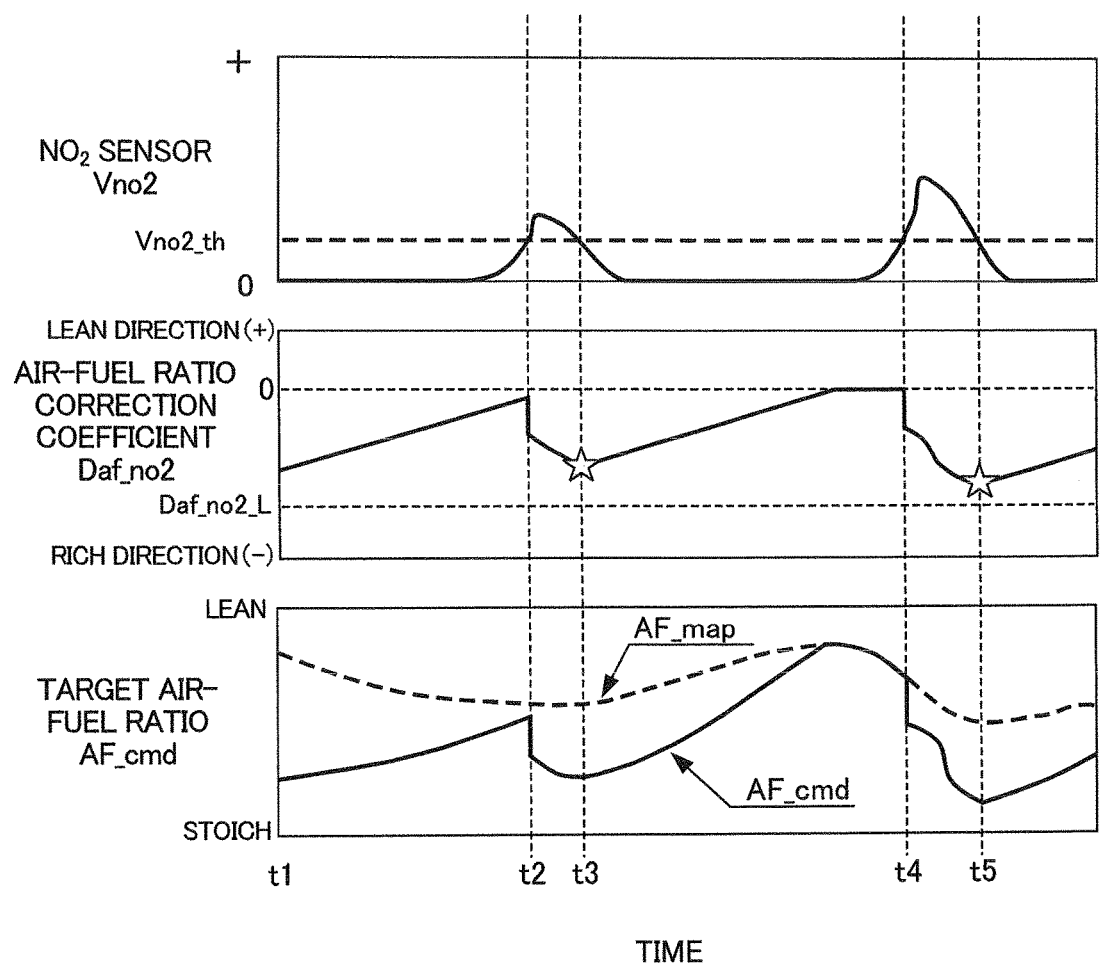
FIG. 20 provides time charts showing changes in the output value of the $NO_2$ sensor, air-fuel ratio correction coefficient, and target air-fuel ratio in a case of operating the $NO_2$-NOx ratio controller in $NO_2$ sensor feedback mode.

FIG. 20 provides time charts showing the changes in the output value Vno2 of the $NO_2$ sensor, air-fuel ratio correction coefficient Daf_no2, and target air-fuel ratio AF_cmd in a case of operating the $NO_2$-NOx ratio controller in $NO_2$ sensor feedback mode defined by the above formulas (22) to (25).

During the time t1 until t2, the output value Vno2 of the $NO_2$ sensor is no more than the $NO_2$ detection threshold Vno2_th. In this case, the air-fuel ratio correction coefficient Daf_no2 incrementally increases by the return amount DDaf_INC set by formula (23) towards the upper limit, and the target air-fuel ratio AF_cmd gradually increases so as to approach the map value AF_map. The air-fuel ratio of the air-fuel mixture is thereby changed to the leaner side, a result of which the oxygen concentration of the exhaust gradually rises compared to a case of not having increased the air-fuel ratio correction coefficient Daf_no2.

Next, at time t2, the output value Vno2 of the $NO_2$ sensor exceeds the $NO_2$ detection threshold Vno2_th. At this moment, the air-fuel ratio correction coefficient Daf_no2 decreases by the initial decrement DDaf_DEC set by formula (23). The target air-fuel ratio AF_cmd is thereby instantly changed to a smaller value so as to deviate from the map value AF_map. Subsequently, from time t2 until time t3 when the output value Vno2 of the $NO_2$ sensor falls below the $NO_2$ detection threshold Vno2_th, the air-fuel ratio correction coefficient Daf_no2 incrementally decreases by an amount proportional to the output deviation E_Vno2, as shown in formula (24). The target air-fuel ratio AF_cmd thereby further decreases so as to deviate from the map value AF_map. The air-fuel ratio of the air-fuel mixture is thereby changed to the richer side, a result of which the oxygen concentration of the exhaust gradually declines compares to a case of not having caused the air-fuel ratio correction coefficient Daf_no2 to decrease.

During time t3 to t4, and from t5 and onward, the output value Vno2 of the $NO_2$ sensor is no more than the $NO_2$ detection threshold Vno2_th. Therefore, the air-fuel ratio correction coefficient Daf_no2 and the target air-fuel ratio amount AF_cmd in this interval show qualitatively the same behavior as between the above-mentioned times t1 to t2, and thus a detailed explanation thereof will be omitted. In addition, between times t4 and t5, the output value Vno2 of the $NO_2$ sensor is greater than the $NO_2$ detection threshold Vno2_th. Therefore, the air-fuel ratio correction coefficient Daf_no2 and the target air-fuel ratio amount AF_cmd in this interval show qualitatively the same behavior as between the above-mentioned times t2 to t3, and thus a detailed explanation thereof will be omitted.

Next, the effects due to executing processing (times t2 to t3, and t4 to t5 in FIG. 20) to cause the target air-fuel ratio AF_cmd to decrease so as to deviate from the map value AF_map in response to the output deviation E_Vno2 having become a positive value will be explained while referring to FIG. 21.

Figure 21:
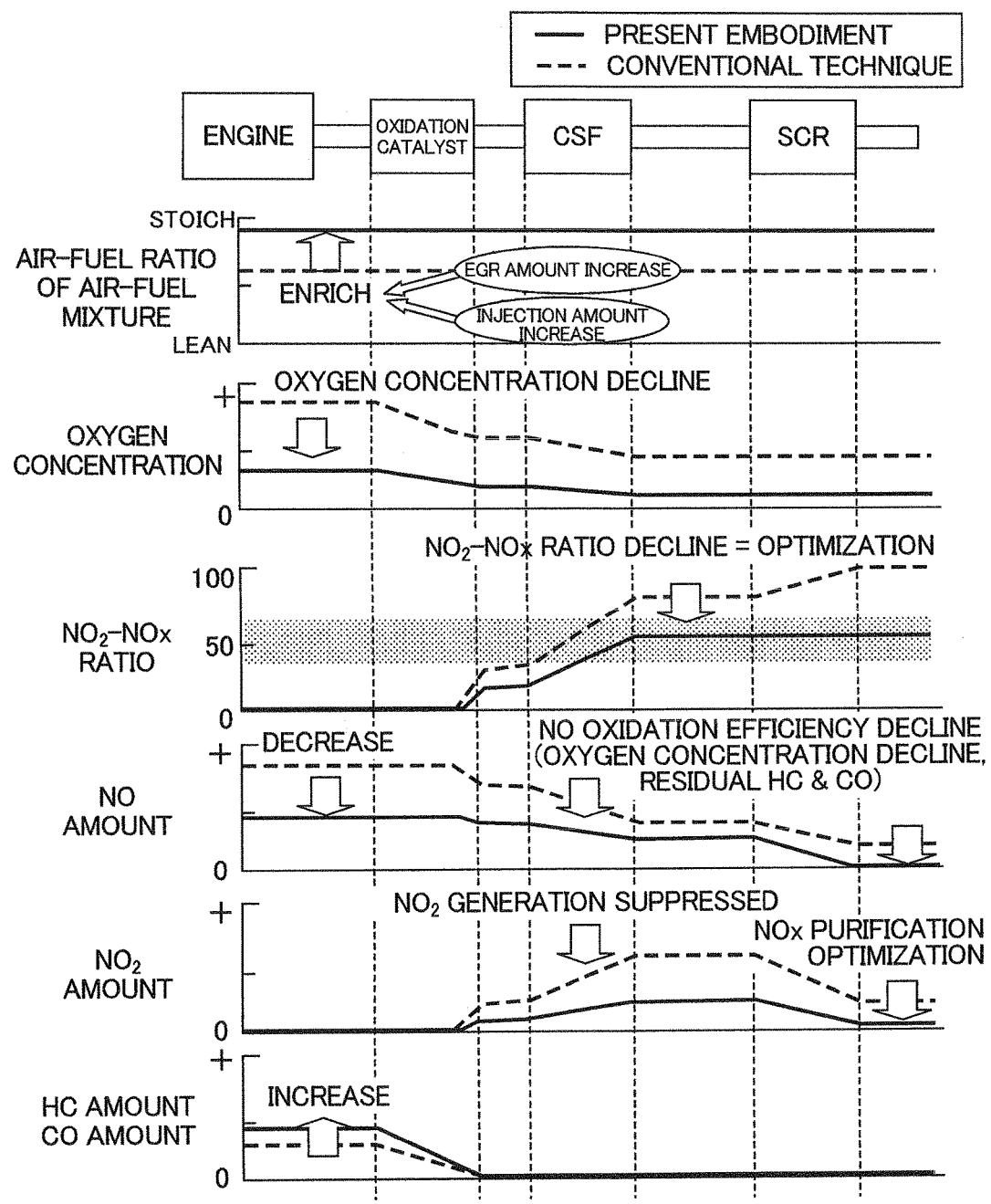
FIG. 21 provides graphs showing the oxygen concentration, $NO_2$-NOx ratio, NO amount, $NO_2$ amount, HC amount and CO amount, as well as the air-fuel ratio of the air-fuel mixture in each part of the exhaust plumbing.

FIG. 21 provides graphs showing the oxygen concentration, $NO_2$-NOx ratio, NO amount, $NO_2$ amount, HC amount and CO amount, as well as the air-fuel ratio of the air-fuel mixture in each part of the exhaust plumbing. The dotted lines in FIG. 21 show an example of a conventional technique that continues to use the map value AF_map as the target air-fuel ratio AF_cmd, and the solid lines show an example of the present embodiment in which the target air-fuel ratio AF_cmd is made to decrease so as to deviate from the map value AF_map in response to the output deviation E_Vno2 having become a positive value.

First, in the conventional technique shown by the dotted lines, if an $NO_2$ excessive state is entered in which the $NO_2$-NOx ratio of the exhaust flowing into the selective reduction catalyst greatly exceeds the optimum value near 0.5, the $NO_2$ that has not been purified will be discharged to the downstream side of the selective reduction catalyst.

In contrast, with the present embodiment, in a case of the output deviation E_Vno2 becoming a positive value and entering an $NO_2$ excessive state, the air-fuel ratio of the air-fuel mixture is changed to the richer side and the oxygen concentration of the exhaust is made to decline by causing the target air-fuel ratio AF_cmd to decrease so as to deviate from the map value AF_map. It should be noted that enrichment of the air-fuel ratio of the air-fuel mixture is performed by causing the combustion fuel injection amount Gcomb, post injection amount Gpost, and EGR amount Gegr_cmd to increase, for example. As a result, accompanying the enrichment of the air-fuel ratio of the air-fuel mixture, the HC amount and CO amount of the exhaust flowing into the oxidation catalyst and CSF increase, and conversely, the NO amount decreases.

When the oxygen concentration of the exhaust declines, the oxidation efficiency of NO in the oxidation catalyst declines. Additionally, accompanying the enrichment of the air-fuel ratio of the air-fuel ratio, the amounts of HC and Co, which have higher orders of precedence in oxidation than NO, increase; therefore, the oxidation efficiency of NO further declines. Consequently, the $NO_2$ generation efficiency of the oxidation catalyst declines.

As described in the foregoing, compared with the conventional technique in which the $NO_2$-NOx ratio greatly exceeds the optimum value near 0.5, the present embodiment can suppress both the NO amount and $NO_2$ amount discharged from the selective reduction catalyst as a result of causing the $NO_2$-NOx ratio of the exhaust flowing into the selective reduction catalyst to decrease towards the optimum value near 0.5, by changing the air-fuel ratio of the air-fuel mixture to the richer side to cause the oxygen concentration to decline.

It should be noted that, in the present embodiment, although the $NO_2$-NOx ratio of the exhaust flowing into the selective reduction catalyst is made to decrease towards the optimum value by changing the air-fuel ratio of the air-fuel mixture to the richer side and causing the oxygen concentration of the exhaust to decline, the method of decreasing the $NO_2$-NOx ratio is not limited thereto. As shown in FIG. 21, the $NO_2$-NOx ratio may be made to decrease by setting a combustion parameter correlated to the combustion state of the engine so that the declining effect on the $NO_2$ generation efficiency in the oxidation catalyst and CSF caused by the oxygen concentration of the exhaust declining and the HC amount and CO amount discharged from the engine increasing, becomes greater than the raising effect on the $NO_2$ generation efficiency of the oxidation catalyst and CSF caused by the NOx amount discharged from the engine decreasing.

However, the $NO_2$ generation efficiency is made to decline in the first embodiment by causing the EGR amount to decrease in a lean state in which the air-fuel ratio of the air-fuel mixture sufficiently deviates from stoich; whereas, in the second embodiment, the $NO_2$ generation efficiency is made to decline by causing the EGR amount to increase, and causing the air-fuel ratio of the air-fuel mixture to enrich to the leaner side than stoich and near stoich. Although the direction of change in the EGR amount is opposite when causing the $NO_2$ generation efficiency to decline between the first embodiment and the second embodiment in this way, this is because the presumed air-fuel ratios of the air-fuel mixture differ greatly, and is not a contradiction.

2. Catalyst Degradation Determination Mode

Referring back to FIG. 19, the $NO_2$-NOx ratio controller 31A decides the catalyst degradation determination value DET_SCR_AGD indicating the degree of degradation of the selective reduction catalyst 23 in the catalyst degradation determination mode.

More specifically, when the air-fuel ratio of the air-fuel mixture continues to be changed to the richer side by causing the air-fuel ratio correction coefficient Daf_no2 to decrease from the upper limit "0" to the lower limit Daf_no2_L, the catalyst degradation determination value DET_SCR_AGR is decided based on the timing at which the output value Vno2 of the $NO_2$ sensor falls below the degradation determination threshold Vno2_JD_th. The algorithm for deciding the catalyst degradation determination value DET_SCR_AGD while the air-fuel ratio correction coefficient Daf_no2 continues to be changed in this way can be constructed by replacing the parameter related to the EGR correction coefficient Kegr_no2 in formulas (9) to (12) in the first embodiment to a parameter of the air-fuel ratio correction coefficient Daf_no2.

In addition, conversely, it is possible to decide the catalyst degradation determination value DET_SCR_AGD based on the timing at which the output value Vno2 of the $NO_2$ sensor exceeds the catalyst degradation threshold Vno2_JD_th, when the air-fuel ratio of the air-fuel mixture continues to be changed to the leaner side by increasing the air-fuel ratio correction coefficient Daf_no2 from the lower limit Daf_no2_L towards the upper limit "0". This algorithm can be constructed by replacing the parameter related to the EGR correction coefficient Kegr_no2 in formulas (13) to (16) of the first embodiment with a parameter of the air-fuel ratio correction coefficient Daf_no2.

Fuel Economy Priority Mode

In the fuel economy priority mode, the $NO_2$-NOx ratio controller 31A sets the air-fuel ratio correction coefficient Daf_no2 to a fuel economy air-fuel ratio correction coefficient Daf_no2_opt irrespective of the output value Vno2 of the $NO_2$ sensor so that the fuel economy improves more than during execution of the $NO_2$ feedback mode, i.e. the air-fuel ratio of the air-fuel mixture becomes leaner (refer to the following formula (26)).

$$Daf\_no2(k)=Daf\_no2\_opt \quad (26)$$

$NO_2$ Generation Priority Mode

In the $NO_2$ generation priority mode, the $NO_2$-NOx ratio controller 31A sets the air-fuel ratio correction coefficient Daf_no2 to "0" as shown in the following formula (27), so that an abundance of $NO_2$ is generated by the oxidation catalyst and CSF, and the $NO_2$ amount of the exhaust flowing into the selective reduction catalyst increases.

$$Daf\_no2(k)=0 \quad (27)$$

As described in the foregoing, it is possible for the $NO_2$-NOx ratio controller to be made to operate in the four types of different control modes of the $NO_2$ sensor feedback mode, the catalyst degradation determination mode, the fuel economy priority mode, and the $NO_2$ generation priority mode. In addition, the preferred times for executing each mode are the same as the first embodiment.

In other words, in a case of the aforementioned catalyst degradation determination value DET_SCR_AGD being "1" and being able to determine that the selective reduction catalyst is not degrading, it is preferable to inhibit execution of the $NO_2$ sensor feedback mode and to execute the fuel economy priority mode (refer to the above formula (26)), thereby causing the fuel economy to improve more than during the execution of the $NO_2$ sensor feedback mode. In addition, in a case of the catalyst degradation determination value DET_SCR_AGD being "2" or "3", i.e. in a case of being able to determine that the degradation of the selective reduction catalyst has progressed to some extent, it is preferable to permit execution of the $NO_2$ sensor feedback mode.

In addition, it is preferable that, in a case of determining the degree of degradation of the oxidation catalyst and CSF and having determined that this degree of degradation is small, execution of the $NO_2$ sensor feedback mode is permitted, and in a case of having determined that the degree of degradation is large, execution of the $NO_2$ sensor feedback mode is inhibited and, for example, the $NO_2$ generation priority mode is executed.

Figure 22:
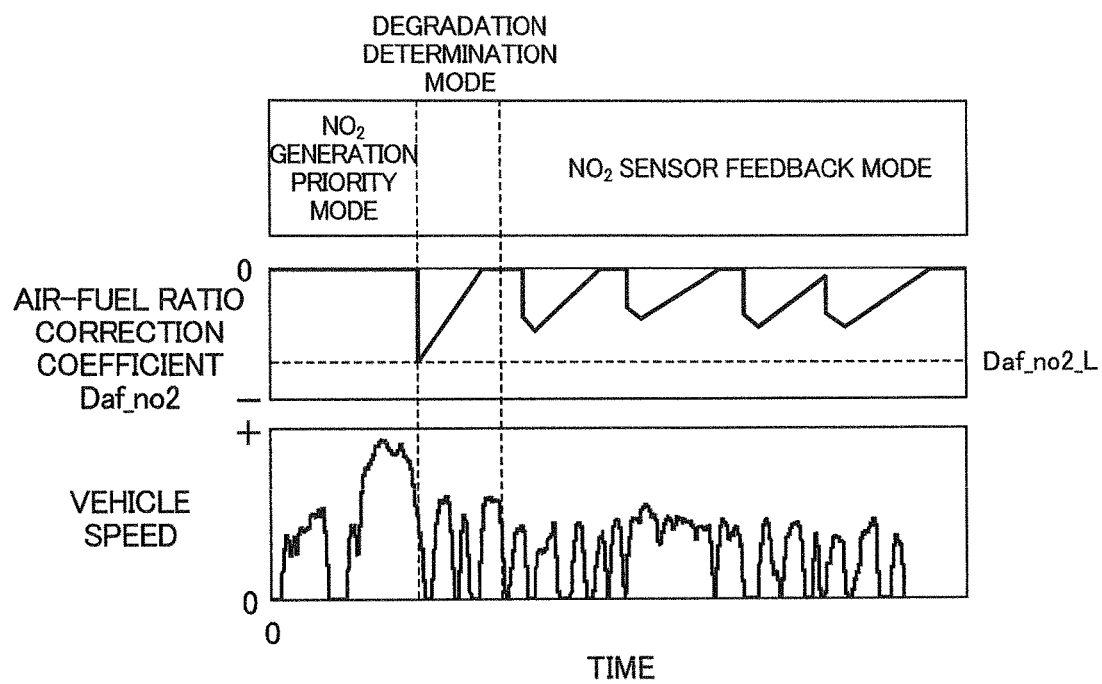
FIG. 22 provides time charts showing an example of a switching sequence of modes in the $NO_2$-NOx ratio controller.

FIG. 22 provides time charts showing an example of a switching sequence of modes in the $NO_2$-NOx ratio controller. The example shown in FIG. 22 shows a case of starting the engine at time "0", followed by causing the $NO_2$-NOx ratio controller to operate in the order of $NO_2$ generation priority mode, catalyst degradation determination mode, and $NO_2$ sensor feedback mode.

As shown in FIG. 22, during the period from beginning start up of the engine until a predetermined time has elapsed (during warm up), execution of the $NO_2$ sensor feedback mode is inhibited, and the $NO_2$ generation priority mode is executed in place thereof. In other words, during warm up, the $NO_2$ generation priority mode is executed to quickly raise the HC and CO purification rates as well as the $NO_2$ generation efficiency. Then, after a predetermined time has elapsed since beginning start up of the engine (after warm up), execution of the $NO_2$ sensor feedback mode is permitted, the $NO_2$-NOx ratio is maintained at the optimum value near 0.5, and the HC and CO purification rates as well as the NOx purification rate are maintained to be high.

Furthermore, in addition to during warm up immediately after start up of the engine as described in the foregoing, execution of the $NO_2$ sensor feedback mode may be inhibited and the $NO_2$ generation priority mode may be executed, similarly to the case of the temperature of the oxidation catalyst being less than the activation temperature thereof, and execution of the $NO_2$ sensor feedback mode may be permitted in the case of the temperature of the oxidation catalyst being at least the activation temperature thereof.

As explained while referring to FIG. 13 in the first embodiment, it is thereby possible to efficiently purify all of HC, CO and NOx during warm up immediately after start up of the engine and over the period after warm up.

Modified Example of Second Embodiment

Next, a modified example of the above second embodiment will be explained.

In the present modified example, a catalyst degradation determination mode as in the above second embodiment is not specifically established, and the degree of degradation is determined based on the air-fuel ratio correction coefficient Daf_no2 while causing to operate in the $NO_2$ sensor feedback mode.

More specifically, the degradation determination parameter J_SCR inversely proportional to the progression of the degree of degradation of the selective reduction catalyst is calculated by conducting statistical processing similar to the above formula (19), on the air-fuel ratio correction coefficient Daf_no2 at the time when the output value Vno2 of the $NO_2$ sensor falls below the degradation determination threshold Vno2_JD_th while the air-fuel ratio correction coefficient Daf_no2 is made to vary in the $NO_2$ feedback mode, and further, the catalyst degradation determination value DET_SCR_AGD is decided by comparing this parameter with the threshold similarly to the above formula (20).

Third Embodiment

Next, a third embodiment of the present invention will be explained while referring to the drawings. It should be noted that, in the following explanation, the same reference symbols will be assigned for the same configurations as the first embodiment, and explanations thereof will be omitted.

The first embodiment focuses on the order of precedence of the oxidation of NO in the oxidation catalyst and CSF being lower than CO and HC, and the second embodiment focuses on the $NO_2$ generation efficiencies of the oxidation catalyst and CSF changing depending on the oxygen concentration of the exhaust. In contrast, the third embodiment focuses on the $NO_2$ generation efficiencies of the oxidation catalyst and CSF changing also according to the temperatures thereof.

Figure 23:
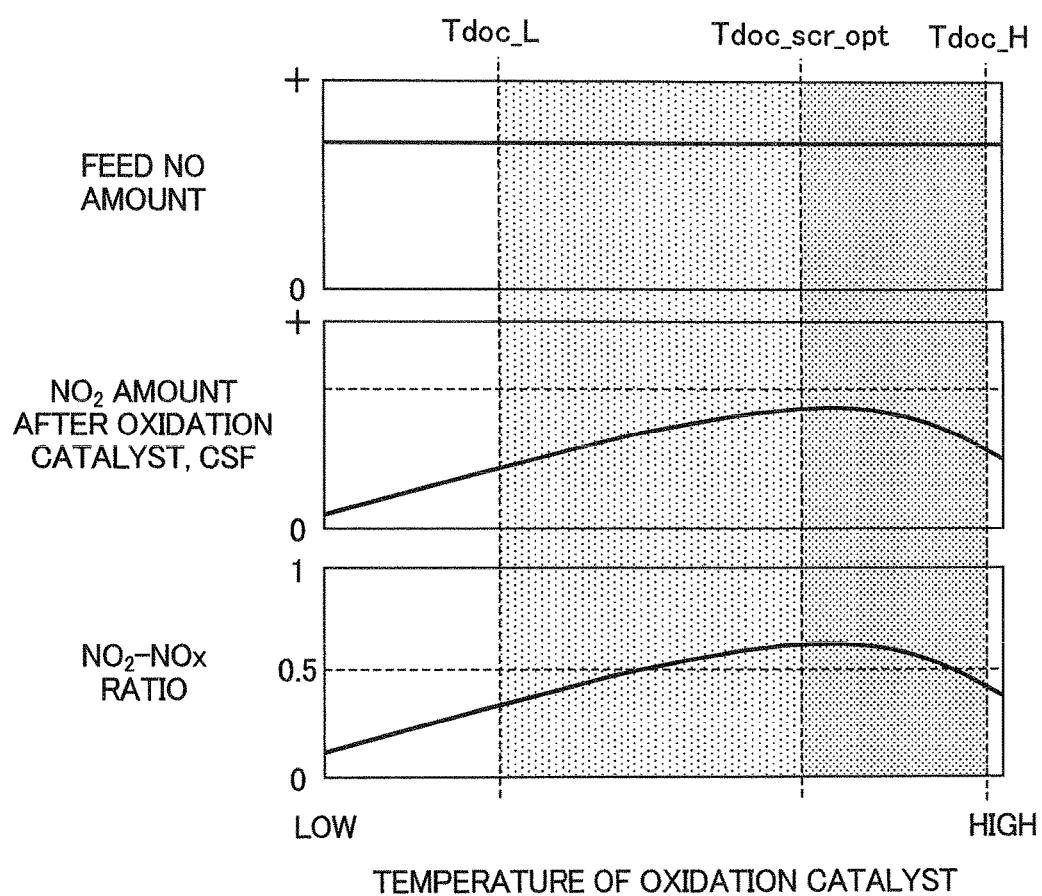
FIG. 23 provides graphs showing the relationships between the temperature of the oxidation catalyst, $NO_2$ amount on the downstream side of the oxidation catalyst and CSF, and $NO_2$-NOx ratio of exhaust flowing into the selective reduction catalyst.

FIG. 23 provides graphs showing the relationships between the temperature of the oxidation catalyst, the $NO_2$ amount on the downstream side of the oxidation catalyst and CSF, and the $NO_2$-NOx ratio of exhaust flowing into the selective reduction catalyst. It should be noted that FIG. 23 shows a case in which the temperature of the oxidation catalyst is made to change so that the feed NO amount is constant.

As shown in FIG. 23, when the temperature of the oxidation catalyst rises, the $NO_2$ generation efficiencies of the oxidation catalyst and CSF also rises; however, when it becomes at least a certain temperature, the $NO_2$ generation efficiency declines again due to a reaction occurring that returns $NO_2$ to NO again. As explained in detail hereinafter, in the present embodiment, the $NO_2$-NOx ratio is controlled to near the optimum value thereof by causing a target temperature of the oxidation catalyst to change between an upper limit Tdoc_scr_opt and a lower limit Tdoc_L.

Figure 24:
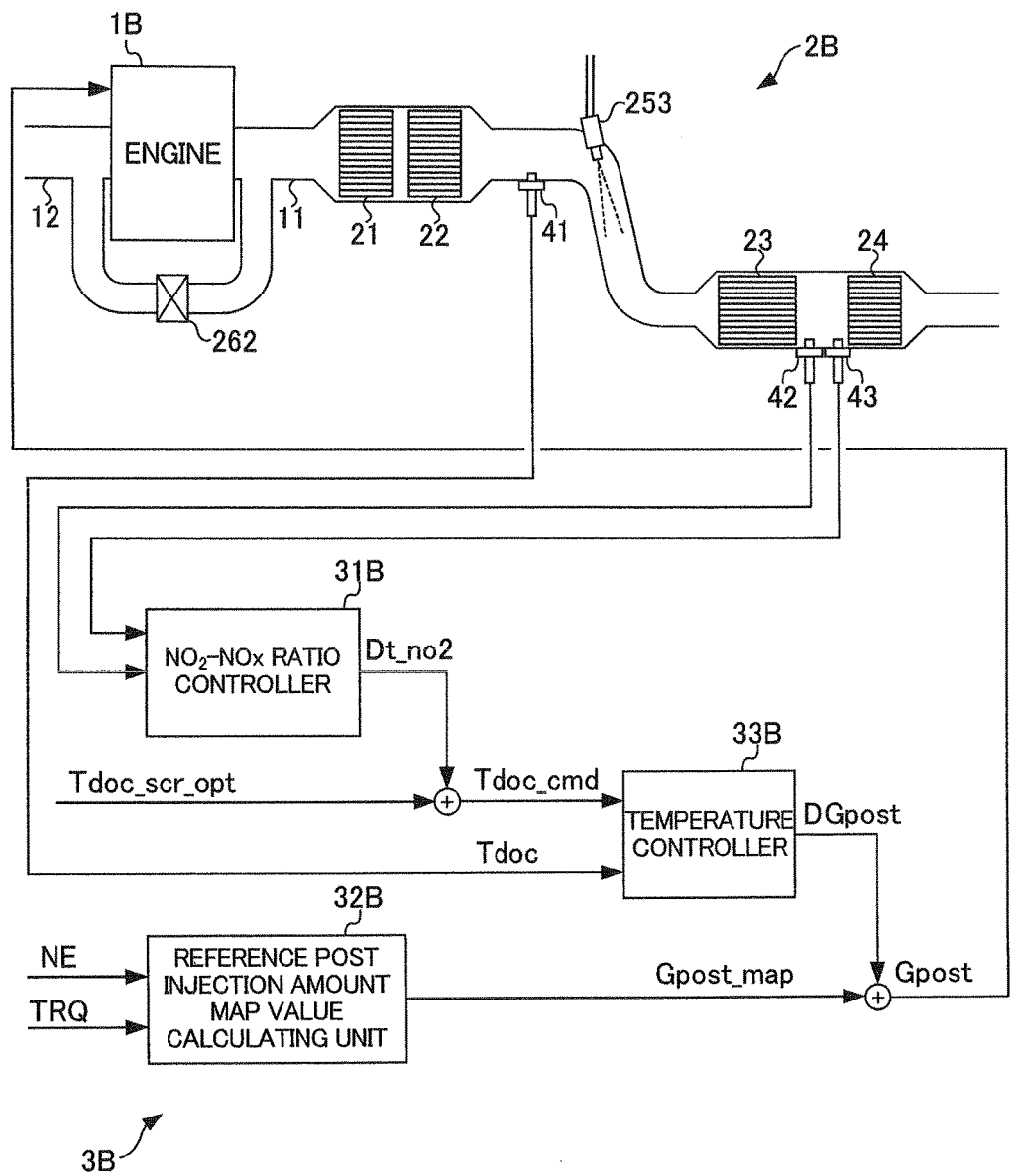
FIG. 24 is a block diagram showing configurations of an exhaust purification system of an engine and an ECU thereof according to a third embodiment of the present invention.

FIG. 24 is a block diagram showing configurations of an exhaust purification system 2B of an engine 1B and an ECU 3B thereof according to the third embodiment established by focusing on the relationship between the temperature of the oxidation catalyst 21 and the $NO_2$-NOx ratio.

The temperatures of the oxidation catalyst 21 and the CSF 22 can be adjusted by way of the main injection timing, after injection timing, etc. in addition to the main injection amount, after injection amount and post injection amount. For example, there is a trend of the temperatures of the oxidation catalyst 21 and the CSF 22 rising when the main injection amount, after injection amount, and post injection amount are made to increase, and conversely, these temperatures lower when these amounts are decreased. In addition, there is a trend of the temperatures of the oxidation catalyst 21 and the CSF 22 rising when retarding the main injection timing and the after injection timing, and conversely, these temperatures lowering when these timings are made to advance.

Hereinafter, an example of deciding the post injection amount Gpost as the parameter for adjusting the temperatures of the oxidation catalyst 21 and the CSF will be explained.

As shown in FIG. 24, the control block related to deciding the post injection amount Gpost is configured to include a $NO_2$-NOx ratio controller 31B, reference post injection amount map value calculating unit 32B, and temperature controller 33B.

According to this control block, a target temperature Tdoc_cmd of the oxidation catalyst 21 is calculated by adding a temperature correction amount Dt_no2 calculated by the $NO_2$-NOx ration controller 31B, to an optimum temperature Tdoc_scr_opt described later (refer to the following formula (28)). Then, the post injection amount Gpost is calculated by adding a post injection amount correction value DGpost calculated by the temperature controller 33B, to a reference post injection amount Gpost_map calculated by the reference post injection amount map value calculating unit 32B (refer to the following formula (29)).

$$\text{Tdoc\_cmd}(k) = \text{Tdoc\_scr\_opt} + \text{Dt\_no2}(k) \tag{28}$$

$$\text{Gpost}(k) = \text{Gpost\_map}(k) + \text{DGpost}(k) \tag{29}$$

However, the NOx purification rate of the selective reduction catalyst is known to change depending on the temperature thereof. More specifically, similarly to as the $NO_2$ generation efficiencies of the oxidation catalyst and CSF exhibit a upward convex characteristic relative to the temperatures thereof (refer to FIG. 23), the NOx purification rate of the selective reduction catalyst exhibits an upward convex characteristic relative to the temperature thereof, and thus reaches a maximum at a predetermined temperature. Therefore, the aforementioned optimum temperature Tdoc_scr_opt of the oxidation catalyst is a temperature of the oxidation catalyst in a state in which the selective reduction catalyst on a downstream side is a temperature achieving the maximum NOx purification rate. In addition, by adjusting the specifications of the oxidation catalyst and CSF and the layout of the exhaust system, it is possible to make the optimum temperature Tdoc_scr_opt maximizing the NOx purification rate of the selective reduction catalyst on the downstream side substantially equal to the temperature at which the NO generation efficiency of the oxidation catalyst is a maximum, as shown in FIG. 23.

The reference post injection amount map value calculating unit 32B calculates the reference post injection amount Gpost_map by searching a map established in advance, based on the engine revolution speed NE and demanded engine load TRQ. It should be noted that this map of the reference post injection amount map value calculating unit 32B is preferably set so that the temperature of the oxidation catalyst 21 is maintained at the aforementioned optimum temperature Tdoc_scr_opt while taking account of the fuel economy, soot amount, feed NOx amount, and the like, and so that the $NO_2$-NOx ratio of the exhaust flowing into the selective reduction catalyst is slightly $NO_2$ excessive similarly to the first embodiment.

The temperature controller 33B calculates a post injection amount correction value DGpost based on the following formula (31), so that the deviation E_tdoc between the oxidation catalyst temperature Tdoc and the target temperature Tdoc_cmd shown in the following formula (30) becomes "0".

$$E\_tdoc(k) = Tdoc(k) - Tdoc\_cmd(k) \tag{30}$$

$$DGpost(k) = Kp\_post \cdot E\_tdoc(k) + Ki\_post \sum_{i=0}^{k} E\_tdoc(i) \tag{31}$$

The $NO_2$-NOx ratio controller 31B operates in any of the following three types of control modes, and calculates the temperature correction amount Dt_no2 for correcting the aforementioned optimum temperature Tdoc_scr_opt, based on different algorithms in each control mode.
1. $NO_2$ sensor feedback mode
2. catalyst degradation determination mode
3. $NO_2$ generation priority mode Hereinafter, a sequence of calculating the temperature correction amount Dt_no2 according to these three control modes will be explained in order.

$NO_2$ Sensor Feedback Mode

In the $NO_2$ sensor feedback mode, the $NO_2$-NOx ratio controller 31B decides the temperature correction amount Dt_no2 based on the output value Vno2 of the $NO_2$ sensor so that the $NO_2$-NOx ratio of the exhaust flowing into the selective reduction catalyst is maintained near the optimum value thereof.

Similarly to the first embodiment, the present embodiment also calculates the temperature correction amount Dt_no2 using the output deviation E_Vno2 defined by the following formula (32), based further on the following formulas (33), (34) and (35).

$$E\_Vno2(k) = \begin{cases} Vno2(k) - Vno2\_th & (Vno2(k) - Vno2\_th > 0) \\ 0 & (Vno2(k) - Vno2\_th \le 0) \end{cases} \tag{32}$$

$$DDt\_no2(k) = \begin{cases} DDt\_DEC & (E\_Vno2(k) > 0 \text{ and } E\_Vno2(k-1) = 0) \\ DDt\_INC & (E\_Vno2(k) = 0) \\ 0 & (\text{other}) \end{cases} \tag{33}$$

$$Dt\_no2\_temp(k) = Dt\_no2(k-1) + Ki\_no2 \cdot E\_Von2(k) + DDt\_no2(k) \tag{34}$$

$$Dt\_no2(k) = \begin{cases} 0 & (Dt\_no2\_temp(k) \ge 0) \\ Dt\_no2\_temp(k) & \left(\begin{array}{c} Tdoc\_L - Tdoc\_scr\_opt < \\ Dt\_no2\_temp(k) < 0 \end{array}\right) \\ Tdoc\_L - Tdoc\_scr\_opt & \left(\begin{array}{c} Dt\_no2\_temp(k) \le \\ Tdoc\_L - Tdoc\_scr\_opt \end{array}\right) \end{cases} \tag{35}$$

As shown in formula (35), with "0" as an upper limit and "Tdoc_L_Tdoc_scr_opt" as a lower limit, the temperature correction amount Dt_no2 is set between this upper limit and lower limit. Therefore, the upper limit of the target temperature Tdoc_cmd is the optimum temperature Tdoc_scr_opt, and the lower limit is Tdoc_L according to formula (28).

A feedback gain Ki_no2 in formula (34) is set to a negative value. An initial decrement DDt_DEC in formula (33) is set to a negative value, and a return amount DDt_INC is set to a positive value.

Figure 25:
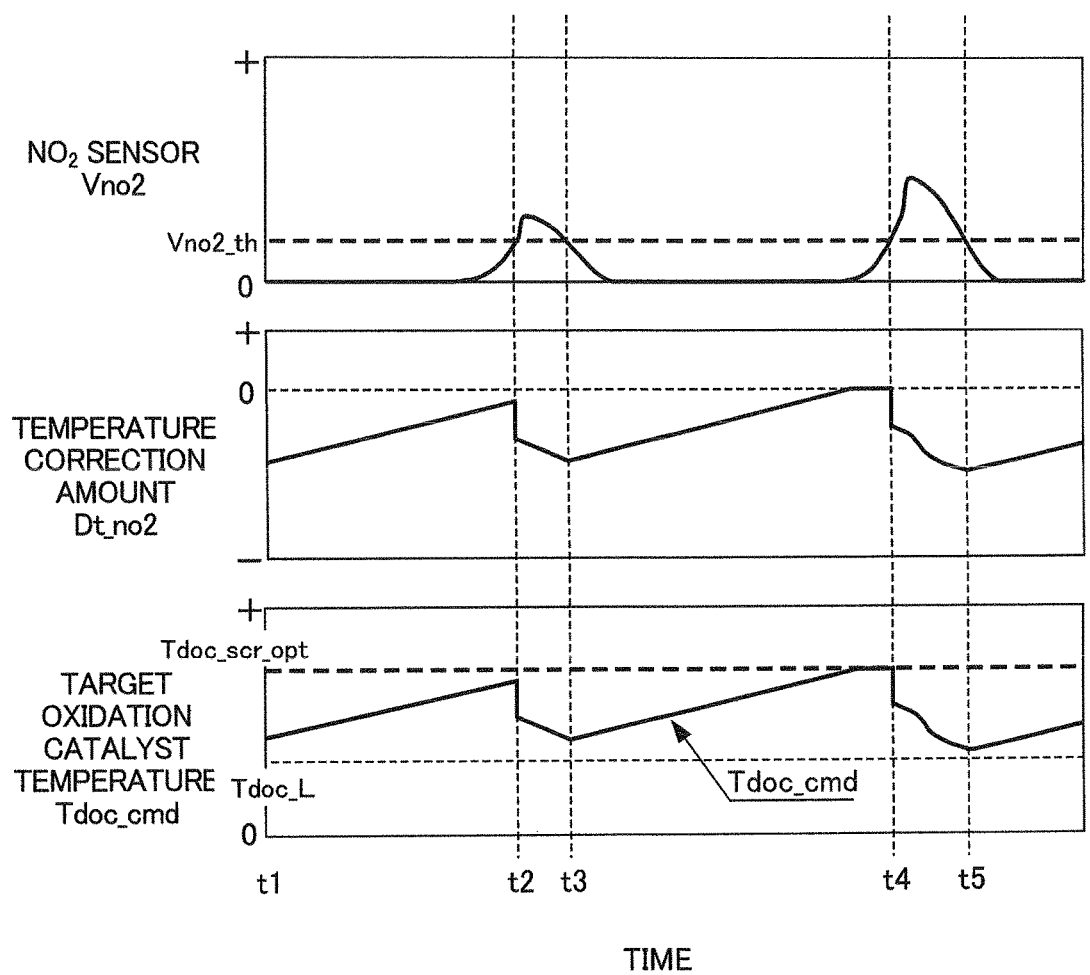
FIG. 25 provides time charts showing changes in the output value of the $NO_2$ sensor, temperature correction amount, and target oxidation catalyst temperature in a case of operating the $NO_2$-NOx ratio controller in $NO_2$ sensor feedback mode.

FIG. 25 provides time charts showing changes in the output value Vno2 of the $NO_2$ sensor, temperature correction amount Dt_no2, and target oxidation catalyst temperature Tdoc_cmd in a case of operating the $NO_2$-NOx ratio controller in $NO_2$ sensor feedback mode defined by the above formulas (32) to (35).

During the time t1 to t2, the output value Vno2 of the $NO_2$ sensor is no more than the $NO_2$ detection threshold Vno2_th. In this case, the temperature correction amount Dt_no2 incrementally increases by the return amount DDt_INC set by formula (33) towards the upper limit "0", and the target oxidation catalyst temperature Tdoc_cmd gently rises so as to approach the optimum temperature Tdoc_scr_opt. The post injection amount is thereby corrected to the increased side, a result of which the temperature of the oxidation catalyst gradually rises compared to a case of not causing the temperature correction amount Dt_no2 to increase.

Next, at time t2, the output value Vno2 of the $NO_2$ sensor exceeds the $NO_2$ detection threshold Vno2_th. At this moment, the temperature correction amount Dt_no2 decreases by the initial decrement DDt_DEC set by formula (33). The target oxidation catalyst temperature Tdoc_cmd is thereby instantly changed to a smaller value so as to deviate from Tdoc_scr_opt. Subsequently, from time t2 until time t3 when the output value Vno2 of the $NO_2$ sensor falls below the $NO_2$ detection threshold Vno2_th, the temperature correction amount Dt_no2 incrementally decreases by an amount proportional to the output deviation E_Vno2, as shown in formula (34). The target oxidation catalyst temperature Tdoc_cmd thereby further decreases so as further deviate from the Tdoc_scr_opt. The post injection amount is thereby corrected to the decreased side, a result of which the temperature of the oxidation catalyst gradually declines compared to a case of not causing the temperature correction amount Dt_no2 to decrease.

During time t3 to t4, and from t5 and onward, the output value Vno2 of the $NO_2$ sensor is no more than the $NO_2$ detection threshold Vno2_th. Therefore, the temperature correction amount Dt_no2 and the target oxidation catalyst temperature Tdoc_cmd in this interval show qualitatively the same behavior as between the above-mentioned times t1 to t2, and thus a detailed explanation thereof will be omitted. In addition, between times t4 and t5, the output value Vno2 of the $NO_2$ sensor is greater than the $NO_2$ detection threshold Vno2_th. Therefore, the temperature correction amount Dt_no2 and the target oxidation catalyst temperature Tdoc_cmd in this interval show qualitatively the same behavior as between the above-mentioned times t2 to t3, and thus a detailed explanation thereof will be omitted.

Figure 26:
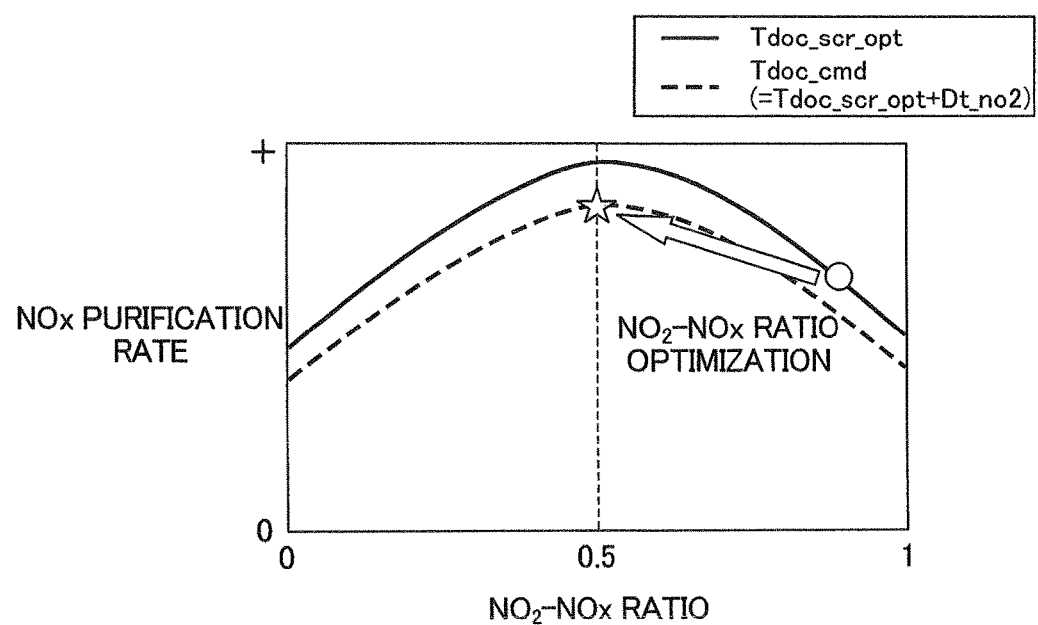
FIG. 26 is a graph showing the relationships between the NOx purification rate of the selective reduction catalyst, and the $NO_2$-NOx ratio and temperature of the oxidation catalyst.

FIG. 26 is a graph showing the relationship between the NOx purification rate of the selective reduction catalyst, and the $NO_2$-NOx ratio and temperature of the oxidation catalyst. In FIG. 26, the NOx purification rate when the temperature of the oxidation catalyst is set to the optimum temperature Tdoc_scr_opt is shown by the solid line, and the NOx purification rate when the temperature of the oxidation catalyst is set to a target temperature Tdoc_cmd lower than the optimum temperature Tdoc_opt is shown by the dotted line.

As described in the foregoing, the NOx purification rate of the selective reduction catalyst reaches a maximum when the temperature of the oxidation catalyst is at the optimum temperature Tdoc_scr opt; therefore, the target temperature Tdoc_cmd of the oxidation catalyst is basically set to this optimum temperature Tdoc_scr_opt. However, even if maintained at the optimum temperature Tdoc_scr_opt, for example, if a state is entered in which the $NO_2$-NOx ratio is $NO_2$ excessive as shown by the white circle in FIG. 26, the NOx purification rate thereof will greatly decline. In such a case, it is possible raise the NOx purification rate more, even though the target temperature Tdoc_cmd of the oxidation catalyst will be made to decline, by the $NO_2$ generation efficiency of the oxidation catalyst being made to decline, and the $NO_2$-NOx ratio being made to decrease to near the optimum value as shown by the black star in FIG. 6.

It should be noted that, due to this fact, the lower limit Tdoc_L of the target temperature Tdoc_cmd defined by the above formula (35) is preferably set so that so that the raising effect on the NOx purification rate by decreasing to optimize the $NO_2$-NOx ratio is greater than the decreasing effect on the NOx purification rate by the temperature of the selective reduction catalyst declining when causing the temperature of the oxidation catalyst to decline from Tdoc_scr_opt to Tdoc_L.

Next, the effects due to executing processing (times t2 to t3, and t4 to t5 in FIG. 25) to cause the target oxidation catalyst temperature Tdoc_cmd to decrease so as to deviate from Tdoc_scr_opt in response to the output deviation E_Vno2 having become a positive value will be explained while referring to FIG. 27.

Figure 27:
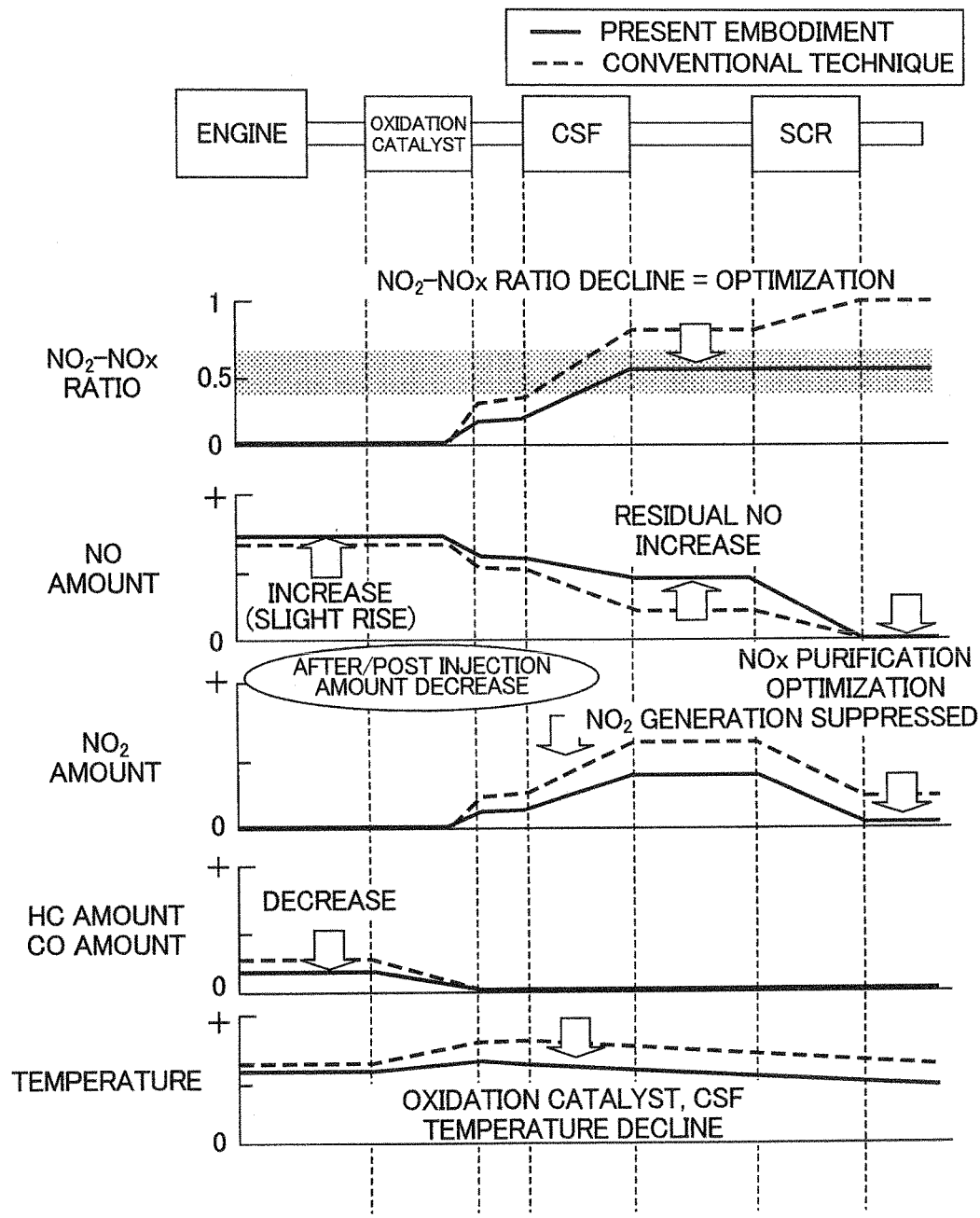
FIG. 27 provides graphs showing the oxygen concentration, $NO_2$-NOx ratio, NO amount, $NO_2$ amount, HC amount and CO amount, as well as the air-fuel ratio of the air-fuel mixture in each part of the exhaust plumbing.

FIG. 27 provides graphs showing the oxygen concentration, $NO_2$-NOx ratio, NO amount, $NO_2$ amount, HC amount and CO amount, as well as the air-fuel ratio of the air-fuel mixture in each part of the exhaust plumbing. The dotted lines in FIG. 27 show an example of a conventional technique that continues to use the optimum temperature Tdoc_scr_opt as the target oxidation catalyst temperature Tdoc_cmd, and the solid lines show an example of the present embodiment in which the target oxidation catalyst temperature Tdoc_cmd is made to decline so as to deviate from the optimum temperature Tdoc_scr_opt in response to the output deviation E_Vno2 having become a positive value.

First, in the conventional technique shown by the dotted lines, despite the selective reduction catalyst reaching the temperature at which the NOx purification rate is a maximum, if an $NO_2$ excessive state is entered in which the $NO_2$-NOx ratio of the exhaust flowing into the selective reduction catalyst greatly exceeds the optimum value near 0.5, the $NO_2$ will be discharged to the downstream side of the selective reduction catalyst without being able to be purified.

In contrast, with the present embodiment, in a case of the output deviation E_Vno2 becoming a positive value and entering an $NO_2$ excessive state, the post injection amount Gpost is corrected more to the decreased side by causing the target temperature Tdoc_cmd to deviate from the optimum temperature Tdoc_scr_opt to cause the temperatures of the oxidation catalyst and CSF to decline. Herein, the HC amount and CO amount of the exhaust flowing into the oxidation catalyst decrease by decreasing the post injection amount Gpost, and conversely, the NO amount increases slightly. In addition, when the temperatures of the oxidation catalyst and CSF decline, the $NO_2$ generation efficiencies of this oxidation catalyst and CSF decline.

As described in the foregoing, compared with the conventional technique in which the $NO_2$-NOx ratio greatly exceeds the optimum value near 0.5, the present embodiment can suppress both the NO amount and $NO_2$ amount discharged from the selective reduction catalyst as a result of causing the $NO_2$-NOx ratio of the exhaust flowing into the selective reduction catalyst to decrease towards the optimum value near 0.5, by correcting the post injection amount to the reduced side to cause the temperatures of the oxidation catalyst and CSF to decline.

It should be noted that, although the post injection amount Gpost is corrected to the decreased side to cause the temperatures of the oxidation catalyst and CSF to decline in the present embodiment, the method of causing the temperatures of the oxidation catalyst and CSF to decline is not limited thereto. The temperatures of the oxidation catalyst and CSF may be made to decline not only by the post injection amount, but also by correcting the after injection amount to the decreased side, for example. In addition, by causing the temperature of the oxidation catalyst to decline, not only the NO oxidation efficiency, but also the oxidation efficiencies for HC and CO decline. As a result, with the present embodiment, it is preferable to set the combustion parameter correlated to the combustion state of the engine so that the CO and HC discharged from engine are not more than an amount that can be treated by the oxidation catalyst for which the oxidizing ability has declined accompanying a decline in temperature, as well as the CSF.

2. Catalyst Degradation Determination Mode

Referring back to FIG. 24, the $NO_2$-NOx ratio controller 31B decides the catalyst degradation determination value DET_SCR_AGD indicating the degree of degradation of the selective reduction catalyst 23 in the catalyst degradation determination mode.

More specifically, the catalyst degradation determination value DET_SCR_AGD is decided based on the timing at which the output value Vno2 of the $NO_2$ sensor fell below the degradation determination threshold Vno2_JD_th, when the temperatures of the oxidation catalyst and CSF continue to be made to decline by causing the temperature correction amount Dt_no2 to decrease from the upper limit "0" to the lower limit (Tdoc_L-Tdoc_scr_opt). The algorithm for deciding the catalyst degradation determination value DET_SCR_AGD while the temperature correction amount Dt_no2 continues to be changed in this way can be constructed by replacing the parameter related to the EGR correction coefficient Kegr_no2 in formulas (9) to (12) in the first embodiment to a parameter of the temperature correction amount Dt_no2.

In addition, conversely, it is possible to decide the catalyst degradation determination value DET_SCR_AGD based on the timing at which the output value Vno2 of the $NO_2$ sensor exceeds the catalyst degradation threshold Vno2_JD_th, when the temperatures of the oxidation catalyst and CSF continue to be raised by increasing the temperature correction amount Dt_no2 from the lower limit (Tdoc_L-Tdoc_scr_opt) towards the upper limit "0". This algorithm can be constructed by replacing the parameter related to the EGR correction coefficient Kegr_no2 in formulas (13) to (16) of the first embodiment with a parameter of the temperature correction amount Dt_no2.

$NO_2$ Generation Priority Mode

In the $NO_2$ generation priority mode, the $NO_2$-NOx ratio controller 31B sets the temperature correction amount Dt_no2 to "0" as shown in the following formula (36), so that an abundance of $NO_2$ is generated by the oxidation catalyst and CSF, and the $NO_2$ amount of the exhaust flowing into the selective reduction catalyst increases.

$$Dt\_no2(k)=0 \tag{36}$$

As described in the foregoing, it is possible for the $NO_2$-NOx ratio controller to be made to operate in the three types of different control modes of the $NO_2$ sensor feedback mode, the catalyst degradation determination mode, and the $NO_2$ generation priority mode. In addition, the preferred times for executing each mode are the same as the first embodiment.

In other words, in a case of the aforementioned catalyst degradation determination value DET_SCR_AGD being "1" and being able to determine that the selective reduction catalyst is not degrading, it is preferable to inhibit execution of the $NO_2$ sensor feedback mode, thereby causing the fuel economy to improve more than during the execution of the $NO_2$ sensor feedback mode. In addition, in a case of the catalyst degradation determination value DET_SCR_AGD being "2" or "3", i.e. in a case of being able to determine that the degradation of the selective reduction catalyst has progressed to some extent, it is preferable to permit execution of the $NO_2$ sensor feedback mode.

Furthermore, it is preferable that, in a case of determining the degree of degradation of the oxidation catalyst and CSF and having determined that this degree of degradation is small, execution of the $NO_2$ sensor feedback mode is permitted, and in a case of having determined that the degree of degradation is large, execution of the $NO_2$ sensor feedback mode is inhibited and, for example, the $NO_2$ generation priority mode is executed.

Figure 28:
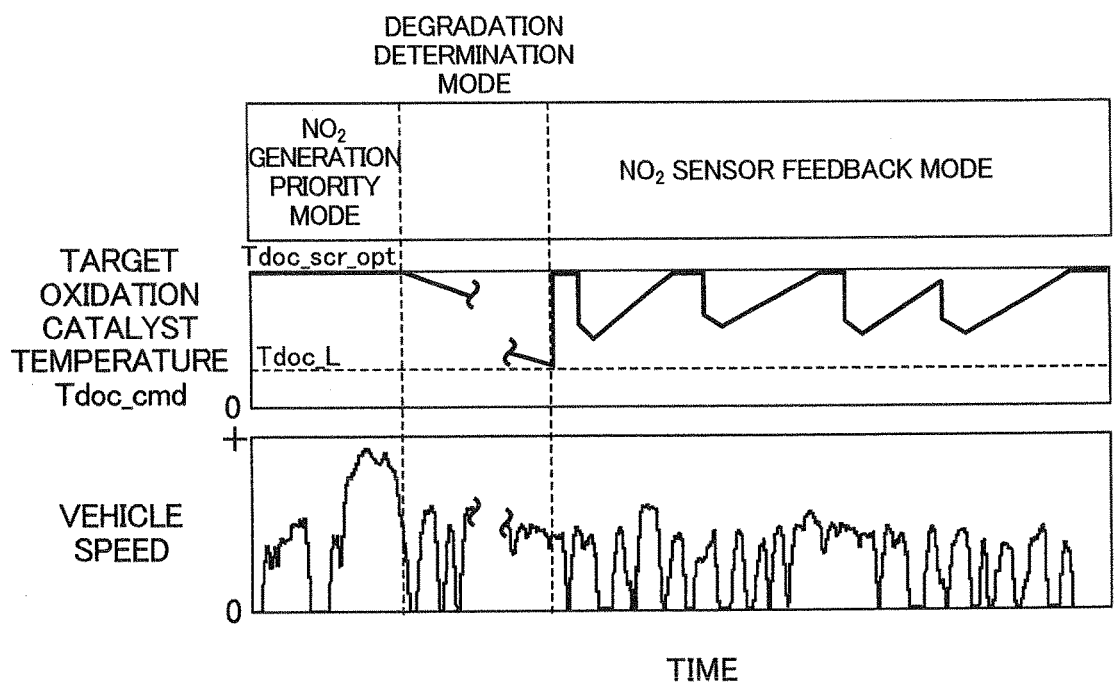
FIG. 28 provides time charts showing an example of a switching sequence of modes in the $NO_2$-NOx ratio controller.

FIG. 28 provides time charts showing an example of a switching sequence of modes in the $NO_2$-NOx ratio controller. The example shown in FIG. 28 shows a case of starting the engine at time "0", followed by causing the $NO_2$-NOx ratio controller to operate in the order of $NO_2$ generation priority mode, catalyst degradation determination mode, and $NO_2$ sensor feedback mode.

As shown in FIG. 28, during the period from beginning start up of the engine until a predetermined time has elapsed (during warm up), execution of the $NO_2$ sensor feedback mode is inhibited, and the $NO_2$ generation priority mode is executed in place thereof. In other words, during warm up, the $NO_2$ generation priority mode is executed to quickly raise the HC and CO purification rates as well as the $NO_2$ generation efficiency. Then, after a predetermined time has elapsed since beginning start up of the engine (after warm up), execution of the $NO_2$ sensor feedback mode is permitted, the $NO_2$-NOx ratio is maintained at the optimum value near 0.5, and the HC and CO purification rates as well as the NOx purification rate are maintained to be high.

Furthermore, in addition to during warm up immediately after start up of the engine as described in the foregoing, execution of the $NO_2$ sensor feedback mode may be similarly inhibited and the $NO_2$ generation priority mode may be executed, also in the case of the temperature of the oxidation catalyst being less than the activation temperature thereof, and execution of the $NO_2$ sensor feedback mode may be permitted in the case of the temperature of the oxidation catalyst being at least the activation temperature thereof.

As explained while referring to FIG. 13 in the first embodiment, it is thereby possible to efficiently purify all of HC, CO and NOx during warm up immediately after start up of the engine and over the period after warm up.

First Modified Example of Third Embodiment

Next, a first modified example of the above third embodiment will be explained.

In the present modified example, a catalyst degradation determination mode as in the above third embodiment is not specifically established, and the degree of degradation is determined based on the temperature correction amount Dt_no2 while causing to operate in the $NO_2$ sensor feedback mode.

More specifically, the degradation determination parameter J_SCR inversely proportional to the progression of the degree of degradation of the selective reduction catalyst is calculated by conducting statistical processing similar to the above formula (19), on the temperature correction amount Dt_no2 at the time when the output value Vno2 of the $NO_2$ sensor falls below the degradation determination threshold Vno2_JD_th while the temperature correction amount Dt_no2 is made to vary in the $NO_2$ feedback mode, and further, the catalyst degradation determination value DET_SCR_AGD is decided by comparing this parameter with the threshold similarly to the above formula (20).

Second Modified Example of Third Embodiment

Next, a second modified example of the above third embodiment will be explained.

As shown in FIG. 23, when the temperature of the oxidation catalyst declines between the lower limit Tdoc_L and the optimum temperature Tdoc_scr_opt, the $NO_2$ generation efficiency declines, and the $NO_2$-NOx ratio also declines. In the above third embodiment, the $NO_2$-NOx ratio is controlled to near the optimum value thereof by causing the target temperature Tdoc_cmd to change within the temperature region (Tdoc_L, Tdoc_scr_opt) in which the $NO_2$ generation efficiency declines when the temperature of the oxidation catalyst is made to decline. In other words, in the above third embodiment, the temperature of the oxidation catalyst is made to decline when the $NO_2$-NOx ratio is made to decrease.

However, as shown in FIG. 23, the optimum temperature Tdoc_scr_opt is substantially equal to the temperature at which the NO oxidation efficiency of the oxidation catalyst and CST reach a maximum. In this case, when the temperature of the oxidation catalyst rises between the optimum temperature Tdoc_scr_opt and a predetermined upper limit Tdoc_H, the NO oxidation efficiency declines, and the $NO_2$-NOx ratio also declines. In the present modified example, the $NO_2$-NOx ratio is controlled to near the optimum value thereof, by causing the target temperature Tdoc_cmd to change within the temperature region (Tdoc_scr_opt, Tdoc_H) in which the $NO_2$ generation efficiency declines when the temperature of the oxidation catalyst is made to rise in this way. In other words, with the present modified example, the $NO_2$-NOx ratio is made to decrease by setting the target temperature Tdoc_cmd within the region (Tdoc_scr_opt, Tdoc_H), as well as correcting the target temperature Tdoc_cmd within this region so as to make rise, conversely to the above third embodiment.

Therefore, the temperature correction amount Dt_no2 is made to change in the opposite direction from the above third embodiment in the $NO_2$ sensor feedback mode of the present modified example. More specifically, the target temperature Tdoc_cmd along with the temperatures of the oxidation catalyst and CSF are made to decline by making the temperature correction amount Dt_no2 decrease, in a case of the output value Vno2 of the $NO_2$ sensor being no more than the $NO_2$ detection threshold Vno2_th. In addition, the target temperature Tdoc_cmd, along with the temperatures of the oxidation catalyst and CSF are made to rise by causing the temperature correction amount Dt_no2 to increase, in a case of the output value Vno2 of the $NO_2$ sensor being greater than the $NO_2$ detection threshold. As described in the foregoing, the arithmetic expression for deciding the temperature correction amount Dt_no2 can be configured by reversing the sign of the initial decrement DDt_DEC, return amount DDt_INC and feedback gain Ki_no2 in the above formulas (33) and (34), for example. In addition, accompanying changing the setting region of the target temperature Tdoc_cmd from (Tdoc_L, Tdoc_scr_opt) to (Tdoc_scr_opt, Tdoc_H), the upper limit of the temperature correction amount Dt_no2 in formula (35) is changed from "0" to Tdoc_H-Tdoc_scr_opt, and the lower limit is changed from Tdoc_L-Tdoc_scr_opt to "0".

Furthermore, in the catalyst degradation determination mode as well, the temperature correction amount Dt_no2 is made to change in an opposite direction to the above third embodiment. More specifically, the catalyst degradation determination value DET_SCR_AGD is decided based on the timing at which the output value Vno2 of the $NO_2$ sensor falls below the catalyst degradation threshold Vno2_JD_th, when the temperatures of the oxidation catalyst and CSF continue to be raised by increasing the temperature correction amount Dt_no2 from the lower limit "0" towards the upper limit (Tdoc_H-Tdoc_scr_opt). Alternatively, the catalyst degradation determination value DET_SCR_AGD is decided based on the timing at which the output value Vno2 of the $NO_2$ sensor exceeds the catalyst degradation threshold Vno2_JD_th, when the temperatures of the oxidation catalyst and CSF continue to be declined by decreasing the temperature correction amount Dt_no2 from the upper limit (Tdoc_H-Tdoc_scr_opt) towards the lower limit "0".

However, when the temperatures of the oxidation catalyst and the CSF are made to rise from the above optimum temperature Tdoc_scr_opt to optimize the $NO_2$-NOx ratio, the temperature of the selective reduction catalyst on the downstream side thereof also rises, and the NOx purification rate thereof will decline; therefore, there is concern over the emission of NOx to outside the system worsening conversely, if the temperature is made to rise excessively. Therefore, in a case of causing the temperature of the oxidation catalyst and CSF to rise and the $NO_2$-NOx rate to decrease, it is preferable for the upper limit Tdoc_H of the target temperature Tdoc_cmd to be set so that the raising effect on the NOx purification rate by decreasing to optimize the $NO_2$-NOx ratio becomes greater than the declining effect on the NOx purification rate by the temperature of the selective reduction catalyst rising when causing the temperature of the oxidation catalyst to rise from Tdoc_scr_opt to Tdoc_H, so that the NOx purification rate of the selective reduction catalyst reliably rises.

In addition, there is a trend of the HC and CO amounts discharged from the engine also increasing when causing the temperatures of the oxidation catalyst and CSF to rise as in the present modified example. However, the HC and CO oxidation efficiencies of the oxidation catalyst differ from the characteristic of the NO oxidation efficiency, which exhibits an upward convex characteristic such as that shown in FIG. 2, and increase along with a rise in the temperature thereof.

Therefore, even if the HC and CO amounts discharged from the engine increased in order to cause the temperatures of the oxidation catalyst and CSF to rise, the emission of HC and CO to outside the system would not greatly deteriorate due to this.

As described in the foregoing, since the temperatures of the oxidation catalyst and CSF are made to rise in a case of decreasing the $NO_2$-NOx ratio in the present modified example, the average temperature of the exhaust system is high when compared with the above third embodiment. In addition, since the average temperature of the exhaust system of a gasoline engine is high compared to a diesel engine, controlling to lower the temperatures of the oxidation catalyst and CSF as in the above third embodiment is relatively difficult. On the other hand, since causing the exhaust temperature to rise is done relatively easily by retarding the ignition timing or the like, for example, the present modified example causing the temperature of the oxidation catalyst and CSF to rise is, therefore, particularly suited to the exhaust purification system of a gasoline engine.

Fourth Embodiment

Next, a fourth embodiment of the present invention will be explained while referring to the drawings. It should be noted that, in the following explanation, the same reference symbols will be assigned for the same configurations as the first embodiment, and explanations thereof will be omitted.

In the aforementioned first to third embodiments, the NOx purification rate of the selective reduction catalyst is maintained near the maximum by causing the $NO_2$-NOx ratio to decrease, in a case of the output value Vno2 of the $NO_2$ sensor provided on the downstream side of the selective reduction catalyst 23 being greater than the threshold Vno2_th, i.e. in a case of the exhaust flowing into the selective reduction catalyst being in a $NO_2$ excessive state. In contrast, with the present embodiment, a NO sensor detecting NO is provided on the downstream side of the selective reduction catalyst, and the NOx purification rate of the selective reduction catalyst is maintained near the maximum by conversely causing the $NO_2$-NOx ratio to increase in a case of the output value Vno thereof being greater than a threshold Vno_th, i.e. in a case of the exhaust flowing into the selective reduction catalyst being in a NO excessive state.

In addition, in the first embodiment, the $NO_2$-NOx ratio is adjusted by varying the EGR amount. Similarly to the first embodiment, the present embodiment also adjusts the $NO_2$-NOx ratio by varying the EGR amount.

Figure 29:
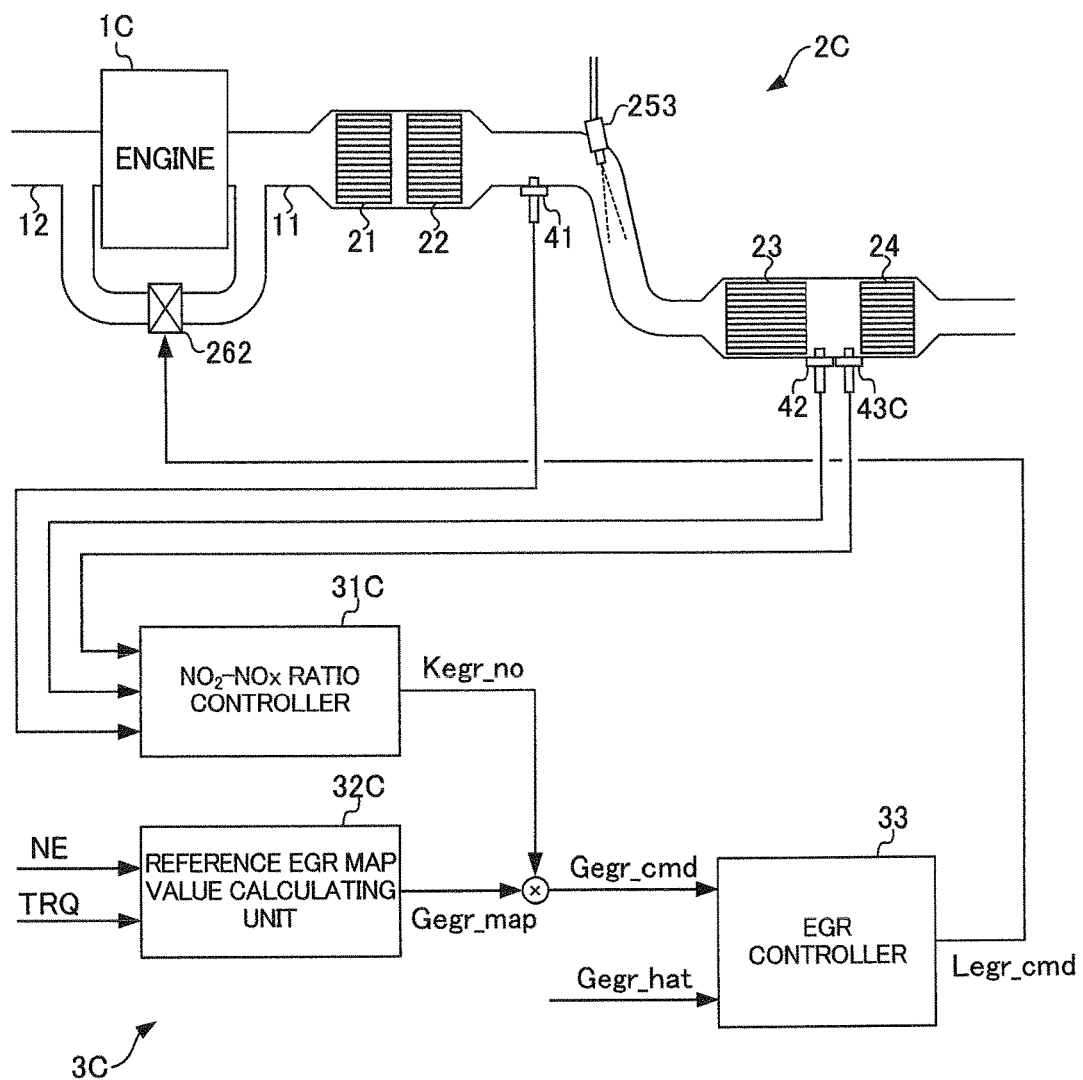
FIG. 29 is a block diagram showing configurations of an exhaust purification system of an engine and an ECU thereof according to a fourth embodiment of the present invention.

FIG. 29 is a block diagram showing configurations of an exhaust purification system 2C of an engine 10 and an ECU 3C thereof according to the present embodiment provided with a NO sensor 43C.

In order to detect the state of the exhaust purification system 2A, a NO sensor 43C is connected to an ECU 3C. This NO sensor 43C detects the amount or concentration of NO of the exhaust in the exhaust plumbing 11 on the downstream side of the selective reduction catalyst 23, and supplies a signal Vno substantially proportional to the detected value to the ECU 3C.

However, a sensor suited to vehicle installation does not currently exist for a NO sensor sensitive to only NO in the exhaust in this way. However, NOx in the exhaust may be considered constituted almost entirely by only NO and $NO_2$; therefore, the aforementioned such NO sensor can be configured by combining a NOx sensor and $NO_2$ sensor. In addition, since the currently existing NOx sensors are sensitive not only to NOx, but also $NH_3$, it is preferable to combine a $NH_3$ sensor in addition to the NOx sensor and $NO_2$ sensor. In other words, it is possible to obtain the desired output value proportional to the NO concentration or amount by subtracting the output value of the $NO_2$ sensor and the output value of the $NH_3$ sensor from the output value of the NOx sensor.

As shown in FIG. 29, the control block related to the deciding of the EGR valve command value Legr_cmd is configured to include the $NO_2$ NOx ratio controller 31O, the reference EGR amount map value calculating unit 32C, and the EGR controller 33.

Hereinafter, only the points of difference between the first embodiment and the present embodiment will be explained.

First, with the present embodiment, due to detecting the NO excessive state by way of the NO sensor 43C, the map of the reference EGR amount map value calculating unit 32C is preferably set so that the $NO_2$-NOx ratio of the exhaust flowing into the selective reduction catalyst 23 becomes slight NO excessive, conversely to the first embodiment.

In the NO sensor feedback mode of the $NO_2$-NOx ratio controller 31C, the $NO_2$-NOx ratio is made to increase by causing the EGR amount to increase and the feed NO amount to decrease, in a case of the output value Vno of the NO sensor 43C being greater than a predetermined degradation determination threshold Vno_th, i.e. in a case of being a NO excessive state. In other words, the directions of change of the EGR amount, feed NO amount and $NO_2$-NOx ratio in the NO sensor feedback mode are each opposite the first embodiment.

Therefore, the arithmetic expression in the NO sensor feedback mode of the $NO_2$-NOx ratio controller 31C can be configured by reversing the sign of the initial decrement Dkegr_DEC, return amount Dkegr_INC and feedback gain Ki_no2 in the above formulas (6) to (8), for example.

Figure 30:
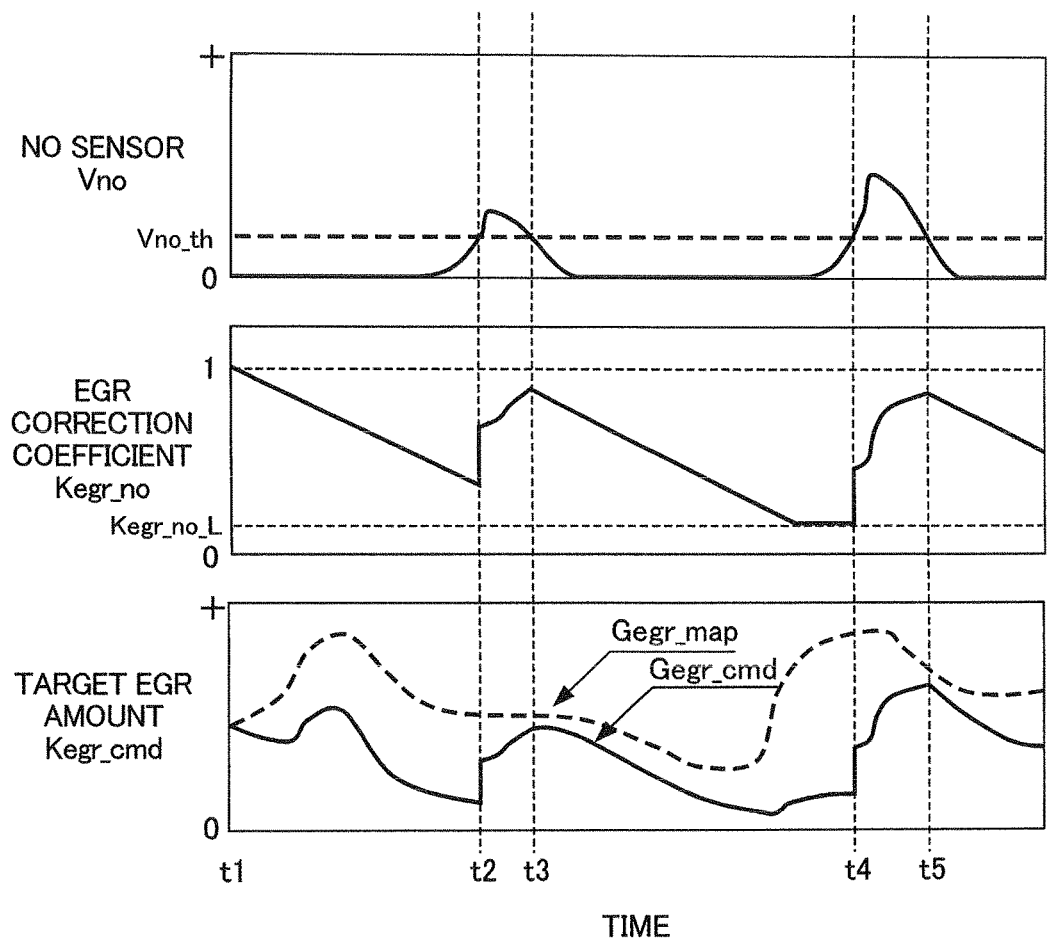
FIG. 30 provides time charts showing changes in the output value of the NO sensor, EGR correction coefficient, and target EGR amount in a case of operating the $NO_2$-NOx ratio controller in NO sensor feedback mode.

FIG. 30 provides time charts showing changes in the output value Vno of the NO sensor, EGR correction coefficient Kegr_no, and target EGR amount Gegr_cmd in a case of operating the $NO_2$-NOx ratio controller in the NO sensor feedback mode configured as described in the foregoing.

During time t1 to t2, the output value Vno of the NO sensor is no more than the NO detection threshold Vno_th. In this case, the EGR correction coefficient Kegr_no gradually decreases towards the lower limit. The target EGR amount Gegr_cmd thereby gradually decreases so as to deviate from the map value Gegr_map, a result of which the NO amount discharged from the engine gradually increases compared to a case of not having caused the EGR correction coefficient Kegr_no to decrease.

Next, at time t2, the output value Vno of the NO sensor exceeds the NO detection threshold Vno_th. At this moment, the EGR correction coefficient Kegr_no decreases by the initial decrement. The target EGR amount Gegr_cmd is thereby instantly changed to a larger value so as to approach the map value Gegr_map. Subsequently, from time t2 until time t3 when the output value Vno of the NO sensor falls below the NO detection threshold Vno_th, the EGR correction coefficient Kegr_no incrementally increases by an amount proportional to the output deviation. The target EGR amount Gegr_cmd thereby increases more so as to approach the map value Gegr_map, a result of which the NO amount discharged from the engine gently increases compared to a case of not having decreased the EGR correction coefficient Kegr_no.

In addition, the arithmetic expression of the catalyst degradation determination mode of the $NO_2$-NOx ratio controller 31C can also similarly be configured by making the sign of the decrement Dkegr_JD_DEC or increment Dkegr_JD_INC to reverse to make the direction in which the EGR correction coefficient Kegr_no2 changes to be opposite.

Fifth Embodiment

Next, a fifth embodiment of the present invention will be explained.

Similarly to the above fourth embodiment, with the present embodiment, a NO sensor is provided on the downstream side of the selective reduction catalyst, and the NOx purification rate of the selective reduction catalyst is maintained near the maximum by causing the $NO_2$-NOx ratio to increase, in a case of the output value Vno thereof being greater than a threshold Vno_th, i.e. in a case of the exhaust flowing into the selective reduction catalyst being in a NO excessive state.

In addition, with the second embodiment, the $NO_2$-NOx ratio is adjusted by changing the air-fuel ratio of the air-fuel mixture to vary the oxygen concentration of the exhaust. Similarly to the second embodiment, the present embodiment also adjusts the $NO_2$-NOx ratio by changing the air-fuel ratio of the air-fuel mixture to vary the oxygen concentration of the exhaust.

Hereinafter, the points of difference between the second embodiment and the present embodiment will be explained.

First, with the present embodiment, due to detecting the NO excessive state by way of the NO sensor, the map of the reference air-fuel ratio map value calculating unit is preferably set so that the $NO_2$-NOx ratio of the exhaust flowing into the selective reduction catalyst 23 becomes slight NO excessive, conversely to the second embodiment.

In addition, in the NO sensor feedback mode of the $NO_2$-NOx ratio controller, the $NO_2$-NOx ratio is made to increase by changing the air-fuel ratio of the air-fuel mixture by way of at least any of a fuel injection parameter, boost pressure and EGR amount to the leaner side to cause the oxygen concentration of the exhaust to decline, in a case of the output value Vno of the NO sensor being greater than the degradation determination threshold Vno_th, i.e. in a case of being in a NO excessive state. In other words, the directions of change of the air-fuel ratio of the air-fuel mixture, oxygen concentration of the exhaust, and $NO_2$-NOx ratio in the NO sensor feedback mode are each opposite the second embodiment.

Therefore, the arithmetic expression in the NO sensor feedback mode of the $NO_2$-NOx ratio controller can be configured by reversing the sign of the initial decrement DDaf_DEC, return amount DDaf_INC and feedback gain Ki_af_no2 in the above formulas (23) to (25), for example.

In addition, the arithmetic expression of the catalyst degradation determination mode of the $NO_2$-NOx ratio controller can also similarly be configured by making the direction in which the air-fuel ratio correction coefficient changes to be opposite the second embodiment.

Sixth Embodiment

Next, a sixth embodiment of the present invention will be explained.

Similarly to the above fourth embodiment, with the present embodiment, a NO sensor is provided on the downstream side of the selective reduction catalyst, and the NOx purification rate of the selective reduction catalyst is maintained near the maximum by causing the $NO_2$-NOx ratio to increase in a case of the output value Vno thereof being greater than a threshold Vno_th, i.e. in a case of the exhaust flowing into the selective reduction catalyst being in a NO excessive state.

In addition, with the third embodiment, the $NO_2$-NOx ratio is adjusted by varying the temperature of the oxidation catalyst. Similarly to the third embodiment, the present embodiment also adjusts the $NO_2$-NOx ratio by varying the temperature of the oxidation catalyst.

Hereinafter, the points of difference between the third embodiment and the present embodiment will be explained.

First, with the present embodiment, due to detecting the NO excessive state by way of the NO sensor, the map of the reference post injection amount map value calculating unit is preferably set so that the $NO_2$-NOx ratio of the exhaust flowing into the selective reduction catalyst 23 becomes slight NO excessive, conversely to the third embodiment.

In addition, in the NO sensor feedback mode of the $NO_2$-NOx ratio controller, the $NO_2$-NOx ratio is made to increase by causing the temperature of the oxidation catalyst to rise by way of at least any of the after injection amount and the post injection amount, in a case of the output value Vno of the NO sensor being greater than the predetermined degradation determination threshold Vno_th, i.e. in a case of being in a NO excessive state. In other words, the directions of change of the after injection amount, post injection amount, temperature of the oxidation catalyst, and $NO_2$-NOx ratio in the NO sensor feedback mode are each opposite the third embodiment.

Therefore, the arithmetic expression in the NO sensor feedback mode of the $NO_2$-NOx ratio controller can be configured by reversing the sign of the initial decrement DDt_DEC, return amount DDt_INC and feedback gain Ki_no2 in the above formulas (33) to (35), for example.

In addition, the arithmetic expression of the catalyst degradation determination mode of the $NO_2$-NOx ratio controller can also similarly be configured by making the direction in which the temperature correction amount changes to be opposite the third embodiment.

It should be noted that the present invention is not to be limited to the aforementioned embodiments, and various modifications thereto are possible.

For example, in order to adjust the $NO_2$-NOx ratio of the exhaust flowing into the selective reduction catalyst, the first and fourth embodiments vary the EGR amount (EGR method), the second and firth embodiments change the air-fuel ratio of the air-fuel mixture (AF method), and the third and sixth embodiments vary the temperature of the oxidation catalyst (temperature adjustment method).

The present invention does not only execute this EGR method, AF method, and temperature adjustment method individually, but may also combine these.

In the case of a gasoline engine, the air-fuel ratio of the air-fuel mixture tends to change extensively compared to a diesel engine; therefore, applying the AF method is preferable, and in the case of a diesel engine, applying the temperature adjustment method and EGR method is preferable.

In addition, the temperature adjustment method adjusts the $NO_2$-NOx ratio by varying the temperature of the oxidation catalyst; however, since time is required for the temperature of the oxidation catalyst in the exhaust plumbing to change, the change in $NO_2$-NOx ratio is delayed compared to the others, i.e. the EGR method and AF method. Therefore, the temperature adjustment method is preferably executed in combination with the others, i.e. the EGR method or AF method.

In the above-mentioned embodiments, the oxidation catalyst 21 is provided immediately after the engine 1, and the CSF 22 having both a soot collection function and an oxidation function for CO, HC, NO, etc. is further provided on a downstream side thereof; however, the present invention is not to be limited thereto. A filter having only a soot collection function without an oxidation function, an oxidation catalyst having only an oxidation function without a soot collection function, or the like may be used in place of such a CSF 22.

What is claimed is:

1. An exhaust purification system for an internal combustion engine including an oxidation catalyst provided in an exhaust channel of the internal combustion engine,
and a selective reduction catalyst that is provided in the exhaust channel further downstream than the oxidation catalyst and selectively reduces NOx in exhaust, the exhaust purification system comprising:
a $NO_2$ sensor that is provided in the exhaust channel further downstream than the selective reduction catalyst and detects $NO_2$ in exhaust; and
a controller configured to execute $NO_2$-NOx ratio decrease processing to cause a $NO_2$-NOx ratio, corresponding to a ratio of $NO_2$ to NOx in the exhaust flowing into the selective reduction catalyst, to decrease when a detection value from the $NO_2$ sensor is greater than a $NO_2$ detection threshold value,
wherein the $NO_2$ detection threshold value is a fixed value.

2. The exhaust purification system for an internal combustion engine according to claim 1, further comprising an EGR channel that connects the exhaust channel and an intake channel of the internal combustion engine, and an EGR valve that is provided in the EGR channel, wherein the $NO_2$-NOx ratio decrease processing causes the $NO_2$-NOx ratio of the exhaust flowing into the selective reduction catalyst to decrease by decreasing an EGR amount corresponding to an amount of exhaust recirculated through the EGR channel to cause an NO amount discharged from the internal combustion engine to increase.

3. The exhaust purification system for an internal combustion engine according to claim 2, wherein the controller causes the NO amount discharged from the internal combustion engine to decrease when the detection value from the $NO_2$ sensor is no more than the $NO_2$ detection threshold value.

4. The exhaust purification system for an internal combustion engine according to claim 2, wherein the controller inhibits execution of the $NO_2$-NOx ratio decrease processing until a predetermined time has elapsed since initiating start up of the internal combustion engine or while a temperature of the oxidation catalyst is less than a predetermined temperature, and permits execution of the $NO_2$-NOx ratio decrease processing after the predetermined time has elapsed since initiating start up of the internal combustion engine or while the temperature of the oxidation catalyst is at least the predetermined temperature.

5. The exhaust purification system for an internal combustion engine according to claim 2, wherein the controller:

determines whether the selective reduction catalyst is in a degraded state based on any of: a correction value for a target value related to the EGR amount from a predetermined reference value, a timing at which the detection value from the $NO_2$ sensor falls below a degradation determination threshold, and a timing at which the detection value from the $NO_2$ sensor exceeds a degradation determination threshold;

inhibits execution of the $NO_2$-NOx ratio decrease processing when having determined that the selective reduction catalyst is not in the degraded state, and sets the EGR amount so that the fuel economy of the internal combustion engine increases; and permits execution of the $NO_2$-NOx ratio decrease processing when having determined that the selective reduction catalyst is in the degraded state.

6. The exhaust purification system for an internal combustion engine according to claim 2, wherein the controller:

determines whether the oxidation catalyst is in a degraded state; and permits execution of the $NO_2$-NOx ratio decrease processing when having determined that the oxidation catalyst is not in the degraded state, and inhibits execution of the $NO_2$-NOx ratio decrease processing when having determined that the oxidation catalyst is in the degraded state.

7. The exhaust purification system for an internal combustion engine according to claim 1, wherein the $NO_2$-NOx ratio decrease processing causes the $NO_2$-NOx ratio of the exhaust flowing into the selective reduction catalyst to decrease by changing an air-fuel ratio of an air-fuel mixture of the internal combustion engine to a richer side by way of at least any of a fuel injection parameter, boost pressure, and EGR amount corresponding to an amount of exhaust recirculated through an EGR channel, so as to cause the oxygen concentration of the exhaust to decline.

8. The exhaust purification system for an internal combustion engine according to claim 7, wherein the controller changes the air-fuel ratio of the air-fuel mixture of the internal combustion engine to a leaner side when the detection value from the $NO_2$ sensor is no more than the $NO_2$ detection threshold value.

9. The exhaust purification system for an internal combustion engine according to claim 7, wherein the controller inhibits execution of the $NO_2$-NOx ratio decrease processing until a predetermined time has elapsed since initiating start up of the internal combustion engine or while a temperature of the oxidation catalyst is less than a predetermined temperature, and permits execution of the $NO_2$-NOx ratio decrease processing after the predetermined time has elapsed since initiating start up of the internal combustion engine or while the temperature of the oxidation catalyst is at least the predetermined temperature.

10. The exhaust purification system for an internal combustion engine according to claim 7, wherein the controller:

determines whether the selective reduction catalyst is in a degraded state based on any of:

a correction value for a target value related to the air-fuel ratio of the air-fuel mixture from a predetermined reference value, a timing at which the detection value from the $NO_2$ sensor falls below a degradation determination threshold, and a timing at which the detection value from the $NO_2$ sensor exceeds a degradation determination threshold;

inhibits execution of the $NO_2$-NOx decrease processing when having determined that the selective reduction catalyst is not in the degraded state, and sets the air-fuel ratio of the air-fuel mixture so that the fuel economy of the internal combustion engine increases; and permits execution of the $NO_2$-NOx ratio decrease processing when having determined that the selective reduction catalyst is in the degraded state.

11. The exhaust purification system for an internal combustion engine according to claim 7, wherein the controller:

determines whether the oxidation catalyst is in a degraded state; and permits execution of the $NO_2$-NOx ratio decrease processing when having determined that the oxidation catalyst is not in the degraded state, and inhibits execution of the $NO_2$-NOx ratio decrease processing when having determined that the oxidation catalyst is in the degraded state.

12. The exhaust purification system for an internal combustion engine according to claim 1, wherein the $NO_2$-NOx ratio decrease processing causes the $NO_2$-NOx ratio of the exhaust flowing into the selective reduction catalyst to decrease, by causing at least any of an after injection amount and post injection amount of the internal combustion engine to decrease so as to cause the temperature of the oxidation catalyst to decline, within a temperature range no higher than a temperature at which a NO oxidation efficiency is a maximum.

13. The exhaust purification system for an internal combustion engine according to claim 12, wherein the controller causes the temperature of the oxidation catalyst to rise when the detection value from the $NO_2$ sensor is no more than the $NO_2$ detection threshold value.

14. The exhaust purification system for an internal combustion engine according to claim 12, wherein the controller inhibits execution of the $NO_2$-NOx ratio decrease processing until a predetermined time has elapsed since initiating start up of the internal combustion engine or while a temperature of the oxidation catalyst is less than a predetermined temperature, and permits execution of the $NO_2$-NOx ratio decrease processing after the predetermined time has elapsed since initiating start up of the internal combustion engine or while the temperature of the oxidation catalyst is at least the predetermined temperature.

15. The exhaust purification system for an internal combustion engine according to claim 12, wherein the controller:

determines whether the selective reduction catalyst is in a degraded state based on any of:

a correction value from a predetermined reference value for a target value related to the temperature of the oxidation catalyst, a timing at which the detection value from the $NO_2$ sensor falls below a degradation determination threshold, and a timing at which the detection value from the $NO_2$ sensor exceeds a degradation determination threshold;

inhibits execution of the $NO_2$-NOx ratio decrease processing when having determined that the selective reduction catalyst is not in the degraded state; and permits execution of the $NO_2$-NOx ratio decrease processing when having determined that the selective reduction catalyst is in the degraded state.

16. The exhaust purification system for an internal combustion engine according to claim 12, wherein the controller:

determines whether the oxidation catalyst is in a degraded state; and permits execution of the $NO_2$-NOx ratio decrease processing when having determined that the oxidation catalyst is not in the degraded state, and inhibits execution of the $NO_2$-NOx ratio decrease processing when having determined that the oxidation catalyst is in the degraded state.

17. The exhaust purification system for an internal combustion engine according to claim 1, wherein the $NO_2$-NOx ratio decrease processing causes the $NO_2$-NOx ratio of the exhaust flowing into the selective reduction catalyst to decrease, by causing at least any of an after injection amount and a post injection amount of the internal combustion engine to increase so as to cause the temperature of the oxidation catalyst to rise, within a temperature range of at least a temperature at which a NO oxidation efficiency is a maximum.

18. The exhaust purification system for an internal combustion engine according to claim 17, wherein the controller causes the temperature of the oxidation catalyst to decline when the detection value from the $NO_2$ sensor is no more than the $NO_2$ detection threshold value.

19. The exhaust purification system for an internal combustion engine according to claim 17, wherein the controller:

determines whether the selective reduction catalyst is in a degraded state based on any of:

a correction value from a predetermined reference value for a target value related to the temperature of the oxidation catalyst, a timing at which the detection value from the $NO_2$ sensor falls below a degradation determination threshold, and a timing at which the detection value by way of the $NO_2$ sensor exceeds a degradation determination threshold;

inhibits execution of the $NO_2$-NOx ratio decrease processing when having determined that the selective reduction catalyst is not in the degraded state; and permits execution of the $NO_2$-NOx ratio decrease processing when having determined that the selective reduction catalyst is in the degraded state.

* * * * *